United States Patent
Park et al.

(10) Patent No.: US 9,693,325 B1
(45) Date of Patent: Jun. 27, 2017

(54) METHOD AND APPARATUS FOR HYBRID TIME SYNCHRONIZATION BASED ON BROADCAST SEQUENCING FOR WIRELESS AD HOC NETWORKS

(71) Applicant: The United States of America, as represented by the Secretary of the Navy, Washington, DC (US)

(72) Inventors: Sung C. Park, San Marcos, CA (US); Murali Tummala, Monterey, CA (US); John C. McEachen, Carmel, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 143 days.

(21) Appl. No.: 14/851,404

(22) Filed: Sep. 11, 2015

Related U.S. Application Data

(60) Provisional application No. 62/066,699, filed on Oct. 21, 2014.

(51) Int. Cl.
*H04J 3/06* (2006.01)
*H04W 56/00* (2009.01)
(Continued)

(52) U.S. Cl.
CPC ....... *H04W 56/0005* (2013.01); *H04W 4/005* (2013.01); *H04W 48/16* (2013.01)

(58) Field of Classification Search
CPC . H04W 56/00; H04W 56/0045; H04W 84/18; H04L 7/042; H04J 3/0682
See application file for complete search history.

(56) References Cited

U.S. PATENT DOCUMENTS 5,063,493 A * 11/1991 Shioiri ............... H04H 60/06
369/83
7,499,423 B1 * 3/2009 Amos ............... G01S 5/06
324/387

(Continued)

OTHER PUBLICATIONS

Park, Sung C., "A Hybrid Time Synchronization Algorithm Based on Broadcast Sequencing for Wireless Sensor Networks," Naval Postgraduate School, Thesis, Sep. 2014.

*Primary Examiner* — Mark Rinehart
*Assistant Examiner* — Sanjay K Dewan
(74) *Attorney, Agent, or Firm* — Naval Postgraduate School; Lisa A. Norris

(57) ABSTRACT

Synchronizing a plurality of sensors of a wireless sensor network includes initiating, by a first sensor, a flood broadcast of a sequence discovery packet in the wireless sensor network; creating, by the first sensor in response to receiving back the sequence discovery packet, an initial broadcast sequence, wherein the initial broadcast sequence includes a list of sensor identifications, and wherein an adjacent pair of sensor identifications in the initial broadcast sequence correspond to a pair of neighbor sensors, and wherein the pair of neighbor sensors are able to communicate directly with each other; broadcasting, by the first sensor, the initial broadcast sequence, wherein the initial broadcast sequence specifies an initial order for the plurality of sensors to broadcast synchronization information to eliminate collisions in the wireless sensor network; and broadcasting, by the first sensor, a first timestamp, using a location of the first sensor in the initial broadcast sequence.

12 Claims, 51 Drawing Sheets

(51) Int. Cl.
*H04W 48/16* (2009.01)
*H04W 4/00* (2009.01)

(56) References Cited

U.S. PATENT DOCUMENTS

| | | | | |
|---|---|---|---|---|
| 7,688,802 B2 * | 3/2010 | Gonia | H04J 3/0641 | 370/328 |
| 7,903,601 B2 * | 3/2011 | Voglewede | H04J 3/0667 | 370/324 |
| 7,920,881 B2 * | 4/2011 | Fullam | H04H 20/67 | 370/350 |
| 8,249,049 B2 * | 8/2012 | Silverman | H04J 3/0667 | 370/228 |
| 8,737,378 B2 * | 5/2014 | Mainaud | H04J 3/0638 | 370/324 |
| 8,749,398 B2 * | 6/2014 | Montgomery | G01V 1/26 | 340/853.7 |
| 8,891,716 B2 * | 11/2014 | Takahashi | G06F 1/12 | 370/516 |
| 2009/0323669 A1 * | 12/2009 | Salonidis | H04J 3/0655 | 370/350 |
| 2010/0226359 A1 * | 9/2010 | van der Wateren | H04J 3/0655 | 370/350 |
| 2010/0260167 A1 * | 10/2010 | Kim | H04J 3/0667 | 370/350 |
| 2011/0002324 A1 * | 1/2011 | Falck | H04W 84/10 | 370/350 |
| 2014/0177656 A1 * | 6/2014 | Mian | G01D 9/005 | 370/512 |

\* cited by examiner

METHOD AND APPARATUS FOR HYBRID TIME SYNCHRONIZATION BASED ON BROADCAST SEQUENCING FOR WIRELESS AD HOC NETWORKS

CROSS-REFERENCE TO RELATED APPLICATIONS

This application claims priority to U.S. Provisional Patent Application No. 62/066,699 filed on Oct. 21, 2014, the complete disclosure of which, in its entirety, is herein incorporated by reference.

COPYRIGHT NOTICE

A portion of the disclosure of this patent document, as provided in the Appendix herein, includes material that is subject to copyright protection. The copyright owner has no objection to the facsimile reproduction by anyone of this patent document or the patent disclosure, as it appears in the U.S. Patent and Trademark Office patent file or records, but otherwise reserves all copyright rights whatsoever.

BACKGROUND

Technical Field

The embodiments herein relate to sensor networks, and more particularly to synchronization in sensor networks.

Description of the Related Art

Over the past few decades, advances in technology have resulted in smaller and more efficient devices that enable communication among users. The need for these devices to be wireless has attracted significant interest in commercial and government applications. One of the popular wireless devices in demand is a sensor node that is capable of sensing, communicating, and processing data. Recent advances in the development of low-cost, low-power, multifunctional sensor nodes have led to the development of wireless sensor networks (WSNs) that cooperatively collect and disseminate sensor data. Wireless sensor networks consist of a large number of randomly deployed or self-organized sensor nodes that are appropriate for environments and operations that do not have a pre-defined network infrastructure, such as disaster relief or search and rescue operations. The attractive features of wireless sensor networks have extended research in a wide range of applications to include medical, environmental, and military operations.

One component in the operation of wireless sensor networks is clock synchronization, as it provides a common time frame to different nodes. Most of the applications for wireless sensor networks generally require monitoring of events, thus requiring sensor nodes to maintain a common reference time for collaborative data fusion and communications. Signal-processing techniques that turn raw data into meaningful results typically require relative synchronization among sensor node clocks in order to detect a correct chronology of events. Another example is the commonly used medium access control (MAC) protocol, time-division multiple access (TDMA), which requires precise time synchronization for its scheduling algorithm.

As the demand for wireless sensor networks in government and commercial industry increases, the broad application of time synchronization will become more prevalent as the requirement for data exchange increases.

SUMMARY

In view of the foregoing, an embodiment herein provides a method for synchronizing a plurality of sensors of a wireless sensor network, the method comprises initiating, by a first sensor, a flood broadcast of a sequence discovery packet in the wireless sensor network; creating, by the first sensor in response to receiving back the sequence discovery packet, an initial broadcast sequence, wherein the initial broadcast sequence comprises a list of sensor identifications, and wherein an adjacent pair of sensor identifications in the initial broadcast sequence correspond to a pair of neighbor sensors, and wherein the pair of neighbor sensors are able to communicate directly with each other; broadcasting, by the first sensor, the initial broadcast sequence, wherein the initial broadcast sequence specifies an initial order for the plurality of sensors to broadcast synchronization information to eliminate collisions in the wireless sensor network; and broadcasting, by the first sensor, a first timestamp, using a location of the first sensor in the initial broadcast sequence.

The method may further comprise exchanging hop-count information among the pair of neighbor sensors when one of the pair of neighbor sensors receives the sequence discovery packet. The method may further comprise determining a childless sensor, wherein the childless sensor has a largest distance from the first sensor among any neighbors of the childless sensor. The method may further comprise creating, by the childless sensor, a first sequence comprising an identification of the childless sensor. The method may further comprise transmitting, by the childless sensor, the first sequence to a first parent sensor of the childless sensor, wherein the first parent sensor is a neighbor of the childless sensor and has a shorter distance to the first sensor than the childless sensor; creating, by the first parent sensor, a second sequence comprising an identification of the first parent sensor and a most node inclusive sequence received by the first parent sensor, wherein the first most node inclusive sequence comprises more sensor identifications than other sequences received by the first parent sensor; and transmitting, by the first parent sensor, the second sequence to a second parent sensor of the first parent sensor, wherein the second parent sensor is a neighbor of the first parent sensor and has a shorter distance to the first sensor than the first parent sensor.

The initial broadcasting sequence may comprise an identification of the first sensor and a final most node inclusive sequence received by the first sensor. The method may further comprise receiving, by a second sensor, the initial broadcast sequence; determining, by the second sensor, whether a neighbor of the second sensor is missing from the initial broadcast sequence; updating, by a second sensor, the initial broadcast sequence to an updated broadcast sequence to include the neighbor of the second sensor, when the second sensor determines that the neighbor of the second sensor is missing from the initial broadcast sequence, wherein the updated broadcast sequence specifies an updated order for the plurality of sensors to broadcast the synchronization information to eliminate collisions in the wireless sensor network; and broadcasting, by the second sensor, a second timestamp information using a location of the second sensor in the updated broadcast sequence.

The method may further comprise creating, by the first sensor, a first matrix of timestamps, wherein the first matrix of timestamps comprises a plurality of timestamps received by the first sensor; determining, by the first sensor, a master reference node using the first matrix of timestamp, wherein the first sensor uses the master reference node as a reference for synchronization; creating, by the second sensor, a second matrix of timestamps, wherein the second matrix of timestamp comprises a plurality of timestamps received by the second sensor; and determining, by the second sensor, the master reference node using the second matrix of timestamp, wherein the second sensor uses the master reference node as a reference for synchronization. The plurality of timestamp information comprises information indicating relative time skew with the master reference node. The method may further comprise synchronizing, by the first sensor, with the master reference sensor, using the first matrix of timestamps, when there is a timestamp corresponding to the first sensor and the master sensor in the first matrix of timestamps; synchronizing, by the first sensor, with the master reference sensor, using an exchange of an arrival time of a reference broadcast by the reference sensor, when there is no timestamp corresponding to the first sensor and the master sensor in the first matrix of timestamps; synchronizing, by the second sensor, with the master reference sensor, using the second matrix of timestamps, when there is a timestamp corresponding to the second sensor and the master sensor in the second matrix of timestamps; and synchronizing, by the second sensor, with the master reference sensor, using an exchange of an arrival time of a reference broadcast by the reference sensor, when there is no timestamp corresponding to the second sensor and the master sensor in the second matrix of timestamps.

Another embodiment provides a system for synchronizing a plurality of sensors of a wireless sensor network, the system comprises a first sensor configured to initiate a flood broadcast of a sequence discovery packet in the wireless sensor network; determine, in response to receiving back the sequence discovery packet, an initial broadcast sequence, wherein the initial broadcast sequence comprises a list of sensor identifications, and wherein an adjacent pair of sensor identifications in the initial broadcast sequence correspond to a pair of neighbor sensors, and wherein the pair of neighbor sensors are able to communicate directly with each other; broadcast the initial broadcast sequence, wherein the initial broadcast sequence specifies an initial order for the plurality of sensors to broadcast synchronization information to eliminate collisions in the wireless sensor network; and broadcast a first timestamp, using a location of the first sensor in the initial broadcast sequence.

The pair of neighbor sensors may be configured to exchange hop-count information when one of the pair of neighbor sensors receives the sequence discovery packet. The system may be configured to determine a childless sensor, wherein the childless sensor has a largest distance from the first sensor among any neighbors of the childless sensor, and wherein the childless sensor is configured to create a first sequence comprising an identification of the childless sensor. The childless sensor may be configured to transmit the first sequence to a first parent sensor of the childless sensor, wherein the first parent sensor is a neighbor of the childless sensor and has a shorter distance to the first sensor than the childless sensor. The first parent sensor may be configured to create a second sequence comprising an identification of the first parent sensor and a most node inclusive sequence received by the first parent sensor, wherein the first most node inclusive sequence comprises more sensor identifications than other sequences received by the first parent sensor. The first parent sensor may be configured to transmit the second sequence to a second parent sensor of the first parent sensor, wherein the second parent sensor is a neighbor of the first parent sensor and has a shorter distance to the first sensor than the first parent sensor. The first sensor may be configured to create the initial broadcasting sequence using an identification of the first sensor and a final most node inclusive sequence received by the first sensor.

Another embodiment provides a non-transitory program storage device readable by computer, tangibly embodying a program of instructions executable by the computer to perform a method for synchronizing a plurality of sensors of a wireless sensor network, the method comprises initiating, by a first sensor, a flood broadcast of a sequence discovery packet in the wireless sensor network; creating, by the first sensor in response to receiving back the sequence discovery packet, an initial broadcast sequence, wherein the initial broadcast sequence comprises a list of sensor identifications, and wherein an adjacent pair of sensor identifications in the initial broadcast sequence correspond to a pair of neighbor sensors, and wherein the pair of neighbor sensors are able to communicate directly with each other; broadcasting, by the first sensor, the initial broadcast sequence, wherein the initial broadcast sequence specifies an initial order for the plurality of sensors to broadcast synchronization information to eliminate collisions in the wireless sensor network; and broadcasting, by the first sensor, a first timestamp, using a location of the first sensor in the initial broadcast sequence.

The program storage device, wherein the method may further comprise receiving, by a second sensor, the initial broadcast sequence; determining, by the second sensor, whether a neighbor of the second sensor is missing from the initial broadcast sequence; updating, by a second sensor, the initial broadcast sequence to an updated broadcast sequence to include the neighbor of the second sensor, when the second sensor determines that the neighbor of the second sensor is missing from the initial broadcast sequence, wherein the updated broadcast sequence specifies an updated order for the plurality of sensors to broadcast the synchronization information to eliminate collisions in the wireless sensor network; and broadcasting, by the second sensor, a second timestamp information using a location of the second sensor in the updated broadcast sequence.

The program storage device, wherein the method may further comprise creating, by the first sensor, a first matrix of timestamps, wherein the first matrix of timestamps comprises a plurality of timestamps received by the first sensor; determining, by the first sensor, a master reference node using the first matrix of timestamp, wherein the first sensor uses the master reference node as a reference for synchronization; creating, by the second sensor, a second matrix of timestamps, wherein the second matrix of timestamp comprises a plurality of timestamps received by the second sensor; and determining, by the second sensor, the master reference node using the second matrix of timestamp, wherein the second sensor uses the master reference node as a reference for synchronization. The plurality of timestamp information may comprise information indicating relative time skew with the master reference node.

The program storage device, wherein the method may further comprise synchronizing, by the first sensor, with the master reference sensor, using the first matrix of timestamps, when there is a timestamp corresponding to the first sensor and the master sensor in the first matrix of timestamps; synchronizing, by the first sensor, with the master reference sensor, using an exchange of an arrival time of a reference broadcast by the reference sensor, when there is no timestamp corresponding to the first sensor and the master sensor in the first matrix of timestamps; synchronizing, by the second sensor, with the master reference sensor, using the second matrix of timestamps, when there is a timestamp corresponding to the second sensor and the master sensor in the second matrix of timestamps; and synchronizing, by the second sensor, with the master reference sensor, using an exchange of an arrival time of a reference broadcast by the reference sensor, when there is no timestamp corresponding to the second sensor and the master sensor in the second matrix of timestamps.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

Figure 1:
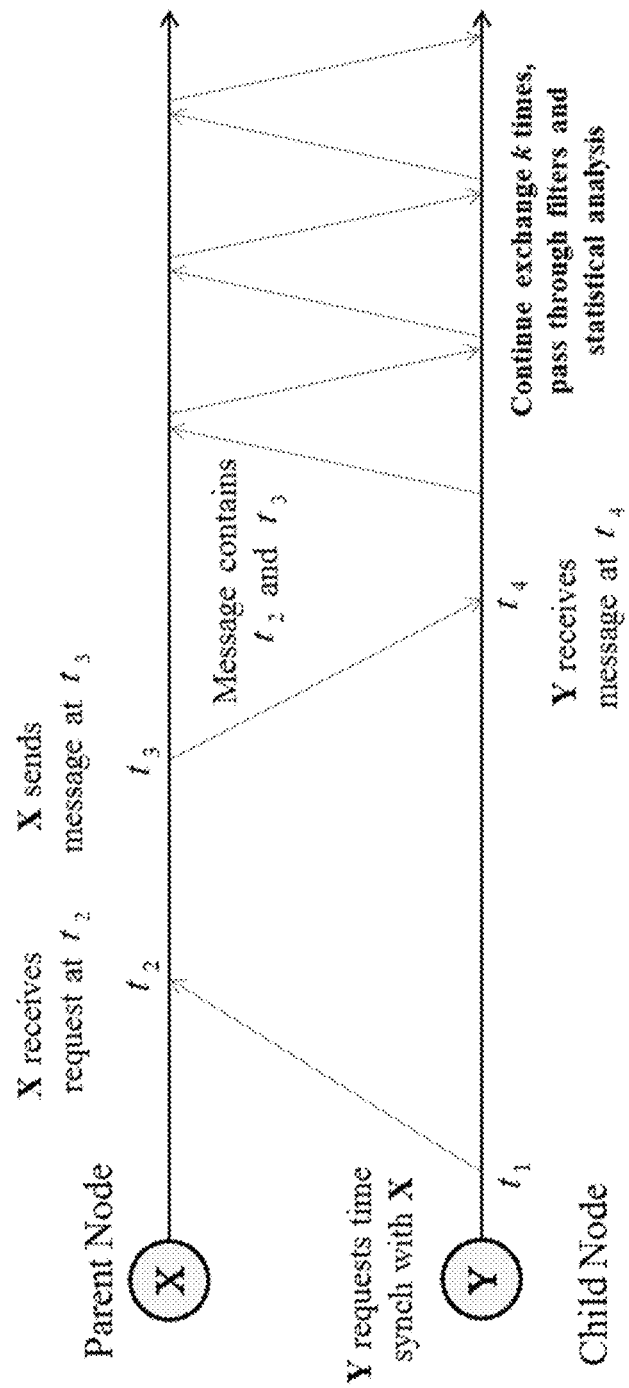
FIG. 1 is a time diagram illustrating a two-way message exchange for time synchronization of two nodes according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a method and apparatus for hybrid time synchronization based on broadcast sequencing for wireless ad hoc networks. An embodiment herein provides a new hybrid time synchronization scheme that provides a high degree of network-wide synchronization and eliminates the possibility of collisions when transmitting timestamp messages. An embodiment herein presents a time synchronization scheme that may increase the precision of a WSN's time synchronization, enhancing the network's ability to facilitate applications that require synchronization and improving the network's performance. Other time synchronization protocols may offer accurate parameter estimators that synchronize nodes to an acceptable range but do not address the challenges associated with some network topologies. An embodiment herein presents a methodology that allows a network to determine a broadcast sequence by which nodes transmit and forward messages, eliminating collisions, and then conducts a network-wide synchronization based on received timestamp information. Sensor nodes may synchronize via any of relative referenceless receiver/receiver synchronization and ratio-based synchronization protocol that may have a high level of precision in current research. An embodiment herein presents a hybrid scheme that may use any of referenceless receiver/receiver synchronization and ratio-based synchronization protocols.

Significant improvements in network time synchronization may be achieved by embodiments herein and by hybrid scheme presented herein. Simulation models using MATLAB® software are presented to validate estimators proposed in previous embodiments and to evaluate the performance of broadcast sequencing embodiment as well as hybrid time synchronization embodiment. The results demonstrate that the embodiments presented herein produce a final broadcast sequence that includes a high percentage of nodes and that the sequence can be utilized to synchronize a network of any topology more precisely than other known time synchronization protocols.

An embodiment herein describes broadcast sequencing that determines a sequence order and eliminates the possibility of collisions. An embodiment presents methods of determining a reference node to synchronize to and performing multi-hop synchronization using an analysis of timestamp information. An embodiment presents hybrid time synchronization scheme and validated its superior performance over other time synchronization protocols.

Network time synchronization may use global positioning system (GPS) and the network time protocol (NTP). Both GPS and NTP work well for traditional networks with few power restraints but do not scale well to WSNs as wireless sensor nodes do not have a large power capacity. Typically, most deployments of wireless sensor nodes lack a real-time clock (RTC) or access to accurate time, thus, time synchronization poses a challenge for WSNs.

For example, timing-sync protocol for sensor networks (TPSN) is a time synchronization protocol for WSNs based on a two-way message exchange between a sender and a receiver, similar to NTP. A limitation that TPSN suffers from is the nondeterministic delay from the sender and the inability to account for relative skew corrections.

Flooding time synchronization protocol (FTSP) is another example for a time synchronization protocol for WSNs based on one-way broadcasting from a sender to multiple receivers. FTSP also suffers from the nondeterministic delay from the sender. Ratio-based time synchronization protocol (RSP), is based on FTSP but eliminates some delay time, resulting in improved accuracy. An embodiment herein uses RSP.

Another example for WSN synchronization is reference broadcast synchronization (RBS), a receiver-to-receiver-based time synchronization protocol for WSNs that uses the exchange of the arrival times of a reference node's broadcast to synchronize two or more receivers, eliminating the non-deterministic delay from the sender. A challenge that RBS suffers from is that the dedicated reference node serves as a single point of failure; therefore, it is not appropriate for self-organized WSNs.

Another WSN synchronization methodology is relative referenceless receiver/receiver time synchronization (R4Syn), a method based on RBS that distributes the reference function and uses proposed estimators to synchronize a network of nodes. R4Syn offers a high degree of synchronization accuracy but does not describe how the order of the reference function (i.e., a broadcast sequence) is determined for multi-hop topologies. An embodiment herein uses R4Syn. An embodiment herein takes into account wireless packet collisions and changes in topology, both of which affect a network's ability to synchronize.

For a network of wireless sensor nodes to effectively conduct operations, their clocks may need to be synchronized as precisely as possible. Time synchronization provides a common notion of time across a distributed system for fundamental operations, such as data fusion, power management, transmission scheduling and localization protocols.

An embodiment herein addresses the different sources of error in time synchronization, such as clock drift and delay times, in wireless packet transmissions. An embodiment herein describes a time synchronization scheme that addresses the challenges of any type of wireless ad hoc network topology and improves the overall precision of the network's time synchronization.

An embodiment herein describes a time synchronization scheme based on a broadcast sequence that determines the order by which nodes transmit timing information in an effort to eliminate collisions. With this broadcast sequence, nodes transmit messages and synchronize as a network using one of two different time synchronization protocols.

Sources of Error in Time Synchronization

A clock of a sensor node X is denoted herein by $C_X(t)$ where t is real time. For a crystal-quartz oscillator commonly used in sensor nodes, the frequency can vary up to 40 parts per million (ppm). These differences in frequencies cause clocks to gradually drift from each other over time. Additionally, if clocks are not perfectly tuned to the same start time initially, there is a clock offset O, which is the phase difference of two clocks. The clock relationship between Node X to another Node Y is represented by $$C_Y(t) = f_{X,Y} \times C_X(t) + O_{X,Y}, \quad (1)$$

where $f_{X,Y}$ and $O_{X,Y}$ are the relative clock skew (frequency difference) and clock offset (phase difference) between Node X and Node Y, respectively. If the two nodes were perfectly synchronized, then $f_{X,Y}$ would equal 1 and $O_{X,Y}$ would equal 0. The goal of clock synchronization is to estimate $f_{X,Y}$ and $O_{X,Y}$ as accurately as possible so that Node X can adjust its clock to Node Y.

When there is no delay in message delivery, nodes can send their current time to other nodes for synchronization with absolute precision. Unfortunately, we face various delays that affect message delivery in wireless sensor networks and make clock synchronization a difficult task. These delays in message delivery may include the following:

Send time: Nondeterministic time used to build the message at the application layer on the sender's side. This includes delays caused by the operating system when processing the request.

Access time: Nondeterministic time for the sender to access the transmit channel after reaching the medium access control (MAC) layer. Depending on the MAC protocol, this is the least deterministic component.

Transmission time: Nondeterministic time for the sender to transmit the message at the physical layer.

Propagation time: Deterministic time that a message takes to go from the sender to the receiver. This only depends on the distance between two nodes.

Reception time: Nondeterministic time for the receiver to receive the message at the physical layer. This is the same as transmission time.

Receive time: Nondeterministic time for the receiver to process the message and send to the application layer. This is similar to the send time.

In addition to these various delay times in packet transmissions, clocks are also affected by environmental conditions such as temperature and atmospheric pressure. Aging hardware and voltage changes can affect clock parameters as well.

Time Synchronization Protocols
Two-Way Message Exchange

Referring now to the drawings, and more particularly to FIGS. 1 through 49, where similar reference characters denote corresponding features for their specific figure, or may denote corresponding features consistently throughout the figures, there are shown preferred embodiments. Terms "sensor," "node," or "sensor node" are used interchangeably herein.

FIG. 1 is a time diagram illustrating a two-way message exchange for time synchronization of two nodes according to an embodiment herein. Parent Node Y may want to synchronize with child Node X. For one round of message exchange, Node Y sends a synchronization message to Node X at $t_1$. Node X records its local time that it received Node Y's message at $t_2$ and sends a reply message to Node Y at $t_3$. Node Y receives the reply message that contains the timestamps $t_2$ and $t_3$ at its local time $t_4$. Using the four timestamps, Node Y can calculate its relative offset to Node X. After k rounds of message exchanges, Node Y obtains a series of timestamps that passes through filters and statistical analysis to obtain an accurate estimator. This classic approach is the foundation of the NTP, which has kept the internet's clock ticking with accurate synchronization; however, NTP was designed for traditional computer networks and is not suitable for WSNs.

A methodology that adopt the two-way message exchange approach for wireless sensor networks is timing-synchronization protocol for sensor networks (TPSN). TPSN works in two phases (a level discovery phase and a synchronization phase) to provide network-wide time synchronization based off of the two-way message exchange approach. In the level discovery phase, a hierarchical network structure is created, and then a pair wise synchronization is performed along the edges of the structure. This establishes a global timescale throughout the network to which all nodes eventually synchronize their clocks during the synchronization phase. Hardware experiments using Berkeley motes resulted in an average accuracy of less than 20 μs for a pair of neighboring nodes. Some concerns with this methodology, however, may include the lack of relative skew corrections and the lack of broadcasting capability. Larger networks could potentially lead to higher costs.

One-Way Dissemination

Figure 2:
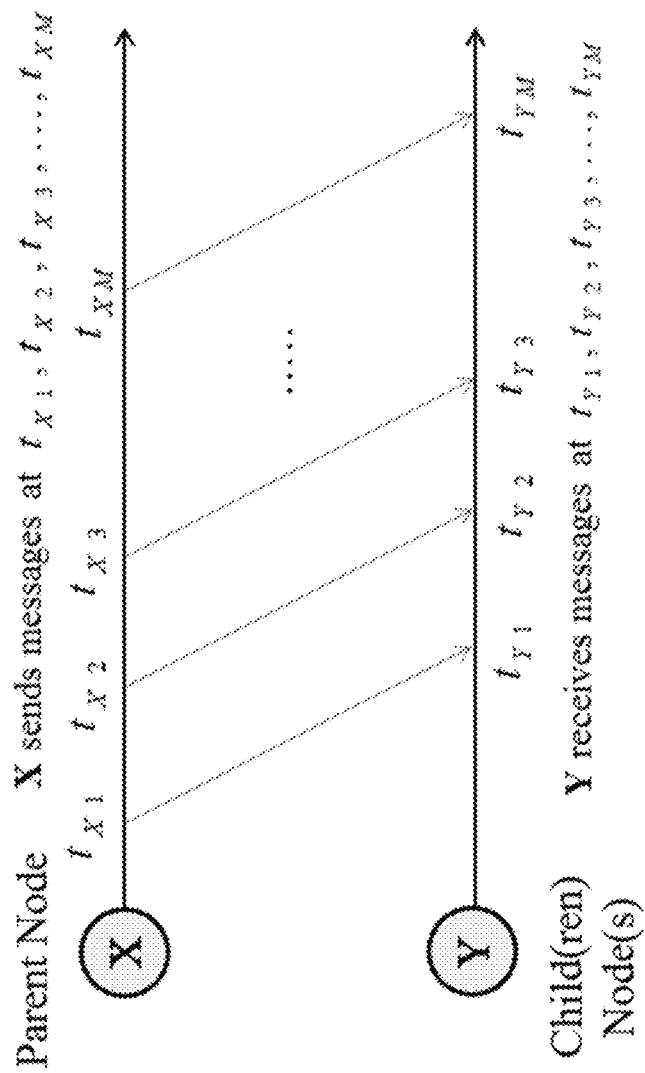
FIG. 2 is a time diagram illustrating a one-way dissemination for time synchronization of multiple children nodes by one parent node, according to an embodiment herein.

FIG. 2 is a time diagram illustrating a one-way dissemination (i.e., broadcasting) for time synchronization of multiple children nodes by one parent node, according to an embodiment. A parent or reference node X may simply broadcast its timing information to its children nodes Y. The receiving nodes record and collect the arrival times of the broadcast message and then compute relative parameters using least-squares estimation. The flooding time synchronization protocol (FTSP) adopts this approach, where a single, dynamically elected parent node maintains the network time while other nodes synchronize their clocks to the parent node.

Figure 3:
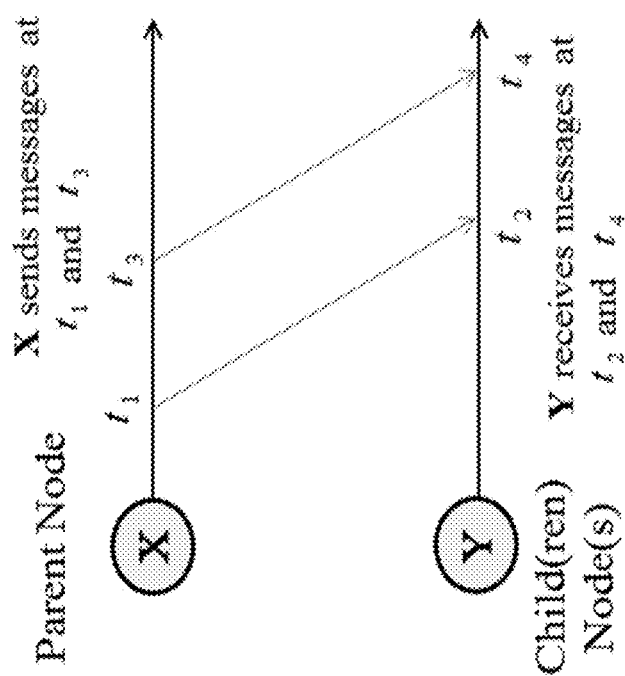
FIG. 3 is a time diagram illustrating a ratio-based time synchronization protocol (RSP), according to an embodiment herein.

FIG. 3 is a time diagram illustrating a ratio-based time synchronization protocol (RSP), according to an embodiment. RSP is similar to FTSP, but uses only two synchronization messages to synchronize receivers to the sender. RSP may use a ratio of the timestamps to calculate the relative skew and offset, respectively, of Node Y to Node X, given by $$f_{Y,X} = \frac{t_3 - t_1}{t_4 - t_2} \quad (2)$$

and $$O_{Y,X} = \frac{t_1 \times t_4 - t_2 \times t_3}{t_4 - t_2}. \quad (3)$$

The RSP method eliminates some delay time compared to FTSP, resulting in slightly improved accuracy during hardware experimentation.

Receiver-Receiver Synchronization

Figure 4:
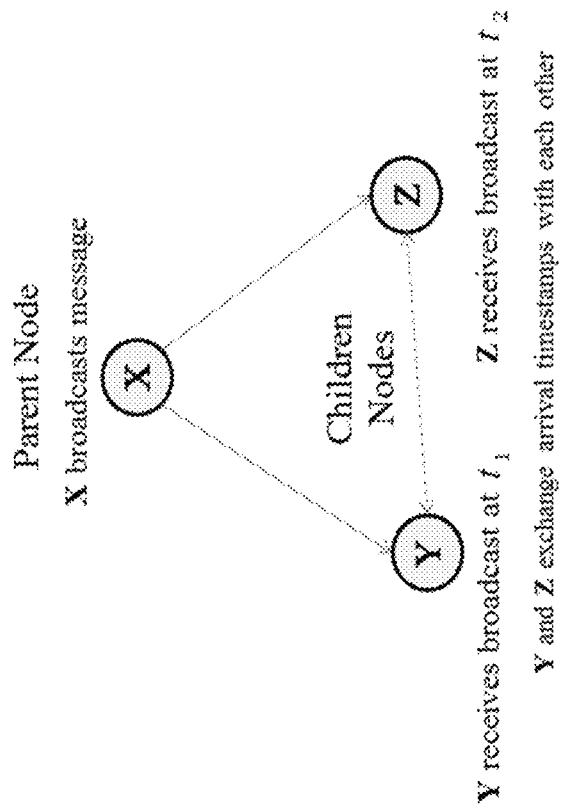
FIG. 4 is a schematic illustrating exchange of arrival timestamps in reference broadcast synchronization (RBS) methodology synchronization according to an embodiment herein.

FIG. 4 is a schematic illustrating exchange of arrival timestamps in reference broadcast synchronization (RBS) methodology synchronization according to an embodiment herein. In this methodology, a dedicated parent or reference node X sends beacons while the receiving children nodes Y and Z record the arrival times and exchange their arrival timestamps with one another to calculate their relative skew and offset to the parent node.

The RBS methodology, uses the broadcast nature to reduce the time-critical path (i.e., the sender's nondeterministic delay) that results in high uncertainty and low accuracy.

A drawback of RBS is the dedicated reference node. It serves as a single point of failure if it were to be eliminated, which is not appropriate for self-organized WSNs. Additionally, RBS may require separate transmissions for exchanging timestamps, which increases the communications overhead.

relative referenceless receiver/receiver time synchronization (R4Syn)

R4Syn is a receiver-receiver-based methodology that attempts to address some of the drawbacks of RBS and serves as a method for the hybrid time synchronization scheme according to an embodiment herein.

Methodology Overview

R4Syn assumes that the network is static (mobility is not considered) and that nodes are located in the same vicinity of each other and are aware of their neighbor IDs. Unlike RBS, R4Syn distributes the reference function amongst all nodes, running in cycles where nodes sequentially broadcast beacons. For a neighborhood of N nodes, each beacon piggybacks N−1 previously received timestamps.

Figure 5:
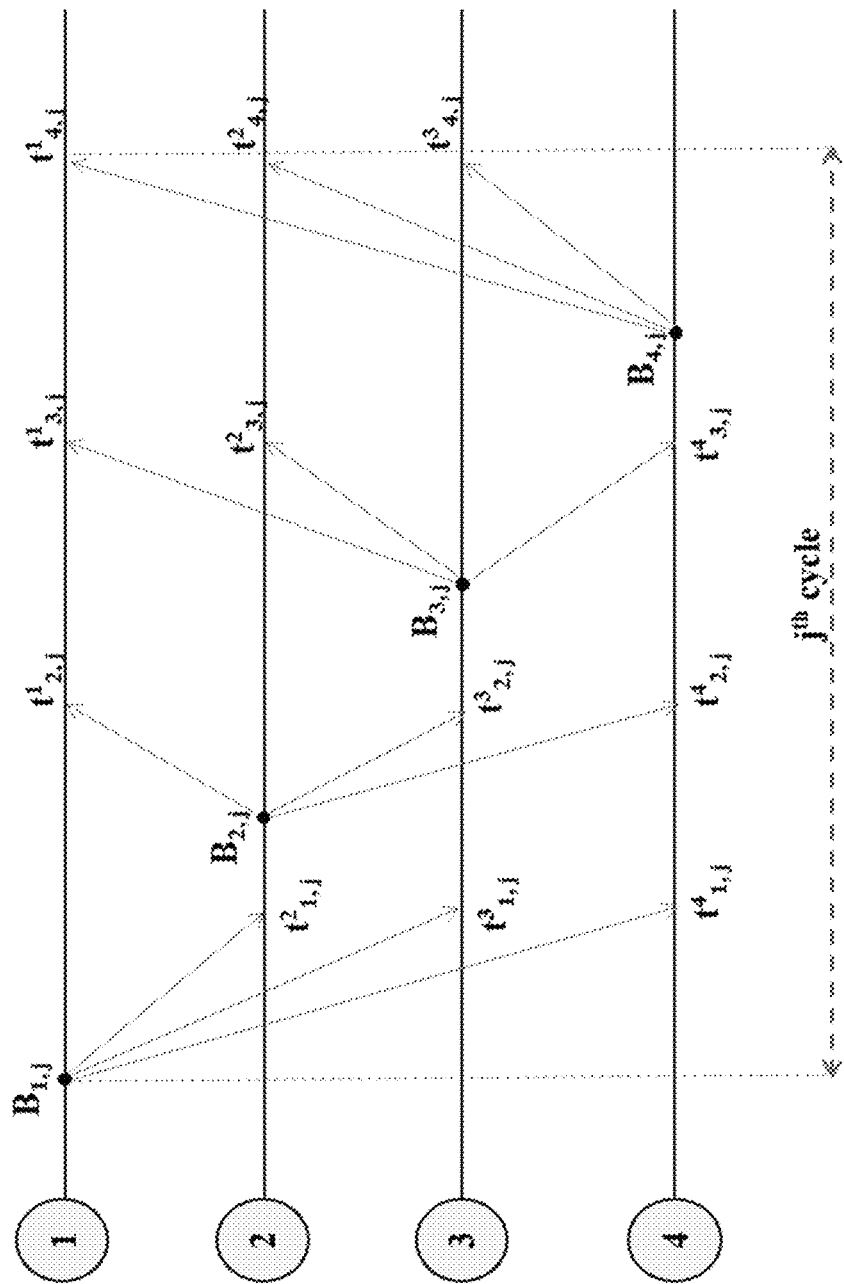
FIG. 5 is a time diagram illustrating R4Syn beacon broadcast during one cycle according to an exemplary embodiment herein.

FIG. 5 is a time diagram illustrating R4Syn beacon broadcast during one cycle according to an exemplary embodiment. $B_{i,j}$ denotes the $j^{th}$ beacon of node i, and $t_{i,j}^k$ denotes the reception timestamp at node k of the $j^{th}$ beacon of node i. For example, beacon $B_{4,j}$ would piggyback timestamps $t_{1,j}^4$, $t_{2,j}^4$, $t_{3,j}^4$. These timestamps are then used as samples to estimate relative skew and offset. More specifically, synchronization between Nodes 1 and 2 (i.e., Node 2's estimation of synchronization parameters with respect to Node 1) occur by gathering timestamp sample pairs $(t_{3,j}^1, t_{3,j}^2)$ and $(t_{4,j}^1, t_{4,j}^2)$.

After a sufficient number of beacons, each node obtains the same number of timestamps that can be arranged into a matrix of reception timestamps, $$T = \begin{bmatrix} * & t_{2,j}^1 & t_{3,j}^1 & t_{4,j}^1 \\ t_{1,j}^2 & * & t_{3,j}^2 & t_{4,j}^2 \\ t_{1,j}^3 & t_{2,j}^3 & * & t_{4,j}^3 \\ t_{1,j}^4 & t_{2,j}^4 & t_{3,j}^4 & * \end{bmatrix} \quad (4)$$

for one cycle of broadcasting, where the asterisk "*" denotes the broadcasting node. By observation, the location of a timestamp in the matrix T is the k-th row and the i-th column.

If $u_k$ and $v_k$, $k \in \{1, \ldots, I\}$, is denoted as the $k^{th}$ beacon reception timestamp of Nodes 1 and 2, respectively, then only beacons received by both nodes are used to construct timestamp samples, $(u_k, v_k)$. Using maximum-likelihood (ML) estimation, we obtain the resultant estimates for relative skew and offset using I broadcast messages (i.e., timestamp values) as $$f_{ML} = \frac{\sum_{k=1}^{I} u_k \sum_{k=1}^{I} v_k - I \sum_{k=1}^{I} v_k u_k}{\left(\sum_{k=1}^{I} v_k\right)^2 - I \sum_{k=1}^{K} v_k^2} \quad (5)$$

and $$O_{ML} = \frac{1}{I}\left\{\sum_{k=1}^{I} u_k - \frac{\sum_{k=1}^{I} u_k \sum_{k=1}^{I} v_k - I \sum_{k=1}^{I} v_k u_k}{\left(\sum_{k=1}^{I} v_k\right)^2 - I \sum_{k=1}^{K} v_k^2} \sum_{k=1}^{I} v_k\right\}. \quad (6)$$

For multi-hop environments, nodes perform multi-hop synchronization only on demand, where intermediate nodes forward local synchronization parameters to the communicating nodes to allow them to calculate multi-hop parameters. Node 1 needs to synchronize to a remote node q where the established route is $\{1, 2, 3, \ldots, q\}$. Each intermediate Node h is assumed to already have estimated parameters relating it to the next Node h+1 using the one-hop parameters in Equations (5) and (6) and forwards its estimates to Node 1. If we let $f_{j \to k}$ (respectively $O_{j \to k}$) denote the relative skew (respectively offset) of Node j to Node k, then the multi-hop estimators for the example are given as $$f_{q \to 1} = \prod_{j=1}^{q-1} f_{j+1 \to j} \quad (7)$$

and $$O_{q \to 1} = \sum_{j=2}^{q-1}\left[\left(\prod_{k=2}^{j} f_{k \to k-1}\right) O_{j+1 \to j}\right] + O_{2 \to 1}. \quad (8)$$

Simulation results that compare the mean-squared error of the proposed estimators and the corresponding Cramer-Rao lower bounds (CRLB) show that the proposed estimators' mean-squared error decrease and approach the CRLB as the number of broadcast messages increases.

The mean-squared error for the multi-hop skew estimator was also simulated in a multi-hop linear network of 10 nodes in [11]. Simulation results demonstrated that an increase of the number of messages improves the precision even with a higher number of hop values. Furthermore, results show that the mean-squared error is kept at an acceptable range for a small number of messages as well as a large number of hops.

In addition to the performance of R4Syn's estimators, there are other advantages that the protocol offers over RBS. Because R4Syn distributes the reference function among all nodes, there is no single point of failure as is the case with RBS. R4Syn also allows timestamps to be piggybacked to beacons so that the need for separate transmissions for exchanging timestamps is eliminated. It exploits the broadcast property of RBS, which takes advantage of the precision achieved through receiver-receiver synchronization.

Figure 6:
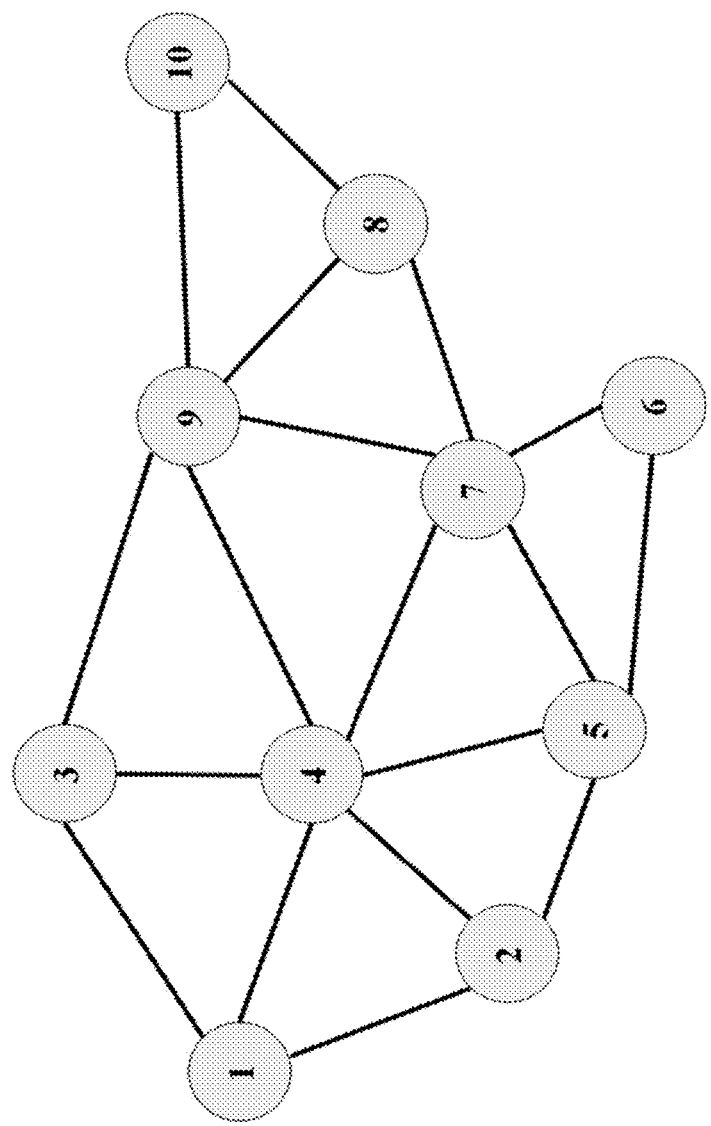
FIG. 6 illustrates an exemplary WSN topology to illustrate drawbacks to using R4Syn, according to an exemplary embodiment herein.

Despite the benefits that R4Syn offers, there are some potential flaws with the proposed protocol that are not addressed. FIG. 6 illustrates an exemplary WSN topology to illustrate drawbacks to using R4Syn, according to an exemplary embodiment herein. Nodes are depicted by circles labeled numerically and the solid black lines indicate that a pair of nodes can communicate. A concern is related to the sequence by which the nodes broadcast their beacons for a self-organized network. Node IDs are used to determine the order of the sequence and the beacons are broadcast sequentially, but how the order of the sequence is determined is not proposed. For the example of FIG. 6, it is assumed that the order of the sequence is a simple ascending order of node IDs. If Node 1 starts the beacon process, then Node 3 never knows to broadcast because it never receives a beacon from Node 2. Even if Node 3 knew to broadcast upon receiving a message from Node 1, there is a possibility of a collision at Node 4 from Node 2's and Node 3's broadcasts. If we continue the sequence order to Node 10 (last node), there is no way for Node 1 to know when to broadcast again and begin the next cycle. Another issue that R4Syn fails to address is how the entire network gets synchronized (i.e., to which node all other nodes synchronize).

An embodiment herein presents solution to the aforementioned drawbacks by presenting a new hybrid time synchronization scheme using R4Syn's methodology.

Network Time Synchronization in Multi-Hop WSN Using R4Syn-RSP Hybrid Protocol

An embodiment describes a methodology for an ad-hoc wireless sensor network to synchronize the nodes' clocks as precisely as possible. This new approach is rooted in the network's ability to determine a sequential order, or broadcast sequence, by which nodes transmit upon receiving a message from a neighbor node. This broadcast sequence allows the maximum number of nodes to transmit timestamp information sequentially in order to eliminate the possibility of collisions and to maximize the number of timestamp samples received by each node. As a node acquires more timestamp samples, it may be able to generate more accurate parameter estimation for relative skew and offset. Using the broadcast sequence, an embodiment collects and analyzes timestamp information to determine how nodes are synchronized and, if required, synchronize any neighbor nodes.

An embodiment uses a random deployment of unsynchronized sensor nodes that form an ad-hoc wireless sensor network. Every node may have the ability to communicate with at least one other node and discovery of one-hop neighbors is complete. In an embodiment, the network-wide synchronization methodology includes three steps: determining a broadcast sequence, conducting a sequence correction check, and synchronizing via any of R4Syn and RSP.

Figure 7:
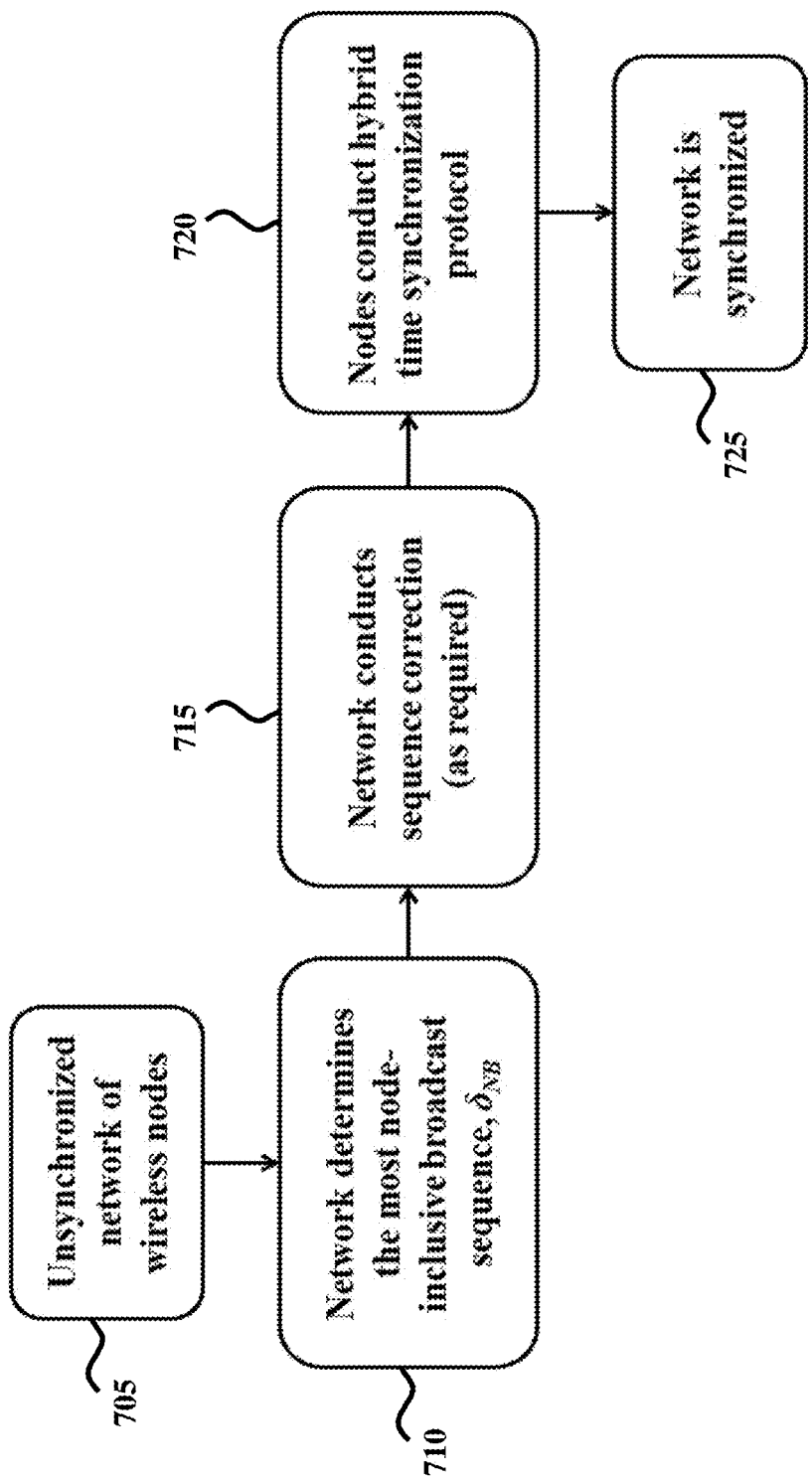
FIG. 7 is a flow diagram illustrating a method for time synchronization in a WSN according to an embodiment herein.

FIG. 7 is a flow diagram illustrating a method 700 for time synchronization in a WSN according to an embodiment herein. Method 700 begins at step 705 with an unsynchronized network of wireless nodes, with a starter node $\gamma_{SN}$ that is arbitrarily selected to initiate the broadcast sequence discovery and flood the network to begin the broadcast sequencing process. When the starter node $\gamma_{SN}$ receives sequence information back from its one-hop neighbors, it determines, at step 710, the most node-inclusive broadcast sequence $\delta_{NB}$ for the network and broadcasts the sequence to proceed with the scheme. Upon receiving $\delta_{NB}$, each subsequent node in the sequence, at step 715, performs a sequence correction check if required and proceeds with its broadcast according to its location in $\delta_{NB}$. The broadcast messages include all previous reception timestamps; thus information forwarding is a part of this methodology embodiment. By simply examining the timestamp information, each node determines the master reference node $\gamma_{MR}$, the node to which the entire network attempts to synchronize. The network then conducts a hybrid time synchronization technique, at step 720, using any of R4Syn and RSP parameter estimation. At step 725, the network is deemed synchronized.

Broadcast Sequencing

An embodiment presents a solution to the sequencing and collision problems of R4Syn. An embodiment discovers the most node-inclusive broadcast sequence $\delta_{NB}$, initiates a flood procedure by the starter node $\gamma_{SN}$, describe how sequences are determined by each node, and provide flow diagrams to illustrate the logic behind sequence determination.

Broadcast Sequencing Concept

Figure 8:
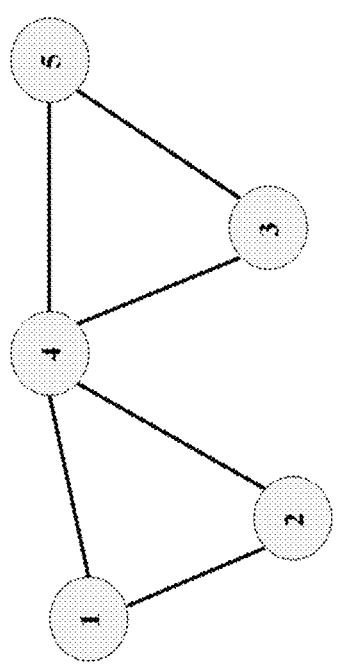
FIG. 8 is a schematic diagram illustrating a WSN according to an exemplary embodiment herein.

FIG. 8 is a schematic diagram illustrating a WSN according to an exemplary embodiment. In an embodiment, an arbitrarily chosen starter node $\gamma_{SN}$ initiates the synchronization methodology and floods the network after the nodes have been deployed. After the starter node $\gamma_{SN}$ receives pertinent information back from its one-hop neighbors, it attempts to determine a broadcast sequence that includes the maximum number of nodes in the network. In an exemplary embodiment, referring to FIG. 8, Node 1 is selected to be the starter node $\gamma_{SN}$, and Node 1 determines a broadcast sequence $\delta_{NB}$, for example, {1, 2, 4, 3, 5}. This indicates that Node 2 transmits after receiving Node 1's broadcast, Node 4 transmits after receiving Node 2's broadcast, Node 3 transmits after receiving Node 4's broadcast, and so on. If Node 4 was selected to be $\gamma_{SN}$, it still determines a $\delta_{NB}$ like {5, 3, 4, 1, 2} but not a sequence like {4, 3, 5, 2, 1}. In the latter case, not only does the sequence have an error since Nodes 2 and 5 are not neighbors, but also Node 2 never transmits because it never receives a broadcast from Node 5.

A reason for determining $\delta_{NB}$ is that whichever node is the starter node, $\delta_{NB}$ should include the maximum number of nodes in an order that nodes know when it is their turn to broadcast upon receiving a broadcast message from one of its neighbors. This eliminates any possibility of collisions because each node in $\delta_{NB}$ has its own turn to broadcast. When it is the broadcast turn of nodes in the beginning or end of $\delta_{NB}$, those beginning/end nodes reverse the sequence to continue the broadcast cycle. More specifically, using the example of Node 1 as $\gamma_{SN}$ with a $\delta_{NB}$ of {1, 2, 4, 3, 5}, Node 5 reverses the sequence to {5, 3, 4, 2, 1} and forwards that sequence during its turn so that Node 3 knows to broadcast next upon receiving the message from Node 5.

Flooding

In an embodiment, the synchronization methodology begins with the starter node $\gamma_{SN}$ flooding the network with an initialization message. In this flooding phase, nodes may simply exchange hop count information with their one-hop neighbors as the initialization message propagates throughout the network. The minimum number of hops from $\gamma_{SN}$ to a given node X is denoted as $H_{min}(X)$. Clearly, $$H_{min}(\gamma_{SN}) = 0. \quad (9)$$

After a Node X receives $H_{min}$ from all of its neighbors, it may determine its own $H_{min}$ as $$H_{min}(X) = \min(H_{min}(\Gamma_{Neighbors}(X))) + 1, \quad (10)$$

where $\Gamma_{Neighbors}(X)$ is defined as Node X's list of neighbors. Unlike a sequence like $\delta_{NB}$ where the order matters, the order of nodes in a list does not matter. Given the minimum hop count information, nodes define one-hop neighbor relationships according to $H_{min}$. If $H_{min}(X) = k$ hops, then the list of the parents of X, $\Gamma_P(X)$, is defined as one-hop neighbor nodes with $H_{min} = k-1$ hops. The list of the children of X, $\Gamma_C(X)$, is defined as one-hop neighbor nodes with a $H_{min} = k+1$ hops. The list of the friends of X, $\Gamma_F(X)$, is defined as one-hop neighbor nodes with the same value of $H_{min}$ as Node X. The one-hop neighbor relationships are summarized in Table 1.

TABLE 1

Summary of one-hop neighbor relationships.

| Minimum Number of Hops from $\gamma_{SN}$ ($H_{min}$) | Relationship to Node X |
|---|---|
| k − 1 | Parents of X |
| k | Friends of X |
| k + 1 | Children of X |

Figure 9:
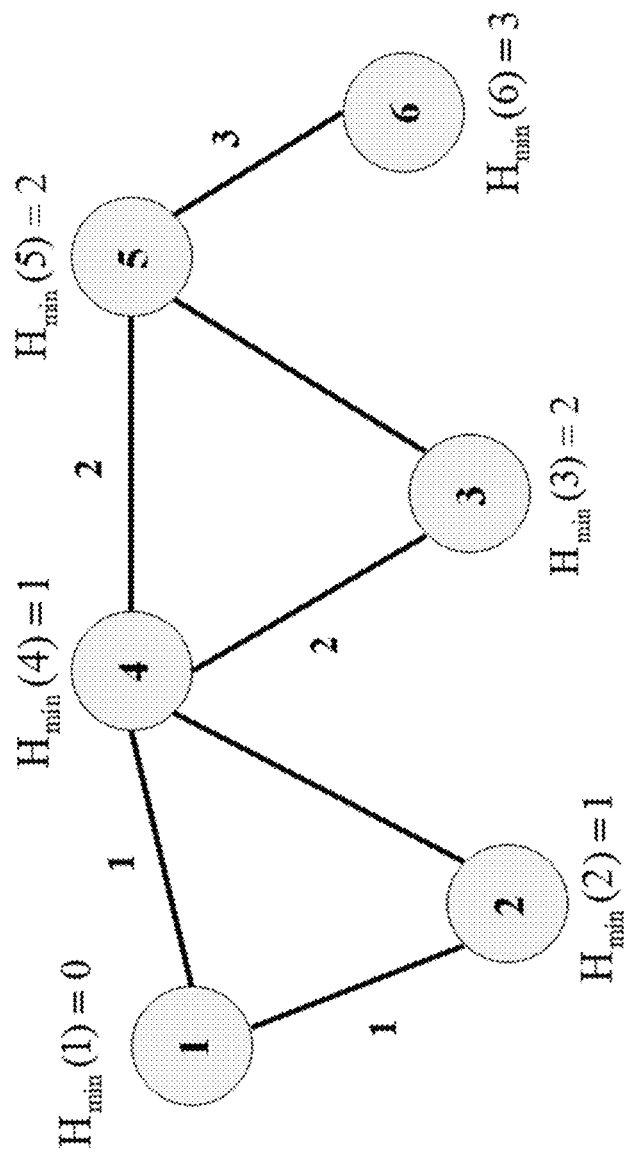
FIG. 9 is a schematic diagram of a WSN illustrating minimum hop counts according to an exemplary embodiment herein.

FIG. 9 is a schematic diagram of a WSN illustrating minimum hop counts according to an exemplary embodiment. Hop counts in the example of FIG. 9 are from the starter node, $\gamma_{SN}$=1, and are used to define a node's relationships to its neighbors. Node 4 defines its lists of one-hop neighbors as $\Gamma_P$ (4)=[1], $\Gamma_F$ (4)=[2], $\Gamma_C$ (4)=[3,5].

Network's Broadcast Sequence

According to the parent-friend-child relationships described previously, nodes without children may determine their sequences first. For a childless node L, its sequence is defined as $$\delta(L) \leftarrow \{L\}. \tag{11}$$

Next, the childless nodes broadcast their sequences to their parents, which also implies that all of the neighbors of the childless nodes receive the sequence information as well. Along with the sequences, those nodes send two additional items: their list of friends $\Gamma_F$ (L) and their total number of parents $N_P$ (L). When a parent node receives sequence information from all of its children, it determines its own sequence and sends it to its parents, and so on. Parent nodes also send their list of children $\Gamma_C$ in addition to their list of friends and the total number of parents. These items are used when a parent node has multiple children nodes with equal sequence/list lengths and needs to determine which child node's sequence is the most node-inclusive. This phase of the protocol is complete when the starter node $\gamma_{SN}$ receives sequences from all of its children and determines $\delta_{NB}$ for the network.

With reference to FIG. 9, an example describes how each node's sequence is determined. Node 1 is, for example, the starter node $\gamma_{SN}$. From Equation (11), we can see that $\delta(2) \leftarrow \{2\}$, $\delta(3) \leftarrow \{3\}$, and $\delta(6) \leftarrow \{6\}$ since those nodes do not have any children nodes. Those three nodes broadcast their sequences, list of friends, and number of parents immediately after determining their own sequence. Per the relationship definitions from the previous section, we see that Node 1 is a parent to Nodes 2 and 4, Node 4 is a parent to Nodes 3 and 5, and Node 5 is a parent to Node 6.

Node 5 has only one child node, Node 6. Node 6's sequence includes only its own ID, thus, Node 5 determines that $$\delta(5) \leftarrow \{\delta(6), 5\}. \tag{12}$$

Since $\delta(6) = \{6\}$, Node 5's sequence becomes $$\delta(5) = \{6, 5\}. \tag{13}$$

Node 5 then broadcasts $\delta(5)$, $\Gamma_F$ (5), $\Gamma_C$ (5), and $N_P$ (5) to its neighbors because it has received sequences from all of its children.

After Node 4 receives this broadcast from Node 5, it can determine its own sequence. Because Node 4 has two children nodes, Nodes 3 and 5, we begin by defining $$\Gamma_{RC}(4) = \Gamma_C(4) \tag{14}$$

where RC is a short notation for remaining children so that $\Gamma_{RC}$ (4)=[3,5]. Node 4 then finds Node 5 to have the longer sequence of the two children nodes, so it takes on Node 5's sequence as its own: $\delta(4)$ {$\delta(5)$}, or $\delta(4)=\{6,5\}$. Node 4's list of remaining children $\Gamma_{RC}$ (4) is updated by removing Node 5 from the list, so $\Gamma_{RC}$ (4)=[3]. We define the last node of a sequence as $$\gamma_{Last} = \delta(X)_{i=m} \, i=1,2,\ldots,m \tag{15}$$

where i is the index of the sequence of any node X, and m is the number of nodes in the sequence. So, in the case of Node 4, $\gamma_{Last}$=5. Next, Node 4 updates its sequence by examining $\gamma_{Last}$ and $\Gamma_F$ (3). Because $\gamma_{Last}$ is a member node of Node 3's list of friends $\Gamma_F$ (3), Node 4 updates its sequence as follows:

$$\delta(4)\{\delta(4), 3\}. \tag{16}$$

Figure 10:
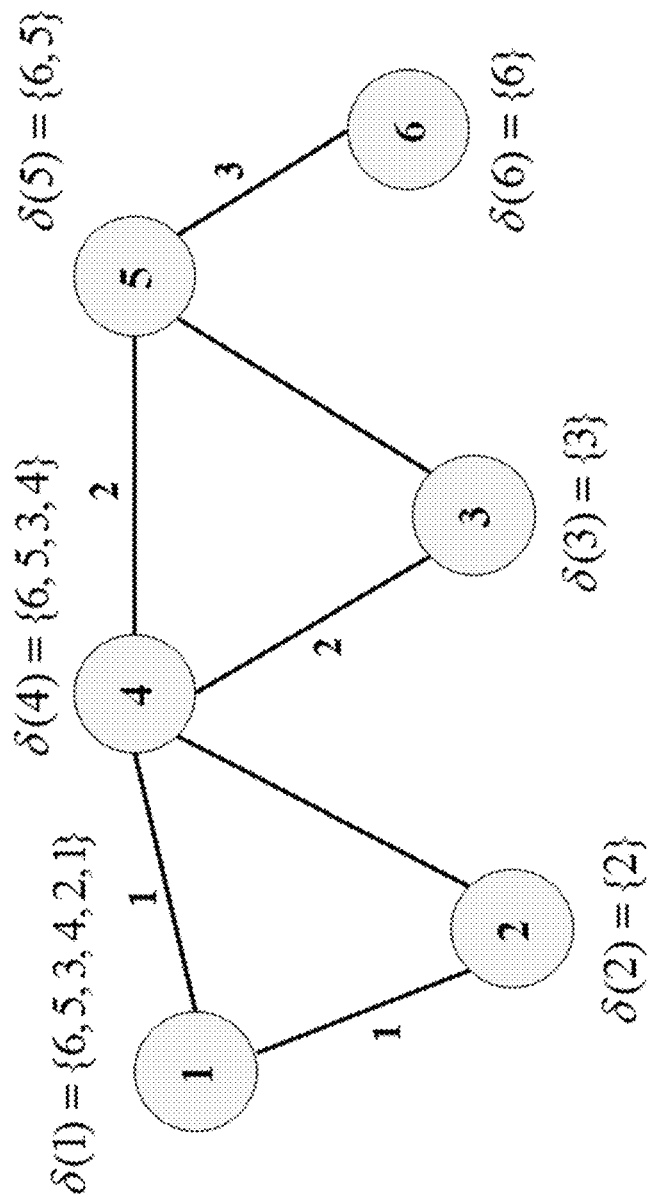
FIG. 10 is a schematic diagram illustrating final sequences for each node, according to the exemplary embodiment herein.

Because Node 3 was added to $\delta(4)$, Node 3 is removed from $\Gamma_{RC}$ (4) and $\Gamma_{RC}$ (4) becomes an empty list; that is, the number of its remaining children is zero. Node 4 completes its sequence by appending itself at the end, $\delta(4)$ {$\delta(4)$, 4} and, subsequently, broadcasts $\delta(4)$, $\Gamma_F$ (4), $\Gamma_C$ (4), and $N_P$ (4) so that its parent node, Node 1 (also the starter node $\gamma_N$), can determine $\delta_{NB}$ for the whole network. Because of this network's topology, Node 1 follows the same methodologyic steps as Node 4 to determine that $\delta_{NB}=\{6,5,3,4,2,1\}$, which includes every node in the network. This makes it an all-node-inclusive sequence because every node has a turn to broadcast, generating more timestamp samples to use the R4Syn estimators and synchronize with more precision. FIG. 10 is a schematic diagram illustrating final sequences for each node, according to the exemplary embodiment described with reference to FIG. 9.

Node 1 may commence the network time synchronization by first reversing $\delta_{NB}$ to {1, 2, 4, 3, 5, 6} and then broadcasting $\delta_{NB}$ as a message. The receiving nodes (Node 2 and 4) record the reception timestamps of Node 1's broadcast message. Node 2 knows to broadcast next because it is after Node 1 in $\delta_{NB}$ and Node 2 received the broadcast from Node 1. On the other hand, Node 4 knows to wait to broadcast until it receives a broadcast from Node 2, eliminating any possibility of a collision. As nodes receive subsequent broadcasts, they know when it is their respective turns to transmit depending on their location in $\delta_{NB}$. In an embodiment, nodes may use the reception timestamp information to conduct network time synchronization.

Figure 11:
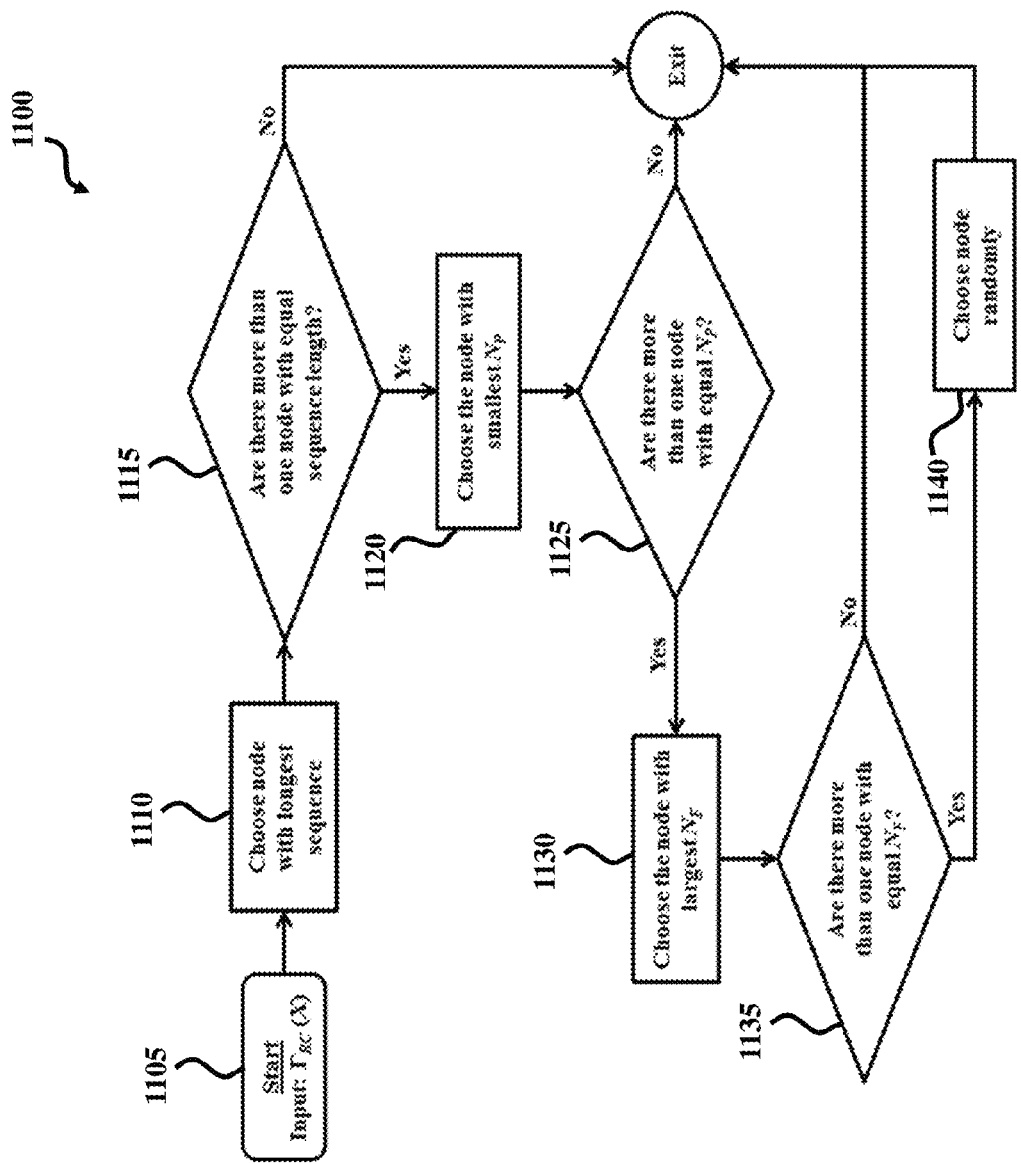
FIG. 11 is a flow diagram illustrating a method to choose the child node with the longest sequence, according to an embodiment herein.

FIG. 11 is a flow diagram illustrating a method 1100 to choose the child node with the longest sequence, according to an embodiment. At step 1105, method 1100 receives $\Gamma_{RS}$ (X) as an input. At step 1110, method 1100 chooses the node with longest sequence. At step 1115, method 1100 determines whether there are more than one node with equal sequence length. If there is no more than one node with equal sequence length, method 1100 ends. If there are more than one node with equal sequence length, at step 1120, method 1100 chooses the node with smallest $N_P$. At step 1125, method 1100 determines whether there are more than one node with equal $N_P$. If there is no more than one node with equal $N_P$, method 1100 ends. If there are more than one node with equal $N_P$, at step 1130, method 1100 chooses the node with largest $N_F$. At step 1135, method 1100 determines whether there are more than one node with equal $N_F$. If there is no more than one node with equal $N_F$, method 1100 ends. If there are more than one node with equal $N_F$, at step 1140, method 1100 chooses a node randomly as the child node with the longest sequence.

Figure 12:
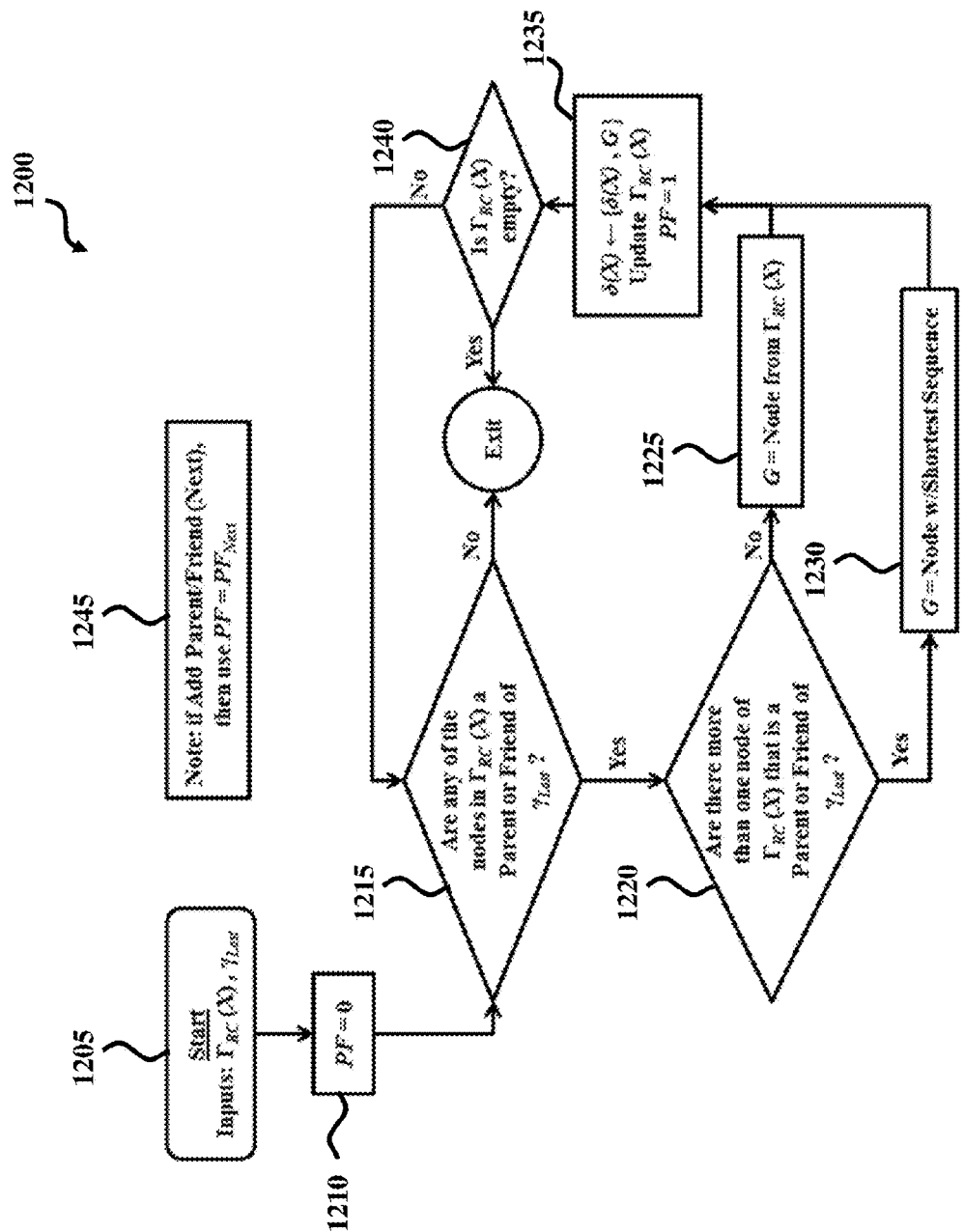
FIG. 12 is a flow diagram illustrating a method to add a parent or friend node to a sequence, according to an embodiment herein.

FIG. 12 is a flow diagram illustrating a method 1200 to add a parent or friend node to a sequence, according to an embodiment. At step 1205, method 1200 starts by receiving $\Gamma_{RS}$ (X) and $\gamma_{Last}$ as input. At step 1210, method 1200 assigns zero to PF. At step 1215, method 1200 determines whether any of the nodes in $\Gamma_{RC}(X)$ are a parent or a friend of $\gamma_{Last}$. If none of the nodes in $\Gamma_{RC}(X)$ are a parent or a friend of $\gamma_{Last}$, method 1200 ends. If any of the nodes in $\Gamma_{RC}(X)$ are a parent or a friend of $\gamma_{Last}$, at step 1220, method 1200 determines whether there are more than one node of $\Gamma_{RC}(X)$ that are a parent or a friend of $\gamma_{Last}$. If there are no more than one node of $\Gamma_{RC}(X)$ that are a parent or a friend of $\gamma_{Last}$, at step 1225, method 1200 assigns a temporary set G to be the nodes in $\Gamma_{RC}(X)$. If there are more than one node of $\Gamma_{RC}(X)$ that are a parent or a friend of $\gamma_{Last}$, at step 1230, method 1200 assigns a temporary set G to be a node with shortest sequence. At step 1235, method 1200 updates $\delta(X)$ to be $\{\delta(X), G\}$, updates $\Gamma_{RC}(X)$ and assigns PF to be 1. At step 1240, method 1200 determines whether $\Gamma_{RC}(X)$ is empty. If $\Gamma_{RC}(X)$ is empty, method 1200 ends. If $\Gamma_{RC}(X)$ is not empty, method 1200 repeats steps 1215 to 1240. If method 1200 adds parent/friend in the next cycle, it uses $PF=PF_{Next}$ as shown in 1245.

Figure 13:
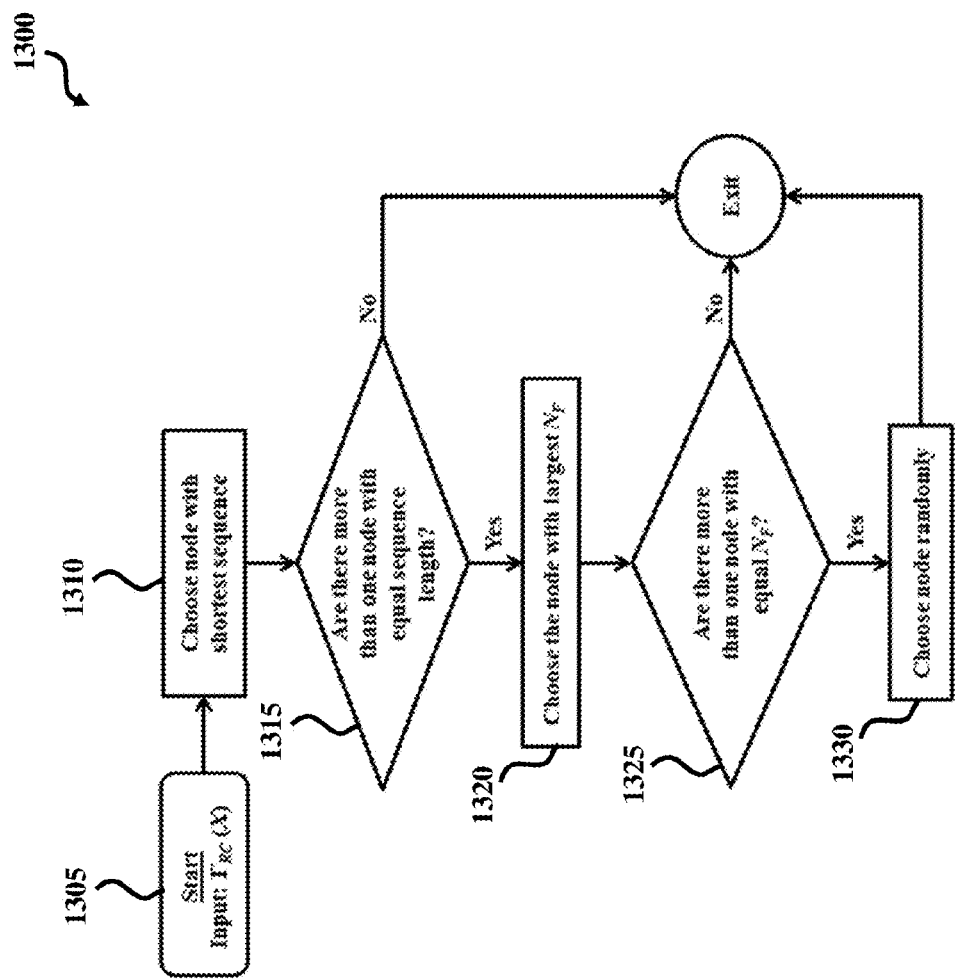
FIG. 13 is a flow diagram illustrating a method to find the node with the shortest sequence, according to an embodiment herein.

FIG. 13 is a flow diagram illustrating a method 1300 to find the node with the shortest sequence, according to an embodiment. At step 1305, method 1300 receives $\Gamma_{RC}(X)$ as an input. At step 1310, method 1300 chooses a node with shortest sequence. At step 1315, method 1300 determines whether there are more than one node with equal sequence length. If there are not more than one node with equal sequence length, method 1300 ends. If there are more than one node with equal sequence length, at step 1320, method 1300 chooses the node with largest $N_F$. At step 1325, method 1300 determines whether there are more than one node with equal $N_F$. If there are not more than one node with equal $N_F$, method 1300 ends. If there are more than one node with equal $N_F$, at step 1330, method 1300 chooses a node randomly.

Figure 14:
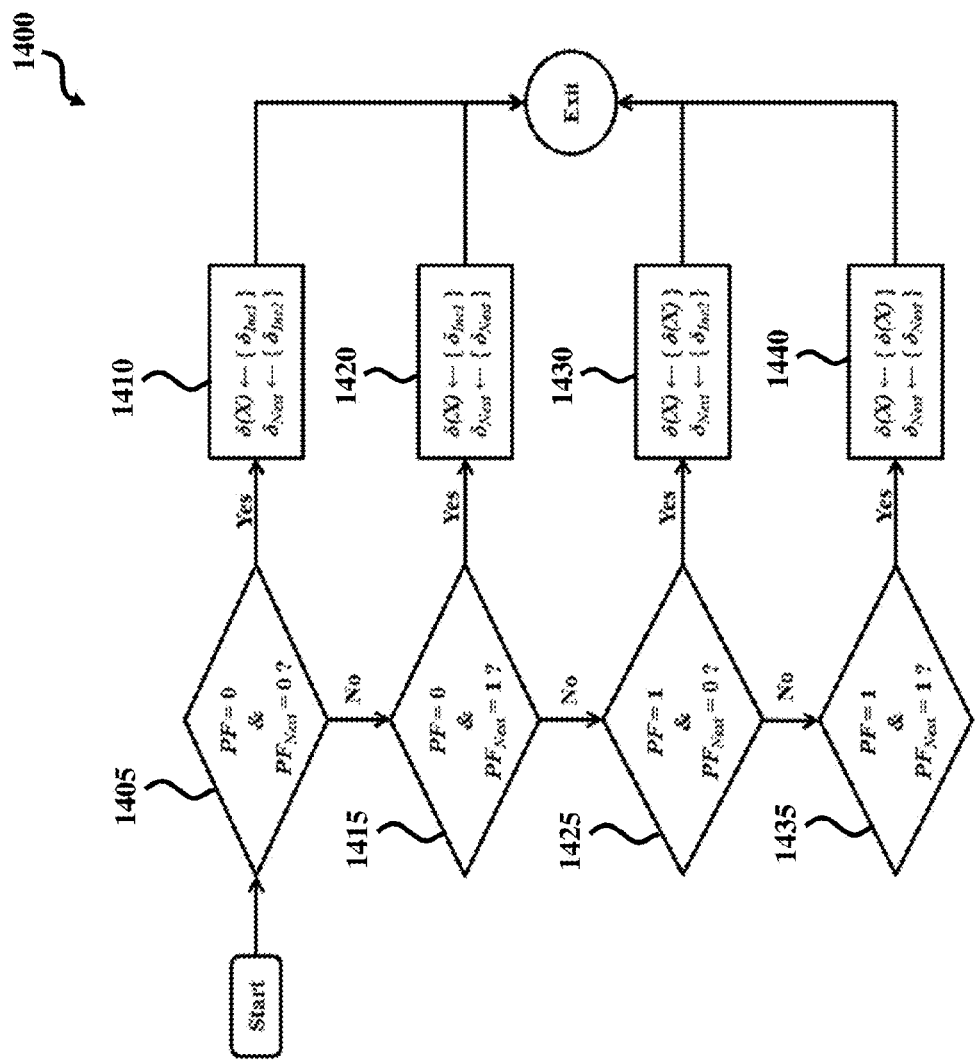
FIG. 14 is a flow diagram illustrating a method according to an embodiment herein.

FIG. 14 is a flow diagram illustrating a method 1400 for updating $\delta(X)$ and $\delta_{Next}$, according to an embodiment. At step 1405, method 1400 determines whether PF=0 and $PF_{Next}=0$. If PF=0 and $PF_{Next}=0$, at step 1410, method 1400 assigns $\{\delta_{Inc1}\}$ to $\delta(X)$, and $\{\delta_{Inc2}\}$ to $\delta_{Next}$. If PF≠0 or $PF_{Next}≠0$, at step 1415, method 1400 determines whether PF=0 and $PF_{Next}=1$. If PF=0 and $PF_{Next}=1$, at step 1420, method 1400 assigns $\{\delta_{Inc1}\}$ to $\delta(X)$, and $\{\delta_{Next}\}$ to $\delta_{Next}$. If PF≠0 or $PF_{Next}≠1$, at step 1425, method 1400 determines whether PF=1 and $PF_{Next}=0$. If PF=1 and $PF_{Next}=0$, at step 1430, method 1400 assigns $\{\delta(X)\}$ to $\delta(X)$, and $\{\delta_{Inc2}\}$ to $\delta_{Next}$. If PF≠1 or $PF_{Next}$ #0, at step 1435, method 1400 determines whether PF=1 and $PF_{Next}=1$. If PF=1 and $PF_{Next}=1$, at step 1440, method 1400 assigns $\{\delta(X)\}$ to $\delta(X)$, and $\{\delta_{Next}\}$ to $\delta_{Next}$.

Figure 15A:
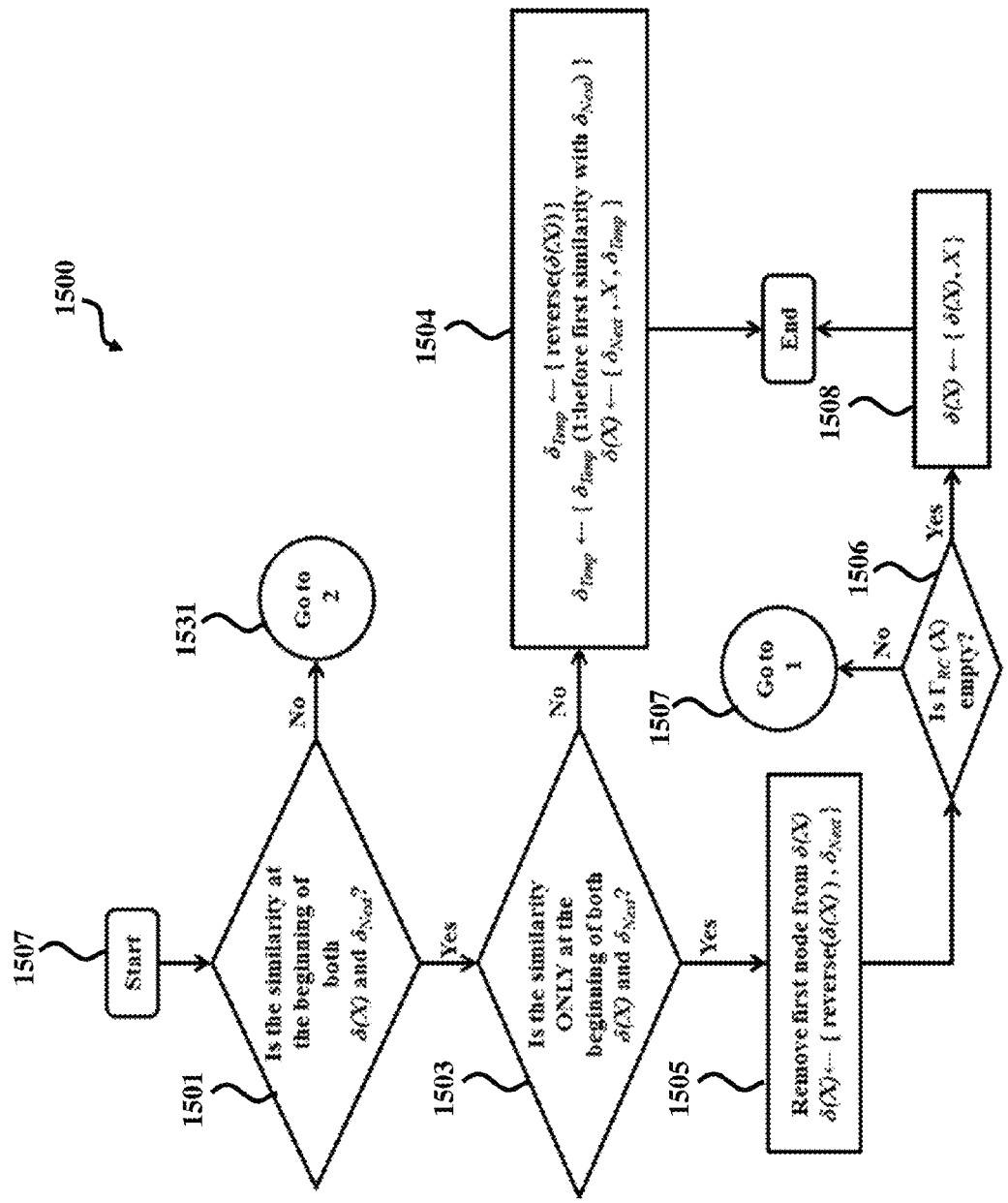
FIG. 15A is a flow diagram illustrating a method according to an embodiment herein.
Figure 15B:
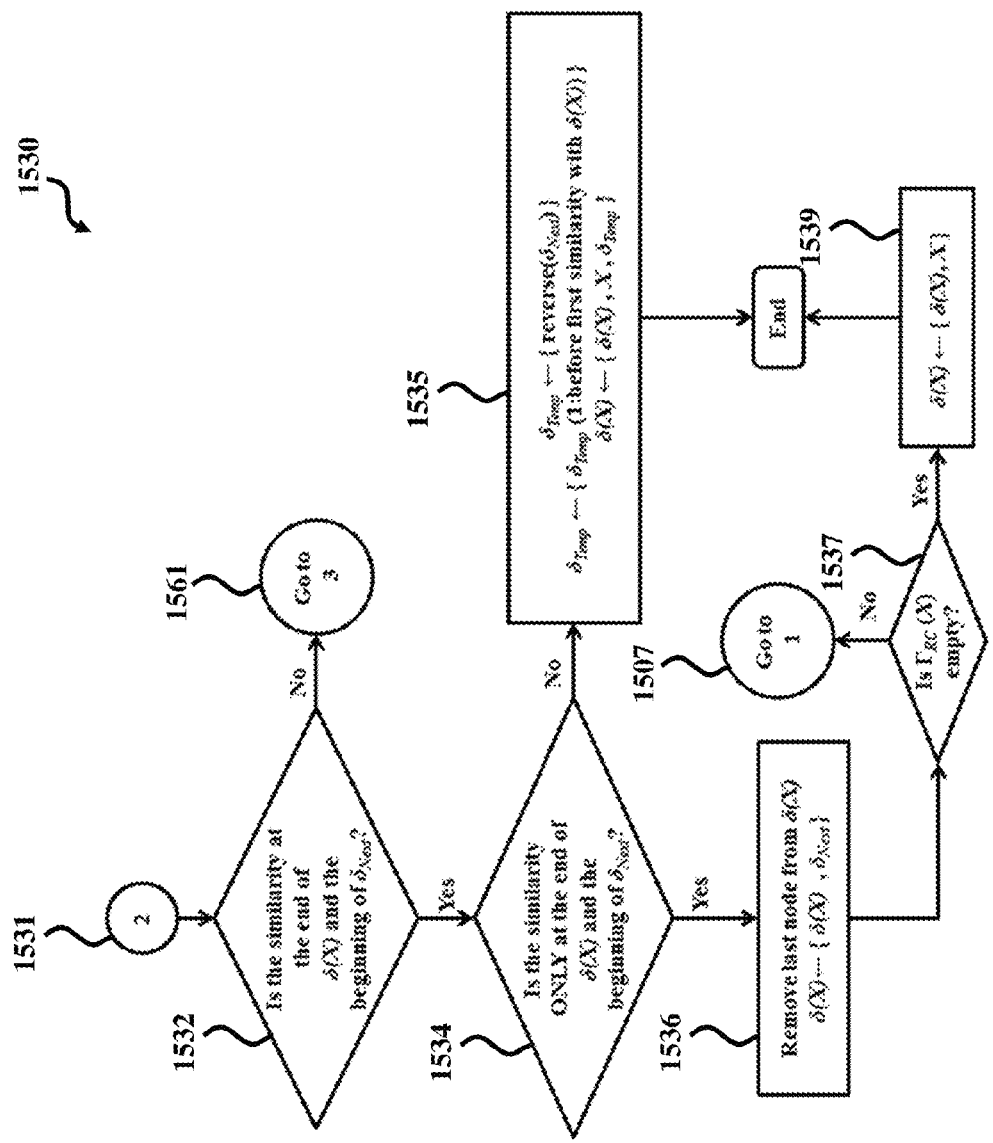
FIG. 15B is a flow diagram illustrating a method according to an embodiment herein.
Figure 15C:
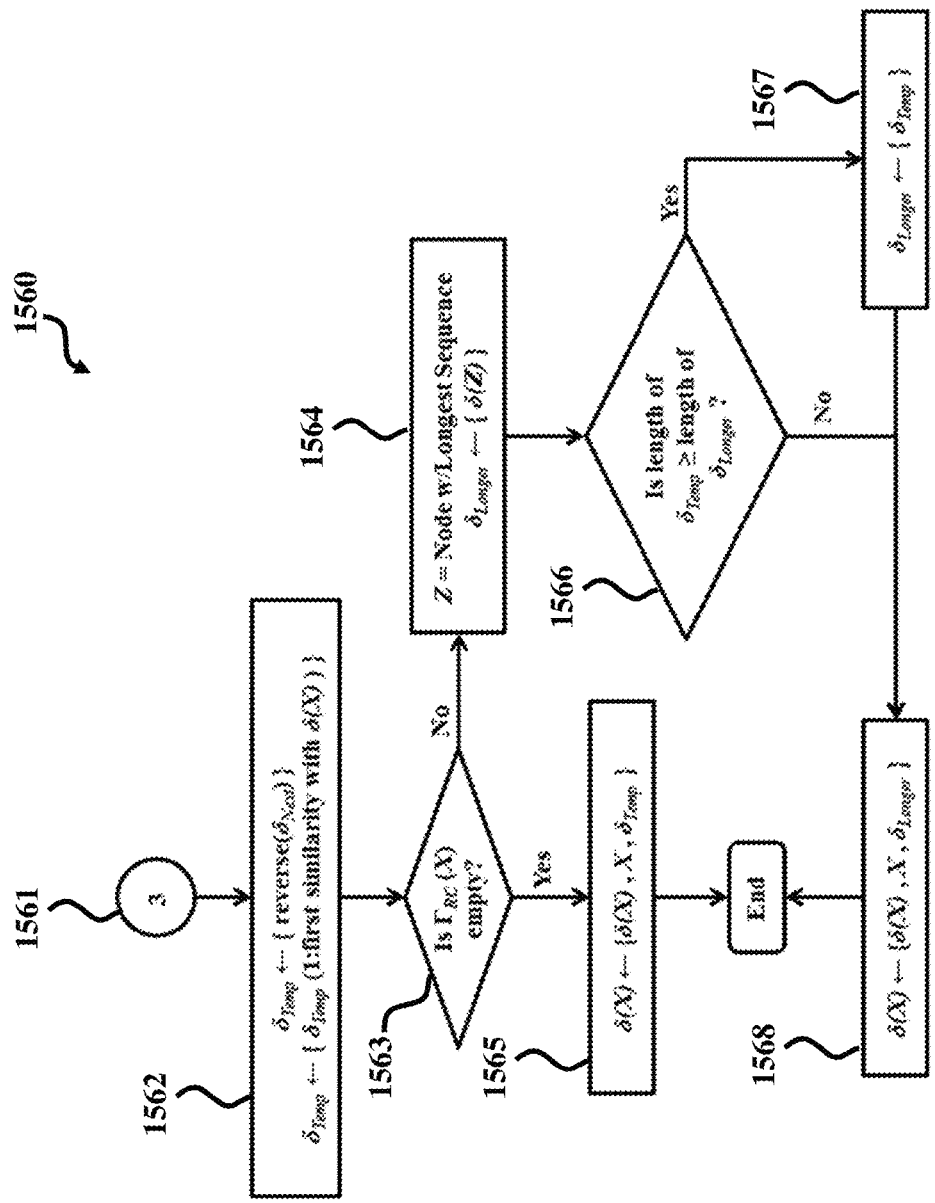
FIG. 15C is a flow diagram illustrating a method according to an embodiment herein.

FIGS. 15A through 15C are flow charts illustrating exemplary methods with $\delta_{Temp}=\{5,4,3,2,1\}$ and $\delta_{Next}\{7, 8, 3, 9, 6\}$; where $\delta_{Temp}$ (1:before first similarity with $\delta_{Next}$) refers to the sequence $\{5, 4\}$ since the first similarity between $\delta_{Temp}$ and $\delta_{Next}$ is Node 3, therefore $\delta_{Temp}$ is adjusted to only include $\{5, 4\}$.

FIG. 15A is a flow diagram illustrating a method 1500 for adjusting $\delta(X)$ for similarities. In step 1501, method 1500 determines whether there are similarities at the beginning of both $\delta(X)$ and $\delta_{Next}$. If method 1500, at step 1501, determines that there are no similarities at the beginning of both $\delta(X)$ and $\delta_{Next}$, method 1500 continues to step 1531 of method 1530. If method 1500, at step 1501, determines that there are similarities at the beginning of both $\delta(X)$ and $\delta_{Next}$, at step 1503, method 1500 determines whether there is similarity only at the beginning of both $\delta(X)$ and $\delta_{Next}$.

If method 1500, at step 1503, determines that there is not similarities at the beginning of both $\delta(X)$ and $\delta_{Next}$, at step 1504, method 1500 assigns $\{reverse(\delta(X))\}$ to $\delta_{Temp}$, assigns $\{\delta_{Temp}$ (1:before first similarity with $\delta_{Next}$)$\}$ to $\delta_{Temp}$, and assigns $\{\delta_{Next}, X, \delta_{Temp}\}$ to $\delta(X)$. If method 1500, at step 1503, determines that there is similarities at the beginning of both $\delta(X)$ and $\delta_{Next}$ at step 1505, method 1500 removes first node from $\delta(X)$ and assigns $\{reverse(\delta(X)), \delta_{Next}\}$, to $\delta(X)$.

At step 1506, method 1500 determines whether $\Gamma_{RC}(X)$ is empty. If $\Gamma_{RC}(X)$ is not empty, method 1500 starts over at step 1507. If $\Gamma_{RC}(X)$ is empty, method 1500, at step 1508 assigns $\{\delta(X), X\}$ to $\delta(X)$.

FIG. 15B is a flow diagram illustrating a method 1530 for adjusting $\delta(X)$ for similarities. In step 1532, method 1530 determines whether there are similarities at the end of $\delta(X)$ and the beginning of $\delta_{Next}$. If method 1530, at step 1532, determines that there are no similarities at the end of $\delta(X)$ and the beginning of $\delta_{Next}$, method 1530 continues to step 1561 of method 1560. If method 1530, at step 1532, determines that there are similarities at the end of $\delta(X)$ and the beginning of $\delta_{Next}$, at step 1534, method 1530 determines whether there is similarity only at the end of both $\delta(X)$ and the beginning of $\delta_{Next}$.

If method 1530, at step 1534, determines that there is not similarities at the end of $\delta(X)$ and the beginning of $\delta_{Next}$, at step 1535, method 1530 assigns $\{reverse(\delta(X))\}$ to $\delta_{Temp}$, assigns $\{\delta_{Temp}$ (1:before first similarity with $\delta(X)$)$\}$ to $\delta_{Temp}$, and assigns $\{\delta(X), X, \delta_{Temp}\}$ to $\delta(X)$. If method 1530, at step 1534, determines that there is similarities at the end of $\delta(X)$ and the beginning of $\delta_{Next}$, at step 1536, method 1530 removes last node from $\delta(X)$ and assigns $\{\delta(X), \delta_{Next}\}$ to $\delta(X)$.

At step 1537, method 1500 determines whether $\Gamma_{RC}(X)$ is empty. If $\Gamma_{RC}(X)$ is not empty, method 1500 starts over. If $\Gamma_{RC}(X)$ is empty, method 1500, at step 1539 assigns $\{\delta(X), X\}$ to $\delta(X)$.

FIG. 15C is a flow diagram illustrating a method 1560 for adjusting $\delta(X)$ for similarities. At step 1562, method 1560 assigns $\{reverse(\delta_{Next})\}$ to $\delta_{Temp}$ and assigns $\{\delta_{Temp}$ (1:before first similarity with $\delta(X)$)$\}$ to $\delta_{Temp}$. At step 1563, method 1560 determines whether $\Gamma_{RC}(X)$ is empty. If $\Gamma_{RC}(X)$ is empty, method 1500, at step 1565, assigns $\{\delta(X), X, \delta_{Temp}\}$ to $\delta(X)$. If $\Gamma_{RC}(X)$ is not empty, method 1500, at step 1564, assigns $\{\delta(Z)\}$ to $\delta_{Longer}$, where Z is a node with longest sequence. At step 1566, method 1560 determines whether the length of $\delta_{Temp}$ is greater than the length of $\delta_{Longer}$. If the length of $\delta_{Temp}$ is greater than the length of $\delta_{Longer}$, method 1560, at step 1567, assigns $\{\delta_{Temp}\}$ to $\delta_{Longer}$, at step 1568, assigns $\{\delta(X), X, \delta_{Longer}\}$ to $\delta(X)$. If the length of $\delta_{Temp}$ is not greater than the length of $\delta_{Longer}$, method 1560, at step 1568, assigns $\{\delta(X), X, \delta_{Longer}\}$ to $\delta(X)$.

Figure 16:
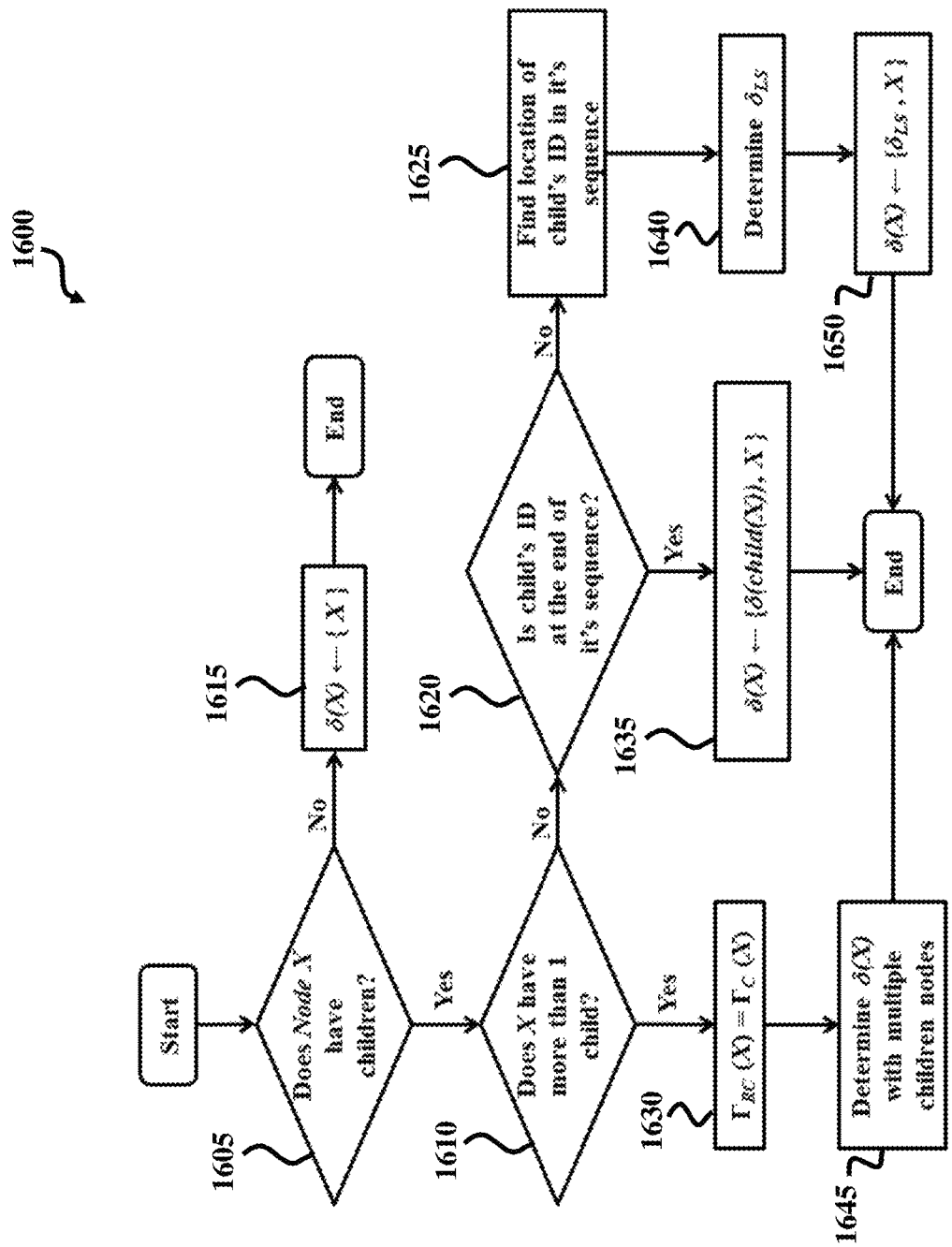
FIG. 16 is a flow diagram illustrating a method according to an embodiment herein.

FIG. 16 is a flow diagram illustrating a method 1600 for sequence determination for nodes with less than two children nodes, according to an embodiment. When method 1600, at step 1605, determines a node has only one child node, at steps 1620 and 1625, it checks to see where that child's ID is with respect to its own sequence. For example, if Node 2 has a child Node 3 with a sequence of $\delta(3)=\{6, 5,1,3,2,4\}$, it sees that Node 3's ID is in the fourth index of this sequence. The sequence, $\delta_{LS}$ (short for longer side), is $\{6,5,1,3\}$ because it contains more nodes in that sequence than the right half of the sequence ($\{3,2,4\}$). After completing Node 2's sequence according to method 1600, $\delta(2)=\{6, 5,1,3,2\}$. In step 1605, if Node X does not have any children, the $\delta(X)=\{X\}$ and the process ends. Step 1610 determines if there are more than one child node. If yes, then in step 1630, $\Gamma_{RC}(X)=\Gamma_C(X)$, and $\delta(X)$ is determined at step 1645 with multiple children nodes, else the process goes to step 1620.

In step 1620, it is determined if the child's ID is at the end of the sequence. If yes, then in step 1635 $\delta(X) \leftarrow \{\delta(\text{child})(X), X\}$ and then the process ends, else no the process moves to step 1625 to find the location of the child's ID in the sequence. Here, is determined at step 1640 and then $\delta(X) \leftarrow \{\delta_{LS}, X\}$ is determined in step 1650.

In an embodiment, when a node has more than one child node, there are more methodologyic steps to determine its sequence. For example, a generic node 5, with three children nodes: 1, 3, and 8. Therefore $\Gamma_{RC}(5)=[1,3,8]$. The child node with the longest sequence is denoted as Node A. In order to determine its sequence, Node 5 first chooses the child node A, say Node 1, so A=1. Node 1's sequence is, for example, $\{7,6,4,1,2\}$, so Node 5 updates its sequence with Node 1's sequence (i.e., $\delta(5)=\{7,6,4,1,2\}$).

Figure 17:
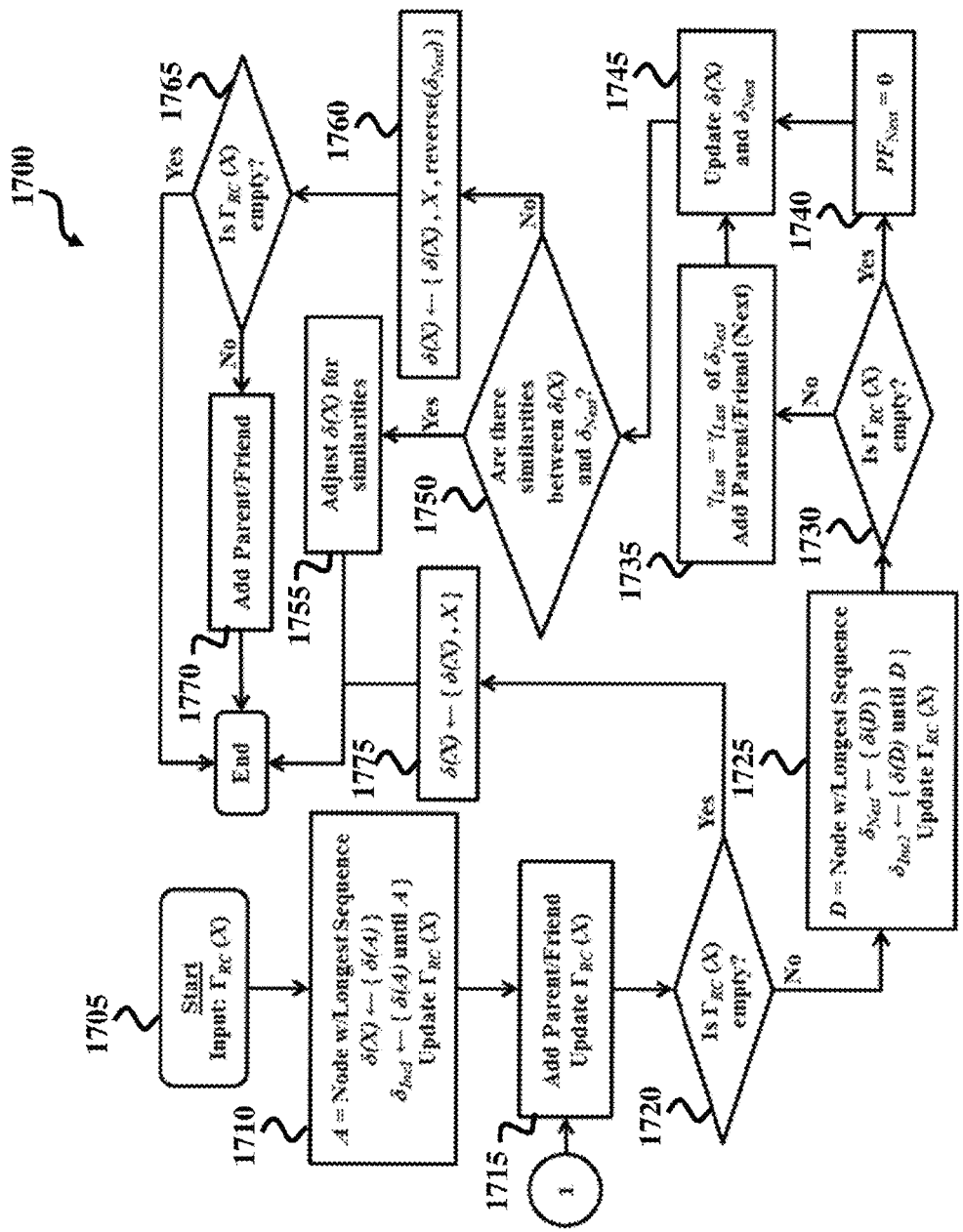
FIG. 17 is a flow diagram illustrating a method according to an embodiment herein.

FIG. 17 is a flow diagram illustrating a method 1700 for sequence determination for nodes with multiple children nodes, according to an embodiment. $\delta_{Inc1}$ denotes node A's sequence up to and including its ID. For example, refereeing to the example above with reference to FIG. 15, in Node 1's case $\delta_{Inc1}=\{7, 6, 4, 1\}$. The sequence $\delta_{Inc1}$ is potentially used in Node 5's sequence determination depending on the sequence of the child node D with the next longest sequence. The same concept applies to $\delta_{Inc2}$, which is denoted as Node D's sequence up to and including its ID.

Node 5 updates its list of remaining children by removing Node 1 from $\Gamma_{RC}(5)$ since Node 1 was added onto Node 5's sequence, so now $\Gamma_{RC}(5)=[3, 8]$. The last node $\gamma_{Last}=2$ since $\delta(5)=\{7,6,4,1,2\}$. If Node 3 is a parent (or friend) of Node 2, so Node 3 is added onto Node 5's sequence (i.e., $\delta(5)=\{7, 6, 4, 1, 2, 3\}$). The add parent/friend function is illustrated in FIGS. 11 through 15, where the variable PF is assigned a logical 1 (i.e., PF=1) if a node is added to the sequence during the function and a logical 0 otherwise (i.e., PF=0). Node 5's list of remaining children is consequently updated to $\Gamma_{RC}(5)=[8]$ since Node 3 was added onto Node 5's sequence.

At step 1720 of method 1700, Node 5 checks to see if its list of remaining children $\Gamma_{RC}(5)$ is empty, which it is not. So at step 1725 Node 5 chooses Node 8 as D, the child node with the next longest sequence (which, in this case, Node 8 is the only child node left and has the next longest sequence by default). Say Node 8's sequence is $\delta(8)=\{11,9,8,10\}$. Node 5 then sets the next sequence $\delta_{Next}$ as Node 8's sequence (i.e., $\delta_{Next}=\{11,9,8,10\}$), and $\delta_{Inc2}=\{11,9,8\}$ according to the same logic as $\delta_{Inc1}$. Next, Node 5 updates its list of remaining children by removing Node 8, making $\Gamma_{RC}(5)$ empty. Per FIG. 12, the value $PF_{Next}=0$. Node 5 then updates its sequence $\delta(5)$ and $\delta_{Next}$ according to the PF and $PF_{Next}$ values, which is illustrated in FIGS. 11 through 15. For this example, $\delta(5)=\{7,6,4,1,2,3\}$ since PF=1, and $\delta_{Next}$ $\delta_{BL}=\{11,9,8\}$ since $PF_{Next}=0$.

At step 1750 of method 1700, Node 5 checks for similarities between its sequence and $\delta_{Next}$, which it does not have. Therefore, at step 1760, Node 5 updates its sequence $\delta(5) \leftarrow \{\delta(5), 5, \text{reverse}(\delta_{Next})\}$, where reverse($\delta_{Next}$) is simply reversing $\delta_{Next}$ (i.e., $\{8,9,11\}$). Node 5's sequence thus becomes $\delta(5)=\{7,6,4,1,2,3,5,8,9,11\}$. Since Node 5's list of remaining children is empty, it completes its sequence determination.

If there are similarities between $\delta(5)$ and $\delta_{Next}$, then Node 5, at step 1755, adjusts its sequence with reference to the flow charts of FIGS. 11-15. The input 1 in method 1700 is a recursive step from some of the functions in FIGS. 11-15.

In process 1700, $\Gamma_{RC}(X)$ is input at step 1705. Then, in step 1710, A=the node with the longest sequence. $\delta(X)$ $\{\delta(A)\}$ and $\delta_{Inc1} \leftarrow \{\delta(A) \text{ until } A\}$ and $\Gamma_{RC}(X)$ is updated. Then, in step 1715 the parent/friend node is added and $\Gamma_{RC}(X)$ is updated. Then, it is determined whether $\Gamma_{RC}(X)$ is empty in step 1720. If yes, then $\delta(X) \leftarrow \{\epsilon(X), X\}$ in step 1775, and the process ends. If no, then in step 1725, D=the node with the longest sequence. $\delta_{Next} \leftarrow \{\delta(D)\}$ and $\delta_{Inc1}\{\delta(D) \text{ until } D\}$ and $\Gamma_{RC}(X)$ is updated. Thereafter, in step 1730 it is determined whether $\Gamma_{RC}(X)$ is empty. If yes, then $PF_{Next}=0$ in step 1740. If no, then in step 1735, $\gamma_{Last}=\gamma_{Last}$ of $\delta_{Next}$ and the parent/friend node is added. Thereafter steps 1735, 1740 $\delta(X)$ and $\delta_{Next}$ are updated in step 1745. Next, in decision step 1750 is determined whether there are similarities between $\delta(X)$ and $\delta_{Next}$. If yes, then in step 1755, $\delta(X)$ are adjusted for similarities, and the process 1700 ends. If no, then in step 1760 $\delta(X) \leftarrow \{\delta(X), X, \text{reverse}(\delta_{Next})\}$. Thereafter, in decision step 1765 it is determined whether $\Gamma_{RC}(X)$ is empty. If yes, then the process 1700 ends. If no, then the parent/friend node is added in step 1770, and the process 1700 ends.

Sequence Correction

In an embodiment, the sequence correction check can be conducted simultaneously with the network time synchronization as the initial broadcast sequence $\delta_{NB}$ is forwarded across the network because only reception timestamps of the broadcast messages are required for this. For illustration purposes, the sequence correction check is described as an independent step.

Figure 18:
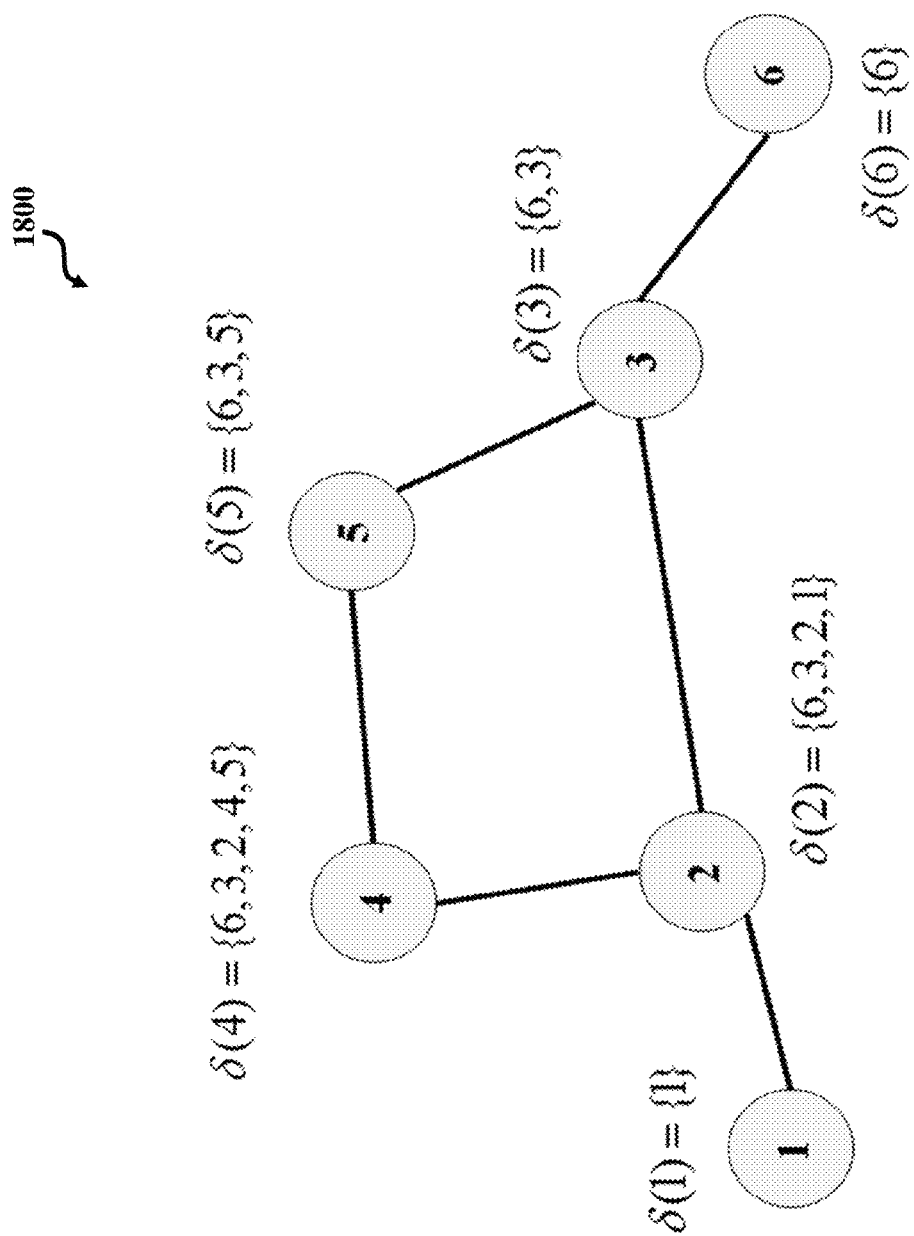
FIG. 18 is a schematic diagram illustrating a WSN, according to an exemplary embodiment herein.

The purpose of the sequence correction is to add nodes into $\delta_{NB}$ that were potentially left out. As $\delta_{NB}$ is forwarded within the network, each node performs an additional sequence correction check before its broadcast. FIG. 18 is a schematic diagram illustrating the need for a sequence correction step 1800 in a WSN, according to an exemplary embodiment. Node 4 does not determine a broadcast sequence that includes all nodes in the network. When Node 4 is the starter node $\gamma_{SN}$, it generates $\delta_{NB}=\{6,3,2,4,5\}$, which is not all inclusive because Node 1 is missing from the sequence. When Node 5 is the starter node $\gamma_{SN}$, it also generates a $\delta_{NB}$ that is not all inclusive. In an embodiment, the methodology without a sequence correction measure produces a final $\delta_{NB}$ that is not all inclusive a third of the time for this topology. In order to alleviate this drawback, an embodiment uses an additional step for each node as the pre-sequence-corrected $\delta_{NB}$ is forwarded across the network.

In the example topology of FIG. 18, Nodes 6 and 5 are at the beginning and end of $\delta_{NB}$, respectively, and the neighbors of both nodes are included in $\delta_{NB}$. If one of those nodes had a neighbor that was not included in $\delta_{NB}$, they append that neighbor to the beginning or end of $\delta_{NB}$; however, Node 1 is the node that is not in $\delta_{NB}$, so Node 1 is denoted as a lone neighbor, $\gamma_{LN}$. In this case, Node 2 adds a field to its broadcast message indicating that $\gamma_{LN}=1$, which is forwarded throughout the network. Each node does a sequence correction check and either performs an action or ignores the $\gamma_{LN}$ field. For this example, Node 5 knows that Node 3 is a neighbor node, so it adjusts $\delta_{NB}$ to $\{2,4,5,3,6\}$. Now that Node 2 is at the beginning of $\delta_{NB}$, it can append Node 1 to the beginning of the sequence so that $\delta_{NB}=\{1, 2, 4, 5, 3, 6\}$, which includes all nodes in the network.

Figure 19:
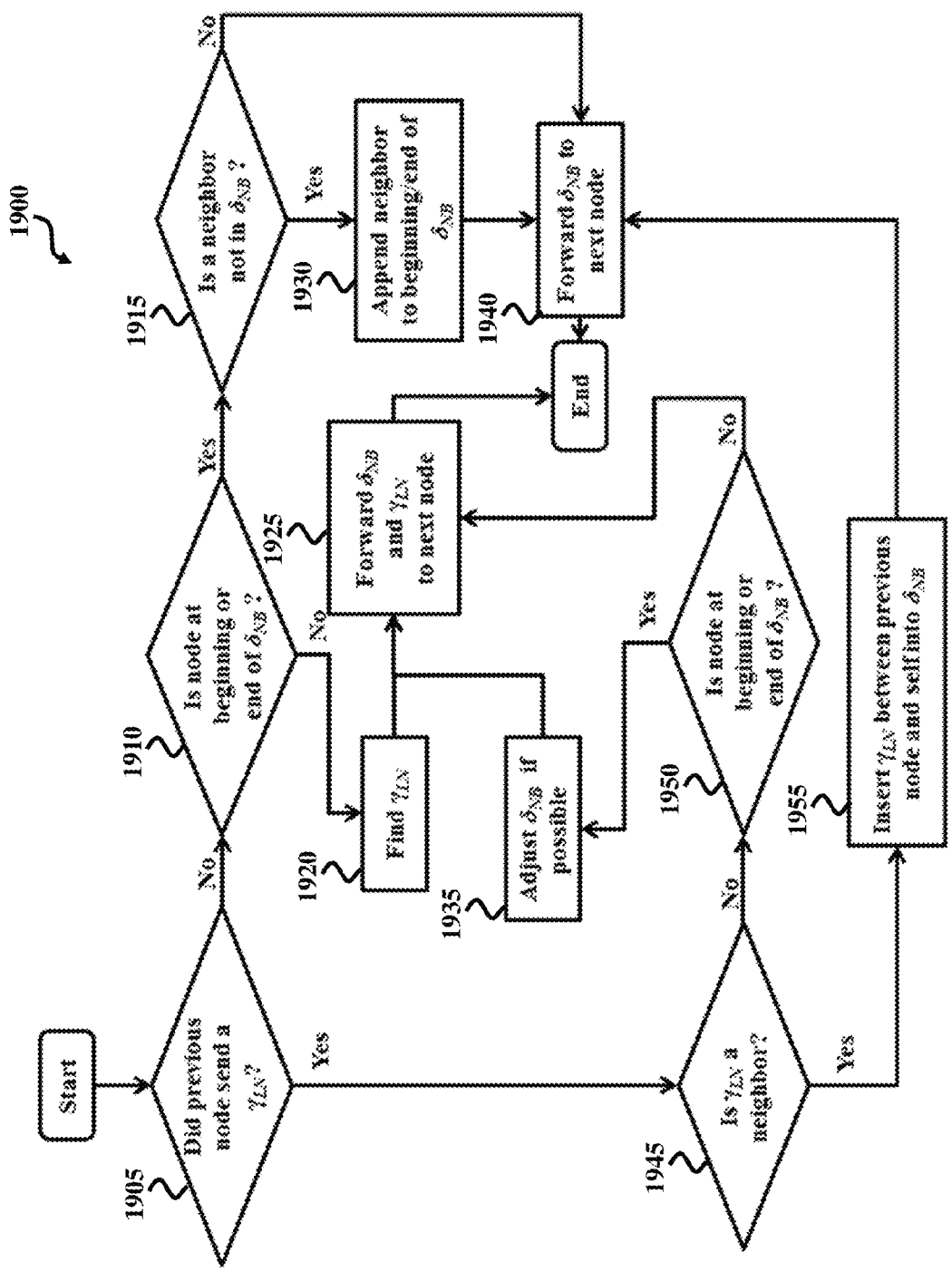
FIG. 19 is a flow diagram illustrating a method according to an embodiment herein.

FIG. 19, with reference to FIG. 18, is a flow diagram illustrating a method 1900 for the sequence correction check for every node, according to an exemplary embodiment. In an embodiment, each node conducts the sequence correction check when it receives $\delta_{NB}$ from the previous node in the sequence. Referring to the example topology illustrated in FIG. 18, with Node 4 as the starter node, Node 2's sequence correction is described using the flow chart of FIG. 19, according to an exemplary embodiment. If the order is from left to right in $\delta_{NB}=\{6,3,2,4,5\}$, Node 3 is Node 2's previous node. Node 3 does not send a lone neighbor $\gamma_{LN}$ because all of its neighbors are in $\delta_{NB}$; thus, Node 3 does not have a $\gamma_{LN}$ to send. Node 2 checks to see if it is at the beginning or end of $\delta_{NB}$, which it is not. Node 2 finds a lone neighbor Node 1 ($\gamma_{LN}$=1) and forwards that and $\delta_{NB}$ to the next node in the sequence, Node 4. At step 1925, Node 4 does the same and forwards $\gamma_{LN}$=1 and $\delta_{NB}$ since Node 1 is not a neighbor and its ID is not at the beginning or end of $\delta_{NB}$. When Node 5 receives $\gamma_{LN}$=1 and $\delta_{NB}$ from Node 4, it sees that its ID is at the end of the sequence and adjusts $\delta_{NB}$ to $\{2,4,5,3,6\}$ because Node 3 is one of its neighbors. Forwarding of $\gamma_{LN}$=1 and $\delta_{NB}$ continues until it reaches Node 2, which is now at the beginning of $\delta_{NB}$. Node 2 knows that its neighbor, Node 1, is not in $\delta_{NB}$ and appends Node 1 to the beginning of $\delta_{NB}$ per the flow chart. Nodes continue to forward and use $\delta_{NB}$ in order to distinguish which node transmits when, eliminating any possibility of collisions as previously described.

In process 1900, step 1905 determines if the previous node sends a $\gamma_{LN}$? If yes, then it is determined if $\gamma_{LN}$ is a neighbor in step 1945. If the decision in step 1905 results in No, then it is determined if the node is at the beginning or end of $\delta_{NB}$ in step 1910. If yes, then it is determined if the neighbor is not in $\delta_{NB}$ in step 1915. If the decision results in No in step 1915, then $\delta_{NB}$ is forwarded to the next node in step 1940 and the process 1900 ends. In step 1905, if the decision results in Yes, then it is determined if $\gamma_{LN}$ is a neighbor in step 1945. If it is not a neighbor, then it is determined if the node is at the beginning or end of $\delta_{NB}$ in step 1950. If the decision of step 1950 results in No, then $\delta_{NB}$ and $\gamma_{LN}$ are forwarded to the next node in step 1925 and process 1900 ends. If the decision of step 1950 results in Yes, then $\delta_{NB}$ is adjusted if possible in step 1935. If the decision of step 1945 results in Yes, then $\gamma_{LN}$ is inserted between the previous node and itself into $\delta_{NB}$ in step 1955 and then the process 1900 moves to step 1940 as described above. If the decision in step 1910 results in No, then the process 1900 finds $\gamma_{LN}$ in step 1920 and this value is combined with the adjusted $\delta_{NB}$ from step 1935 and the process 1900 moves to step 1925 as described above. If the decision in step 1915 results in Yes, then the neighbor is appended to the beginning/end of $\delta_{NB}$ in step 1930, and then the process 1900 continues to step 1940 as described above.

Hybrid Time Synchronization Protocol

The receiver-to-receiver paradigm introduced by RBS and the mean-squared error of R4Syn's relative skew and offset estimators were described above. The increased performance of RSP over FTSP for synchronizing one-hop neighbors via broadcast messages were also described above. Based on these concepts, an embodiment uses R4Syn-RSP hybrid protocol using $\delta_{NB}$ generated by the network.

By broadcasting timestamp messages according to $\delta_{NB}$ and generating a matrix of timestamps T for each node, an embodiment includes a method that re-defines T to determine the master reference node $\gamma_{MR}$ to which all other nodes attempt to synchronize. An embodiment uses the timestamps in T to form matrices of the relative parameters of each node so that every node has the ability to reference another node's relative parameters for multi-hop R4Syn synchronization. In an embodiment, each node determines the method of synchronization, and if necessary, broadcasts additional timing messages to synchronize other neighboring nodes.

Motivation for a Hybrid Protocol

Figure 20:
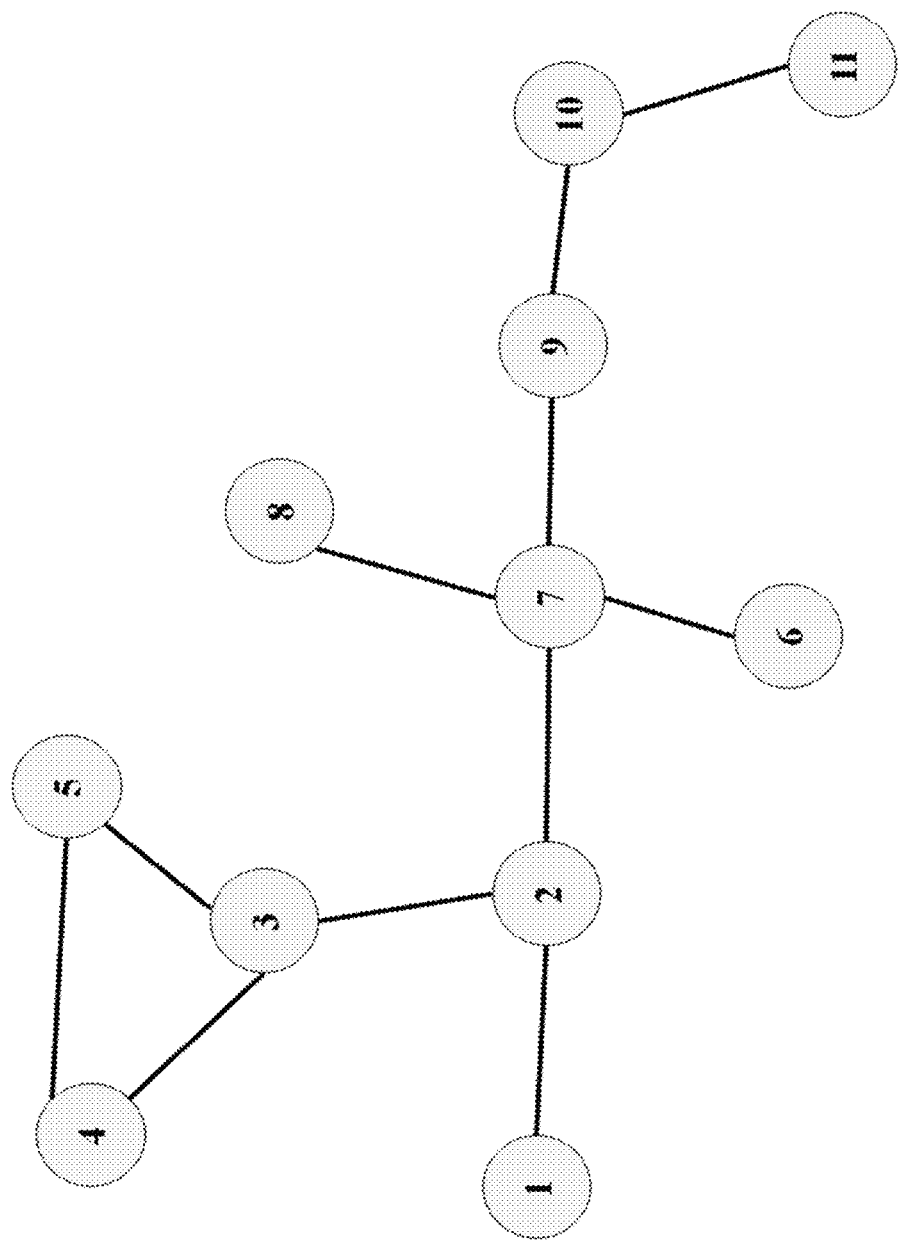
FIG. 20 is a schematic diagram illustrating a WSN, according to an exemplary embodiment herein.

In some WSN topologies, R4Syn falls short, due to its sequence and collision avoidance problems. An embodiment incorporates RSP by using a hybrid methodology. Some sparse networks cannot conduct accurate network-wide synchronization using only one protocol. FIG. 20 is a schematic diagram of a WSN illustrating the need for a hybrid protocol based on broadcast sequencing.

If broadcast sequencing and only R4Syn is applied to the topology in FIG. 20, the need for an additional protocol becomes obvious. According to the broadcast sequencing methodology, the network generates a $\delta_{NB}$ of $\{4,5,3,2,7,9,10,11\}$. Let's assume that a sufficient number of timestamps have been received by each node and are ready to synchronize. As an illustrative example, Node 7 is determined to be the master reference node $\gamma_{MR}$ because it has the most number of neighbors. While Nodes 1, 3, and 10 have timestamp pairs with Node 7 to synchronize their clocks via 1-hop R4Syn, the other nodes are left without any timestamp pairs with Node 7. For this very reason, another protocol to assist this time synchronization scheme is required.

An embodiment uses RSP for nodes that cannot be synchronized directly via R4Syn due to RSP's level of precision of less than half of a microsecond. Given the same topology example in FIG. 20, Node 7 broadcasts two additional messages to its one-hop neighbors since none of them can synchronize via R4Syn. For nodes that can synchronize via R4Syn, they adjust their clocks first and then synchronize any unsynchronized neighbors via RSP. For the same example, Node 10 synchronizes its clock to Node 7's clock using the R4Syn parameters and then synchronize Node 11 via RSP by sending two timestamp messages to Node 11.

Determination of the Master Reference Node

When it is a node's turn to broadcast, it may forward all previously received timestamp information to its neighbors. Receiving nodes simply ignore duplicate information or update their tables as information is received. After a sufficient number of cycles, each node determines the master reference node $\gamma_{MR}$ by analyzing their timestamp information to find the node that has the most number of timestamp pairs with other nodes.

Figure 21:
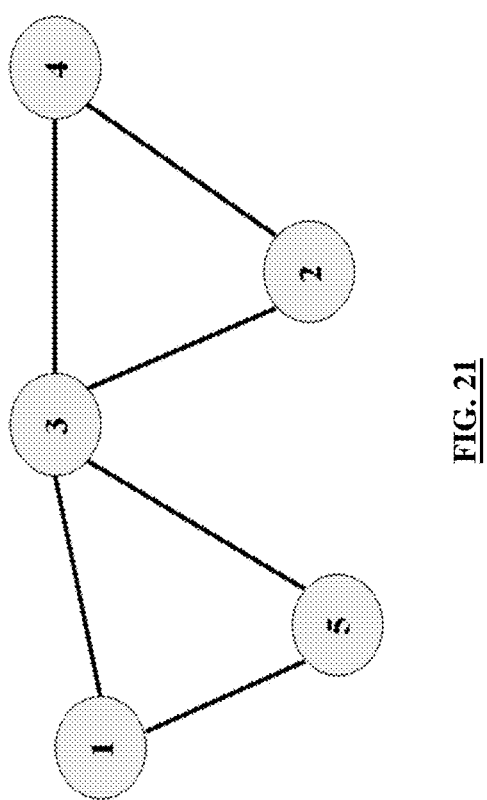
FIG. 21 is a schematic diagram illustrating a WSN, according to an exemplary embodiment herein.

FIG. 21 is a schematic of a WSN topology illustrating a re-definition of reception timestamp matrix T. In an embodiment, each node eventually forms the same matrix of timestamps. T may be used to determine the master reference node and calculate relative clock parameters. One cycle is considered as a round-trip sequence of nodes (i.e., nodes transmit messages per the order in $\delta_{NB}$ and $\delta_{NB}$ reversed). For example, $\delta_{NB}$ for the topology in FIG. 15 was $\{4, 5, 3, 2, 7, 9, 10, 11\}$, so a one-cycle sequence is $\{4, 5, 3, 2, 7, 9, 10, 11, 10, 9, 7, 2, 3, 5\}$.

In an embodiment, the network determines $\delta_{NB}$ to be $\{1,5,3,2,4\}$, which means that all five nodes broadcast during this sequence. The number of broadcasts M is extended according to our definition of one cycle so that the final sequence for one cycle is $\{1,5,3,2,4,2,3,5\}$, which means that there is a total of M=8 broadcasts in one cycle for this particular case. In general, for a network of N nodes and a $\delta_{NB}$ of w nodes, $$M = \begin{cases} 2w-2, & N \geq 4 \\ 4, & N = 3 \end{cases} \quad (17)$$

where w is the number of nodes in $\delta_{NB}$, or the length of $\delta_{NB}$. If N=2, in an embodiment, it is recommended recommend that the pair synchronize using RSP or TPSN.

Using the topology in FIG. 21 and the resulting timestamps from one cycle, we transform $t_{i,j}^k$ of Equation (4) and re-define T as $$T = \begin{bmatrix} * & t_{1,2}^5 & t_{1,3}^3 & - & - & - & t_{1,7}^3 & t_{1,8}^5 \\ - & - & t_{2,3}^3 & * & t_{2,5}^4 & * & t_{2,7}^3 & - \\ t_{3,1}^1 & t_{3,2}^5 & * & t_{3,4}^3 & t_{3,5}^4 & t_{3,6}^2 & * & t_{3,8}^5 \\ - & - & t_{4,3}^3 & t_{4,4}^2 & * & t_{4,6}^1 & t_{4,7}^3 & - \\ t_{5,1}^1 & * & t_{5,3}^3 & - & - & - & t_{5,7}^3 & * \end{bmatrix} \quad (18)$$

where $t_{R,M}^S$ refers to the reception timestamp at node R from the $M^{th}$ broadcast of the cycle sent by node S. By observation, the subscript R,M also denotes a timestamp's location in the matrix ($R^{th}$ row, $M^{th}$ column). An asterisk "*" denotes the broadcasting node, and a hyphen "-" denotes that no timestamps were received from the $M^{th}$ broadcast; they are only used in this example to assist the reader of easily identifying the broadcasting node per $\delta_{NR}$.

Given the reception timestamp matrix, each node can determine $\gamma_{MR}$. In the example, it is clear that Node 3 (row 3) has the largest number of reception timestamps and can form the most number of timestamp pairs with other nodes and, thus, becomes $\gamma_{MR}$. If there were more than one node that could be $\gamma_{MR}$ due to equal number of reception timestamps, the node with the smallest ID is chosen to be $\gamma_{MR}$. So if there was a tie between Nodes 2 and 3, for example, Node 2 is declared as $\gamma_{MR}$.

Relative Skew and Offset

After every cycle, nodes use their reception timestamp matrix T to calculate their relative skew and offset to $\gamma_R$ via the estimators in [11]. Given the timestamp matrix from Equation (18) where Node 3 is $\gamma_{MR}$, Node 1 can use timestamp pairs $(t_{1,2}^5, t_{3,2}^5)$ and $(t_{1,8}^5, t_{3,8}^5)$, Node 2 can use timestamp pair $(t_{2,5}^4, t_{3,5}^4)$, Node 4 can use timestamp pairs $(t_{4,4}^2, t_{3,4}^2)$ and $(t_{4,6}^1, t_{3,6}^2)$, and Node 5 can use timestamp pair $(t_{5,1}^1, t_{3,1}^1)$. With these timestamp pairs, nodes form a N×N matrix of relative clock skews $f_R$ and a N×N matrix of relative clock offsets $O_R$ using Equations (5) and (6) as $$f_R = \begin{bmatrix} 1 & f_{1,2} & f_{1,3} & \cdots & f_{1,N} \\ f_{2,1} & 1 & f_{2,3} & \ddots & f_{2,N} \\ f_{3,1} & f_{3,2} & 1 & \ddots & f_{3,N} \\ \vdots & \ddots & \ddots & 1 & \vdots \\ f_{N,1} & f_{N,2} & f_{N,3} & \cdots & 1 \end{bmatrix} \quad (19)$$

and $$O_R = \begin{bmatrix} 0 & O_{1,2} & O_{1,3} & \cdots & O_{1,N} \\ O_{2,1} & 0 & O_{2,3} & \ddots & O_{2,N} \\ O_{3,1} & O_{3,2} & 0 & \ddots & O_{3,N} \\ \vdots & \ddots & \ddots & 0 & \vdots \\ O_{N,1} & O_{N,2} & O_{N,3} & \cdots & 0 \end{bmatrix}, \quad (20)$$

where the elements $f_{x,y}$ and $O_{x,y}$ are denoted as Node x's relative skew/offset to Node y. Given the example topology in FIG. 16, Node 1 can adjust its clock and synchronize to Node 3 by using Equation (1) such that $C_3(t) = f_{1,3} \times C_1(t) + O_{1,3}$. All other nodes synchronize to Node 3 via the same method using $f_R$ and $O_R$.

Figure 22:
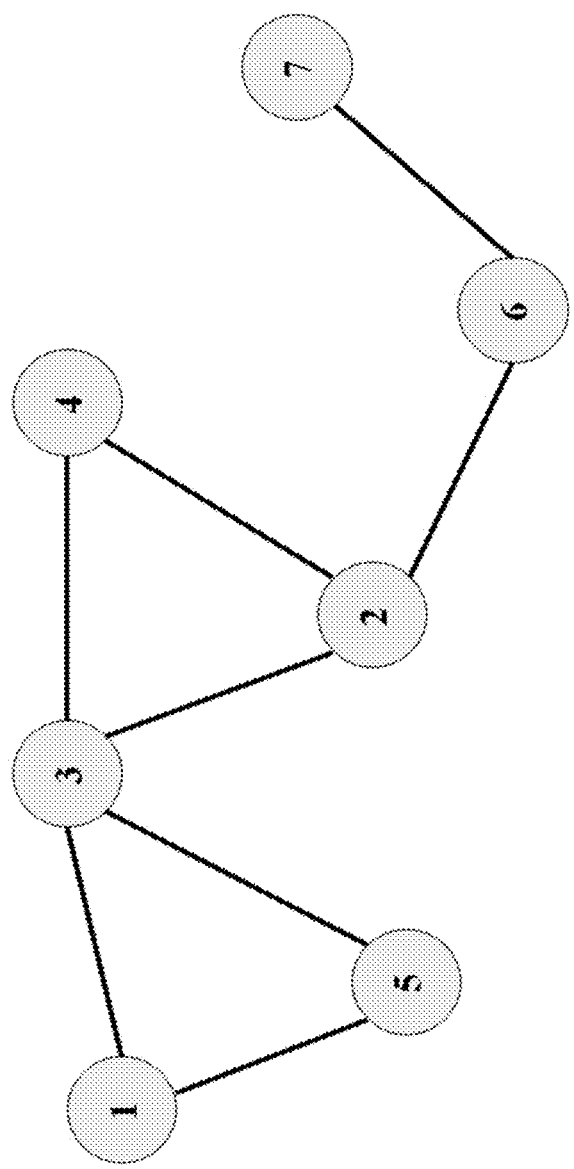
FIG. 22 is a schematic diagram illustrating a WSN, according to an exemplary embodiment herein.

Equations (19) and (20) are also needed for multi-hop synchronization. FIG. 22 is a schematic of a WSN illustrating a topology requiring multi-hop R4Syn synchronization. Nodes use T to determine if they can synchronize directly to the master reference node's clock and synchronize neighbors if necessary. The resulting timestamp matrix for one cycle is $$T = \begin{bmatrix} * & t_{1,2}^5 & t_{1,3}^3 & - & - & - & - & - & - & t_{1,11}^3 & t_{1,12}^5 \\ - & - & t_{2,3}^3 & t_{2,4}^4 & * & t_{2,6}^6 & - & t_{2,8}^6 & * & t_{2,10}^4 & t_{2,11}^3 & - \\ t_{3,1}^1 & t_{3,2}^5 & * & t_{3,4}^4 & t_{3,5}^2 & - & - & - & t_{3,9}^3 & t_{3,10}^4 & * & t_{3,12}^5 \\ - & - & t_{4,3}^3 & * & t_{4,5}^2 & - & - & - & t_{4,9}^2 & * & t_{4,11}^3 & - \\ t_{5,1}^1 & * & t_{5,3}^3 & - & - & - & - & - & - & t_{5,11}^3 & * \\ - & - & - & - & t_{6,5}^2 & * & t_{6,7}^7 & * & t_{6,9}^2 & - & - & - \\ - & - & - & - & - & t_{7,6}^6 & * & t_{7,8}^6 & - & - & - & - \end{bmatrix} \quad (21)$$

With Node 3 as $\gamma_{MR}$, Node 6 can synchronize to Node 3 using timestamp pairs $(t_{3,5}^2, t_{6,5}^2)$ and $(t_{3,9}^2, t_{6,9}^2)$; although, it is two hops away from Node 3. While Node 6 is two link-hops away from Node 3, it is only one R4Syn-hop from Node 3 because it has timestamp pairs with $\gamma_{MR}$. In the case of Node 7, it does not have any timestamp pairs with $\gamma_{MR}$ but instead with Node 2. Because Node 2 has timestamp pairs with $\gamma_{MR}$, Node 7 is two R4Syn-hops from $\gamma_{MR}$. Consequently, Node 7 uses the multi-hop R4Syn parameter estimators presented in Chapter II (see Equations (7) and (8)) to adjust its clock to Node 3's. Thus, Node 7 synchronizes to Node 3 by $$C_3(t) = f_{7,3} \times C_7(t) + O_{7,3} \quad (22)$$

where $$f_{7,3} = f_{7,2} \times f_{2,3} \quad (23)$$

$$O_{7,3} = f_{2,3} \times O_{7,2} + O_{2,3} \quad (24)$$

and the relative parameters $f_{7,2}$, $f_{2,3}$, $O_{7,2}$ and $O_{2,3}$ are extracted from $f_R$ and $O_R$.

Figure 23:
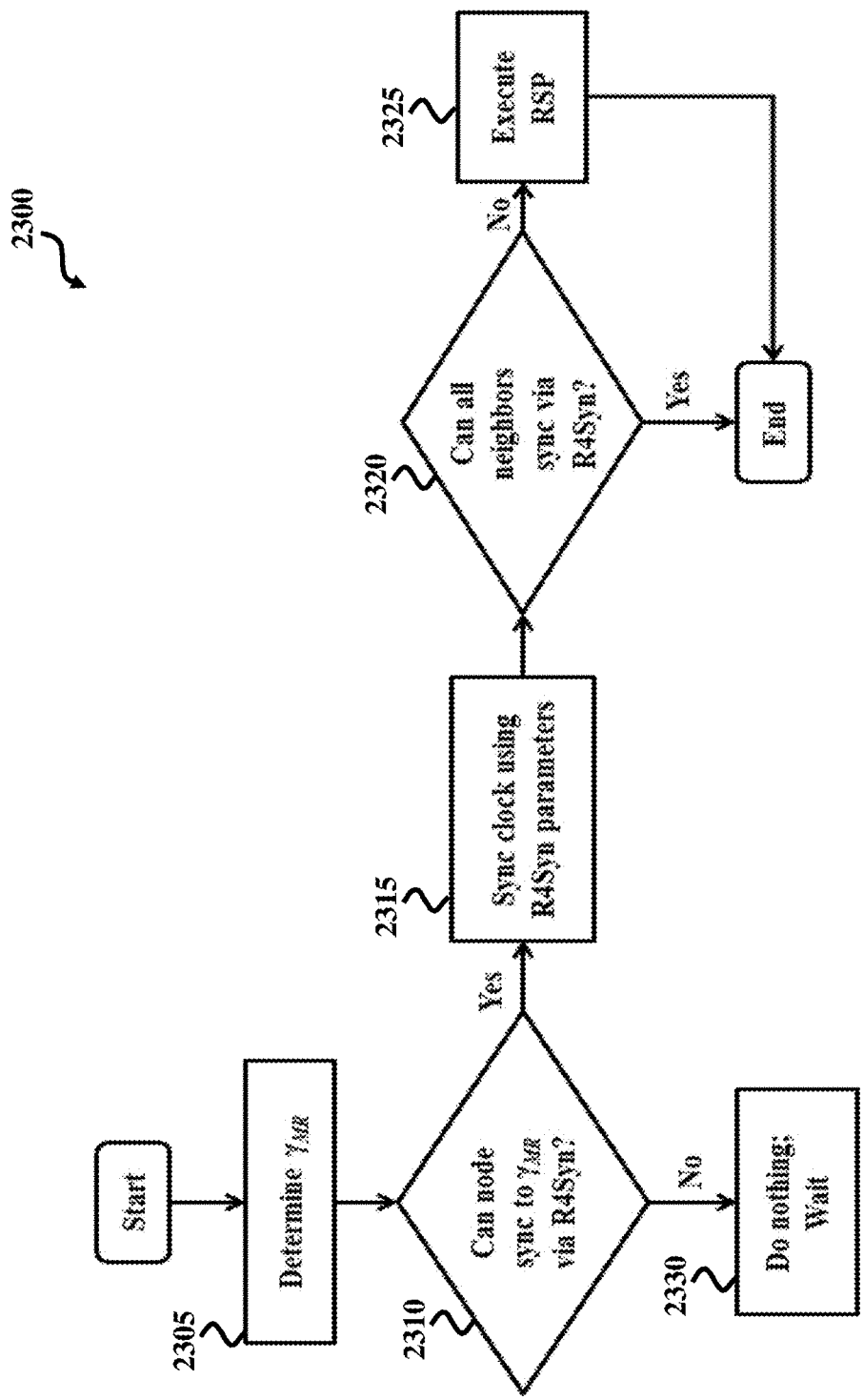
FIG. 23 is a flow diagram illustrating a method according to an embodiment herein.

Nodes also use the reception timestamp matrix to determine if any of their neighbor nodes require synchronization via RSP by simply examining whether or not their neighbors can synchronize via R4Syn. FIG. 23 is a flow chart illustrating a method 2300 that each node uses to synchronize with the rest of the network, according to an embodiment. Method 2300 describes the R4Syn-RSP hybrid time synchronization protocol. In an embodiment, R4Syn is the primary protocol of synchronization and RSP is secondary. Upon receiving enough timestamp information, each node, at step 2305, determines the master reference node $\gamma_{MR}$ and calculates its relative parameters. If the node can synchronize to $\gamma_{MR}$ directly via R4Syn in decision step 2310, then at step 2315, it adjusts its clock using relative parameters, else it does nothing and waits at step 2330. Next, the node checks, at step 2320, its timestamp matrix to see if there are any neighbor nodes that cannot synchronize to $\gamma_{MR}$ via R4Syn. If there are unsynchronized neighbors, the node, at step 2325, synchronizes them via RSP using two more timing messages, else (yes) the process 2300 ends.

An embodiment describes a hybrid time synchronization scheme. In an embodiment, an unsynchronized network of ad hoc wireless sensor nodes is synchronized in three steps: determining the most node-inclusive broadcast sequence $\delta_{NB}$, conducting a sequence correction check, and synchronizing nodes via RSP or R4Syn. Starting with $\delta_{NB}$ determination, an embodiment describes the concept behind broadcast sequencing and then discussed the procedures that nodes conduct in order to determine their sequences. An embodiment demonstrates the need for a sequence correction check for certain topologies and provides additional procedures to adjust the final sequence that make it more inclusive. An embodiment uses the hybrid R4Syn-RSP scheme to synchronize the network.

Simulation

The performance of time synchronization embodiments are presented through a series of simulations. The performance of described hybrid scheme embodiment for wireless network time synchronization is presented via MATLAB simulations. Examination and simulation of the R4Syn skew and offset estimators are presented. Then the performance of an embodiment for determining the network broadcast sequence $\delta_{NB}$ through a series of different network simulations is presented. An application of $\delta_{NB}$ to synchronize networks using the proposed hybrid time synchronization embodiment is evaluated. Source code for the simulations are included in the Appendix.

R4Syn Estimators

MATLAB simulations to evaluate the effectiveness and accuracy of the R4Syn relative skew and offset estimators are presented so that the embodiment with broadcast sequence $\delta_{NB}$ can be applied to the hybrid time synchronization embodiment.

Simulation Model

Figure 24:
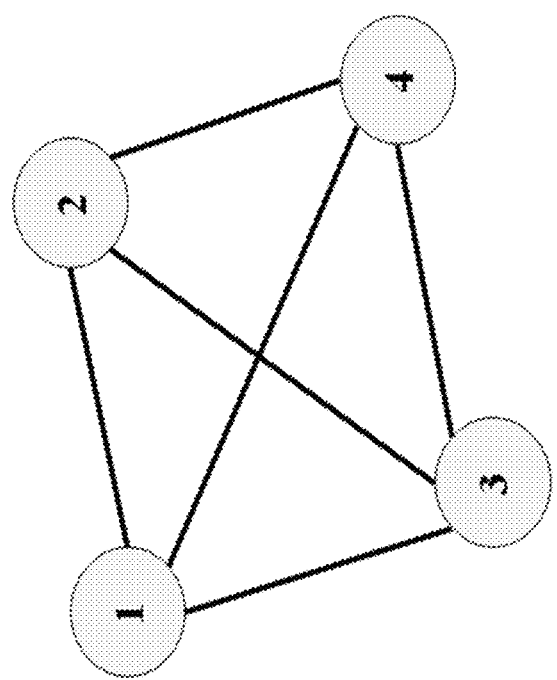
FIG. 24 is a schematic diagram illustrating a WSN, according to an exemplary embodiment herein.

Simulating the performance of the estimators are performed via Monte Carlo simulations. FIG. 24, with reference to FIG. 5, is a schematic of a WSN where four nodes can all communicate with one another, used for the simulation, in an exemplary embodiment. The simulation places four nodes within communications range of each other. Node 1 begins with a relative offset and relative skew of 0 seconds and 1, respectively, while all other nodes begin with a uniformly random relative offset in the range of [−10, 10] seconds and a uniformly random frequency in the range of [0.75, 1.25]. Propagation times are given by $$t_{prop} = \frac{d_{x,y}}{c} \quad (25)$$

where $c=3\times10^8$ m/s (speed of light) and $d_{x,y}$ is the Euclidean distance between Nodes x and y. Upon receiving a beacon, each node's processing time $t_{proc}$ is modeled as a uniformly random variable in the range of [100, 500] milliseconds, which includes all sources of delay (e.g., send/receive, access, transmission/reception).

Results

In the simulation, each node transmits its beacon upon receiving a beacon from the previous node in sequential order (i.e., 1, 2, 3, 4) and repeats this cycle until 100 timestamp messages are generated for each node. The effectiveness of the relative skew and offset estimators ($f_{ML}$, and $O_{ML}$, respectively) is measured by calculating the mean-squared error $\epsilon_{MS}$ and the Cramer-Rao lower bound (CRLB) $\beta_{CR}$ at every tenth message.

The mean-squared error of the relative skew estimator is denoted as $$\gamma_{MS}(f_{ML})=E[(f_{ML}-f_A)^2] \quad (26)$$

and the mean-squared error of the relative offset estimator as $$\epsilon_{MS}(O_{ML})=E[(O_{ML}-O_A)^2] \quad (27)$$

where $f_A$ and $O_A$ are the actual relative skew and actual relative offset, respectively, that are randomly assigned to a given node as mentioned in the previous section. Let's considering the definition of timestamp samples ($u_k$, $v_k$) and broadcast messages I that are used to calculate $f_{ML}$, and $O_{ML}$. The CRLB of the relative skew estimator is denoted as $$\beta_{CR}(f_{ML}) \geq \frac{I\sigma^2}{I\sum_{k=1}^{I} v_k^2 - \left(\sum_{k=1}^{I} v_k\right)^2} \quad (28)$$

and the CRLB of the relative offset estimator as $$\beta_{CR}(O_{ML}) \geq \frac{\sigma^2 \sum_{k=1}^{I} v_k^2}{I\sum_{k=1}^{I} v_k^2 - \left(\sum_{k=1}^{I} v_k\right)^2} \quad (29)$$

where $\delta^2$ is the variance; $\delta^2=1$ microsecond for this simulation.

Figure 25:
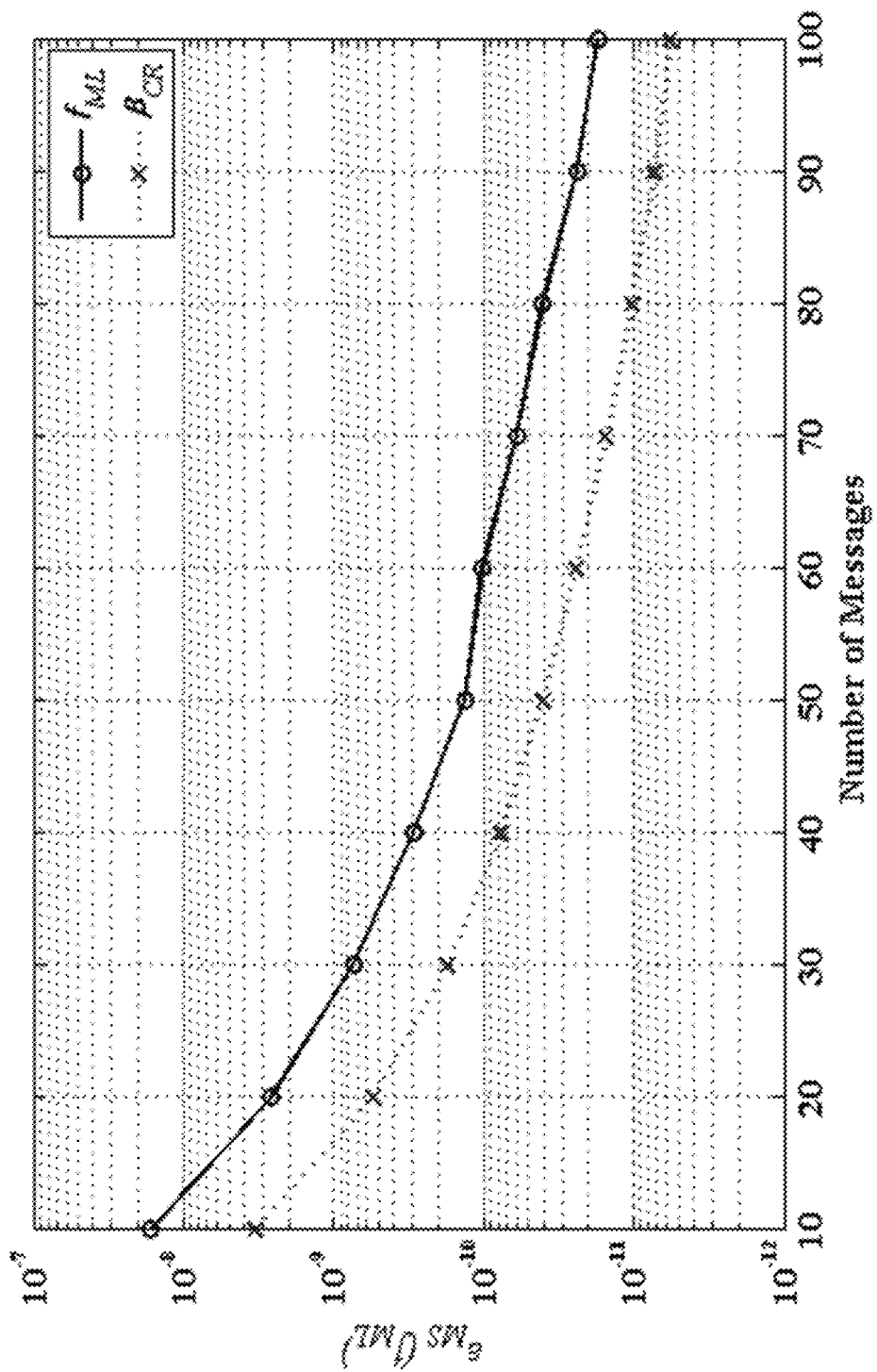
FIG. 25 is a graph illustrating simulation results, according to an exemplary embodiment herein.
Figure 26:
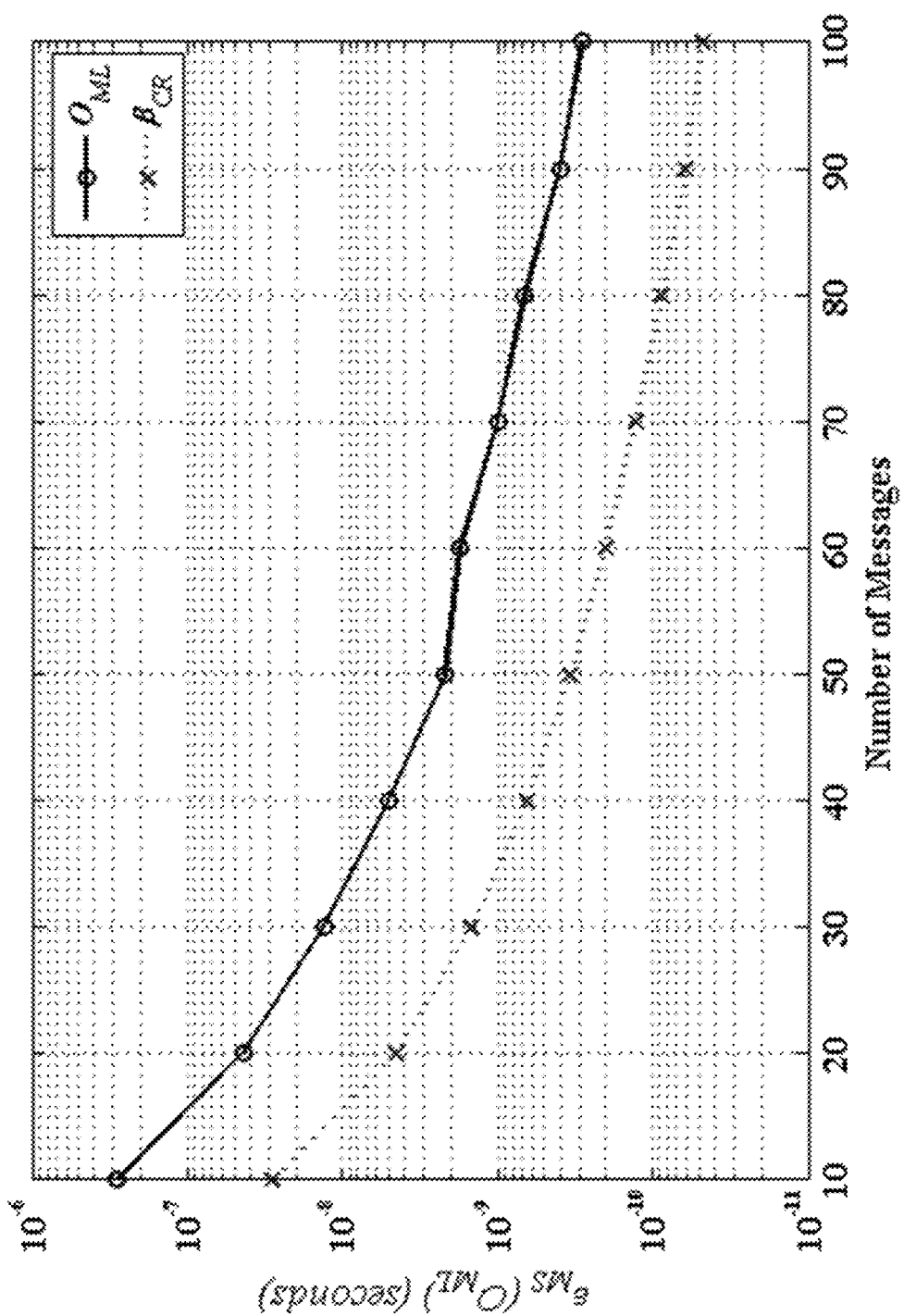
FIG. 26 is a graph illustrating simulation results, according to an exemplary embodiment herein.

The mean-squared error and the CRLB of the skew and offset estimators are calculated after every tenth message, repeat the experiment 1000 times and take the average. FIG. 25 presents the simulation results for the one-hop network scenario, according to an exemplary embodiment. FIG. 25 shows mean-squared error of skew estimation versus number of messages. FIG. 25 illustrates as the number of messages is increased, the mean-squared error of the relative skew estimator improves and approaches the CRLB. FIG. 26 presents the simulation results for the one-hop network scenario, according to an exemplary embodiment. FIG. 26 shows mean-squared error of offset estimation versus number of messages. FIG. 26 illustrates that as the number of messages is increased, the mean-squared error of the relative offset estimator improves and approaches the CRLB. FIGS. 25 and 26 demonstrate that $\epsilon_{MS}$ of the estimators decreases and approaches $\beta_{CR}$ as the number of messages increases.

Figure 27:
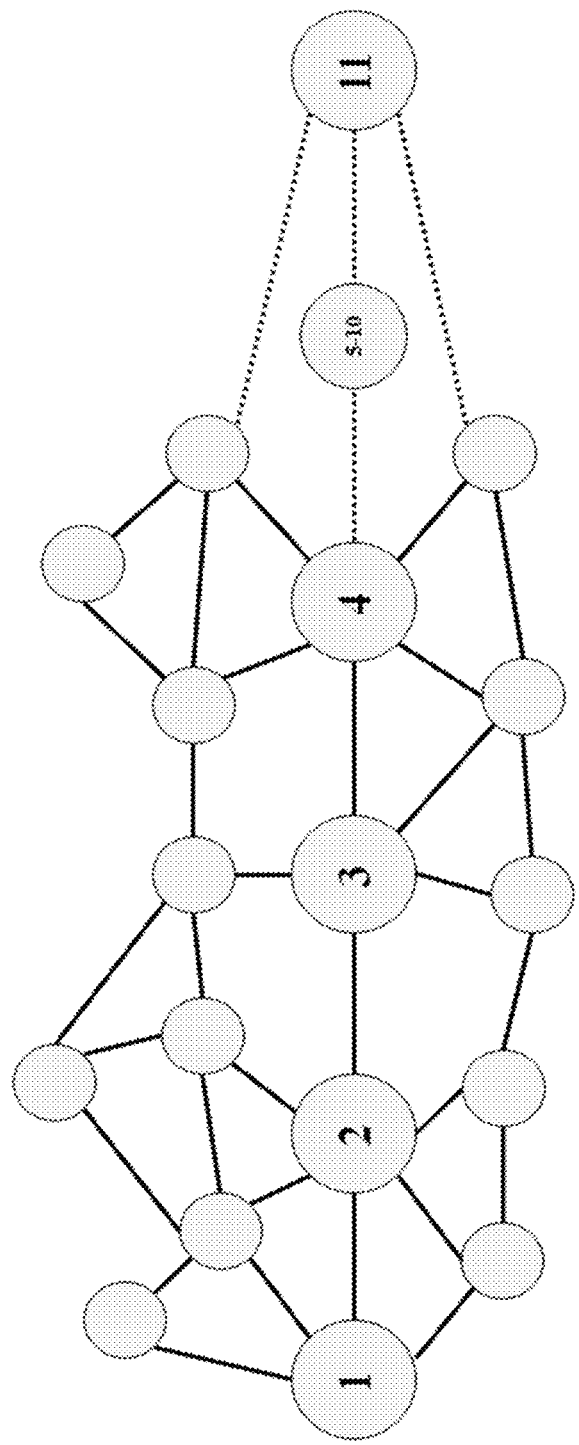
FIG. 27 is a schematic diagram illustrating a WSN, according to an exemplary embodiment herein.

FIG. 27 is a schematic diagram of a multi-hop WSN used for the simulating, according to an exemplary embodiment. In the network of FIG. 27, numbered nodes calculate their local one-hop synchronization parameters and perform multi-hop synchronization on demand. For example, Node 4 is three link-hops away from Node 1; thus, it must receive local synchronization parameters from Nodes 1, 2, and 3 to perform multi-hop synchronization.

Figure 28:
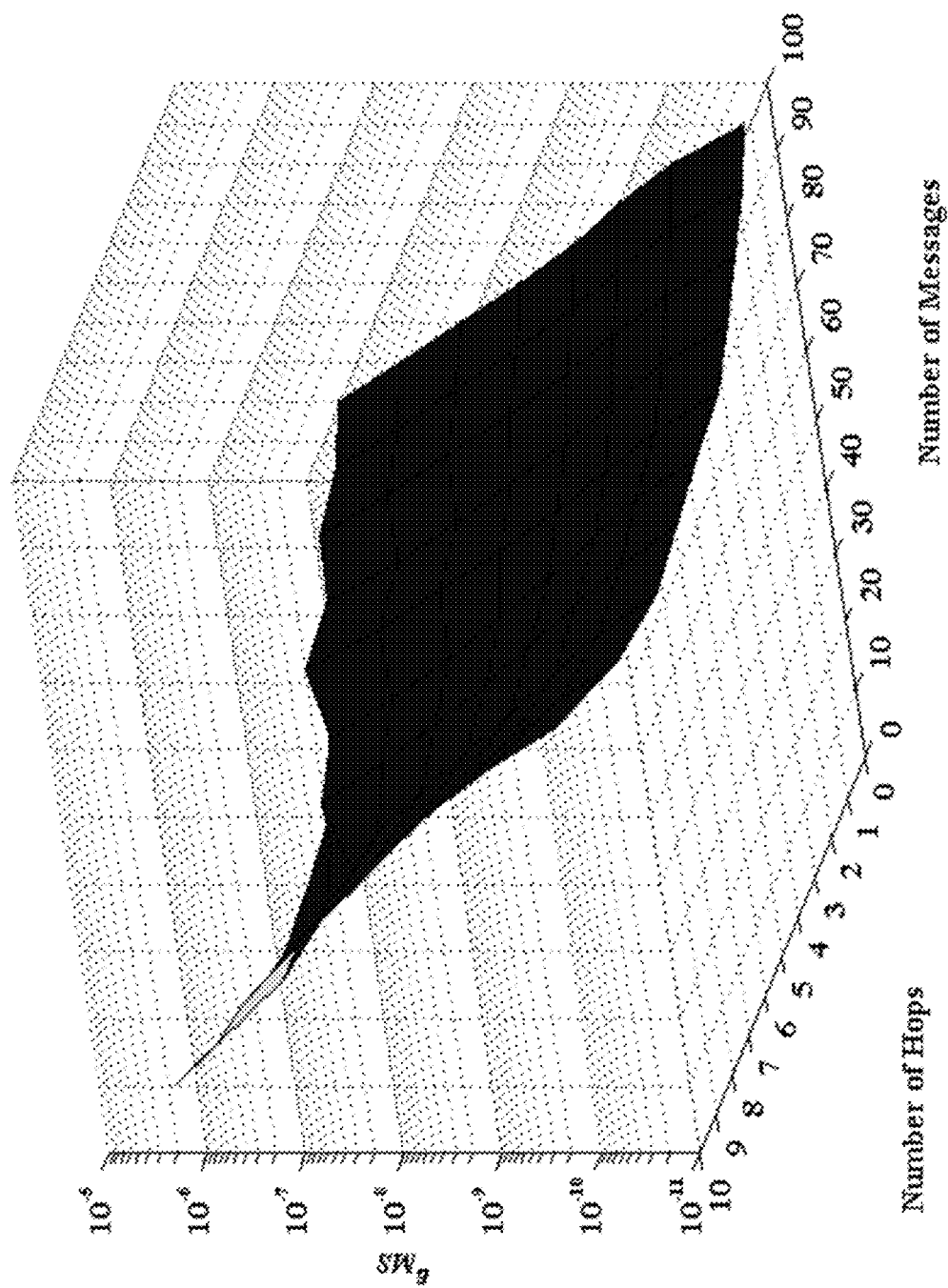
FIG. 28 is a graph illustrating simulation results, according to an exemplary embodiment herein.

FIG. 28, with reference to FIG. 27, illustrates simulation results according to an exemplary embodiment. FIG. 28 illustrates that the mean-squared error for the multi-hop skew estimator improved as the number of messages increased even with a higher number of hop values, as expected. FIG. 28 illustrates that as the number of messages and hops are increased, the mean-squared error of the multi-hop skew estimator is kept at an acceptable range for time synchronization. The simulation results also validate that the mean-squared error is kept at an acceptable range for a small number of messages as well as a large number of hops.

Through simulation results, it is shown that in an embodiment the estimators' mean-squared errors decrease and approach the CRLB as the number the timestamp messages for the one-hop scenario is increased, and that the mean-squared errors provide an acceptable range of accuracy regardless of the number of hops or messages.

Broadcast Sequencing Performance

The simulation herein are used to evaluate the methodology for determining $\delta_{NB}$ as well as the sequence correction check, in an embodiment.

Simulation Model

A formation of dense and sparse network topologies in the simulations is described. Both types of networks start with the first node centered at the origin of a Cartesian grid, and all nodes are assumed to have the same maximum communications range of 100 meters. For dense networks, every subsequent node is randomly deployed within 33-66 meters of the previous node's location. For sparse networks, every subsequent node is randomly deployed within 66-99 meters of the previous node's location. This methodology ensures that every node can communicate with at least one other node and that the network can form a diverse series of topologies for analysis. For dense networks, the average number of neighbors per node was between 60 percent and 88 percent of the total number of nodes in the network, while the average number of neighbors per node for sparse networks was between 8 percent and 32 percent.

Figure 29:
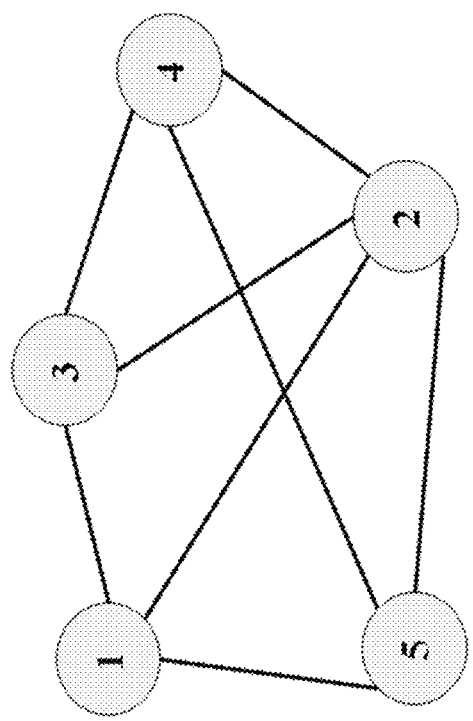
FIG. 29 is a schematic diagram illustrating a WSN, according to an exemplary embodiment herein.

FIG. 29 is a schematic diagram of a dense network, according to an exemplary embodiment. Network illustrated in FIG. 5 includes N=5 nodes that are deployed with the ability to communicate at least with one other node. Let's assume that one-hop neighbor discovery is complete so that all nodes know the IDs of their one-hop neighbors. For example, Node 1 starts with the role of $\gamma_{SN}$ and floods the network to begin node relationship and sequence determinations. Childless nodes determine their sequences first and then pass their sequences, $\Gamma_F$, and $N_P$ to their parent nodes as discussed in Chapter III. This continues until $\gamma_{SN}$ receives all of the information it needs to determine $\delta_{NB}$. The number of nodes included in $\delta_{NB}$ before sequence correction is denoted as $N_{BSC}$ and measure our methodology's sequence forming performance before sequence correction as $$P_{BSC} = \frac{N_{BSC}}{N} \times 100\% \quad (30)$$

where N is the total number of nodes.

After $\delta_{NB}$ is determined, we simulate the network adjusting (as necessary) and forwarding $\delta_{NB}$ throughout the network per the sequence correction method in Chapter III. We denote the number of nodes included in $\delta_{NB}$ after sequence correction as $N_{ASC}$ and measure our methodology's sequence forming performance after sequence correction as $$P_{ASC} = \frac{N_{ASC}}{N} \times 100\%. \quad (31)$$

The role of $\gamma_{SN}$ is distributed throughout the network for this topology, the process is repeated for a total of 100 newly-generated topologies, and, finally, $P_{BSC}$ and $P_{ASC}$ are averaged across the total number of trials to obtain the results provided in the next section. For every new topology that is generated, the location of each node after the deployment of the first node (at the origin) is a new randomly-generated Cartesian grid location; thus, the distances between nodes vary for each topology. The simulation is repeated for dense networks while varying N from κ, 10, 15, 20, 30, 40, to 50 and then do the same process for sparse networks. Intuitively, networks with more nodes will yield more topology variation.

Results

A summary of the results for dense networks is displayed in Table 2. The methodology for determining $\delta_{NB}$ before sequence correction performs significantly well independent of the number of nodes in the networks. The sequence correction check improved the sequence forming performance to or very close to 100 percent of the total number of nodes in the network.

TABLE 2

Summary of results for dense networks before and after sequence correction. The broadcast sequencing methodology proved to be effective in including as many nodes as possible for dense networks.
Dense Networks

| Trials = Nodes × Topologies | | $P_{BSC}$ | $P_{ASC}$ |
|---|---|---|---|
| Nodes | 5 | 99.28% | 99.52% |
| Topologies | 100 | | |
| Trials | 500 | | |
| Nodes | 10 | 99.46% | 100.00% |
| Topologies | 100 | | |
| Trials | 1000 | | |
| Nodes | 15 | 99.40% | 99.99% |
| Topologies | 100 | | |
| Trials | 1500 | | |
| Nodes | 20 | 99.32% | 99.99% |
| Topologies | 100 | | |
| Trials | 2000 | | |
| Nodes | 30 | 99.68% | 100.00% |
| Topologies | 100 | | |
| Trials | 3000 | | |
| Nodes | 40 | 99.75% | 100.00% |
| Topologies | 100 | | |
| Trials | 4000 | | |
| Nodes | 50 | 99.66% | 100.00% |
| Topologies | 100 | | |
| Trials | 5000 | | |

For sparse networks, the performance of the $\delta_{NB}$ methodology before sequence correction deteriorated as the number of nodes in the network is increased, as shown in Table 3; however, the sequence correction methodology was able to add nodes into the original sequence, increasing the overall percentage to a more acceptable $\delta_{NB}$.

TABLE 3

Summary of results for sparse networks before and after sequence correction. The sequence correction methodology proved to be effective in including as many nodes as possible for sparse networks.
Sparse Networks

| Trials = Nodes × Topologies | | $P_{BSC}$ | $P_{ASC}$ |
|---|---|---|---|
| Nodes | 5 | 99.08% | 100.00% |
| Topologies | 100 | | |
| Trials | 500 | | |
| Nodes | 10 | 94.25% | 98.03% |
| Topologies | 100 | | |
| Trials | 1000 | | |
| Nodes | 15 | 88.84% | 95.41% |
| Topologies | 100 | | |
| Trials | 1500 | | |
| Nodes | 20 | 82.34% | 92.92% |
| Topologies | 100 | | |
| Trials | 2000 | | |
| Nodes | 30 | 72.76% | 88.50% |
| Topologies | 100 | | |
| Trials | 3000 | | |
| Nodes | 40 | 67.65% | 85.63% |
| Topologies | 100 | | |
| Trials | 4000 | | |
| Nodes | 50 | 60.96% | 83.28% |
| Topologies | 100 | | |
| Trials | 5000 | | |

The methodology behind the simulations for determining $\delta_{NB}$ and results of the methodology's performance are presented. The methodology performs well for dense networks without a sequence correction check but deteriorated for sparse networks as the number of nodes is increased. The simulations for sparse networks validated the usefulness and need for a sequence correction check for the overall scheme.

Network Time Synchronization Using Hybrid Scheme

The implementation of $\delta_{NB}$ in the hybrid time synchronization embodiment for any network topology is evaluated. The different simulation models used to investigate the effects of increasing hop counts from the master reference node $\gamma_{MR}$ and the effects of node density on the overall precision of the network's time synchronization are described. The results to validate the performance of the hybrid time synchronization embodiment scheme for any network topology are presented.

Effect of Hop Counts on Network Synchronization

The hybrid time synchronization embodiment is evaluated by exploring the effects of hop counts from $\gamma_{MR}$ on the overall precision of the network's synchronization.

Simulation Model

Figure 30:
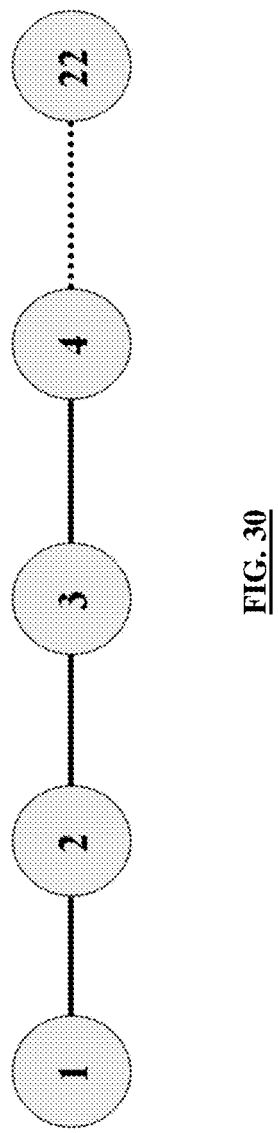
FIG. 30 is a schematic diagram illustrating a WSN, according to an exemplary embodiment herein.

FIG. 30 is a schematic of a linear network with 22 sensor nodes, according to an exemplary embodiment. The simulation model is formed by creating the linear network of 22 nodes, as displayed in FIG. 30. The broadcast sequencing method outputs a final sequence of $\{1, 2, 3, \ldots, 22\}$ and then nodes broadcast in the order of $\delta_{NB}$ for 10 cycles, generating their reception timestamp matrix T from equation (18). 10 cycles are chosen in order to produce a sufficient number of messages to demonstrate whether a synchronization trend exists. Node 1 is forced to be $\gamma_{MR}$ so that only odd-numbered nodes can synchronize directly to Node 1 via R4Syn, while even-numbered nodes are synchronized by odd-numbered nodes via RSP. Nodes synchronize their clocks after every tenth cycle, and we obtain each node's clock precision to $\gamma_{MR}$ as well as the network's average clock precision to $\gamma_{MR}$. In this linear network of 22 nodes, there is a 10-hop maximum for R4Syn synchronization.

Figure 31:
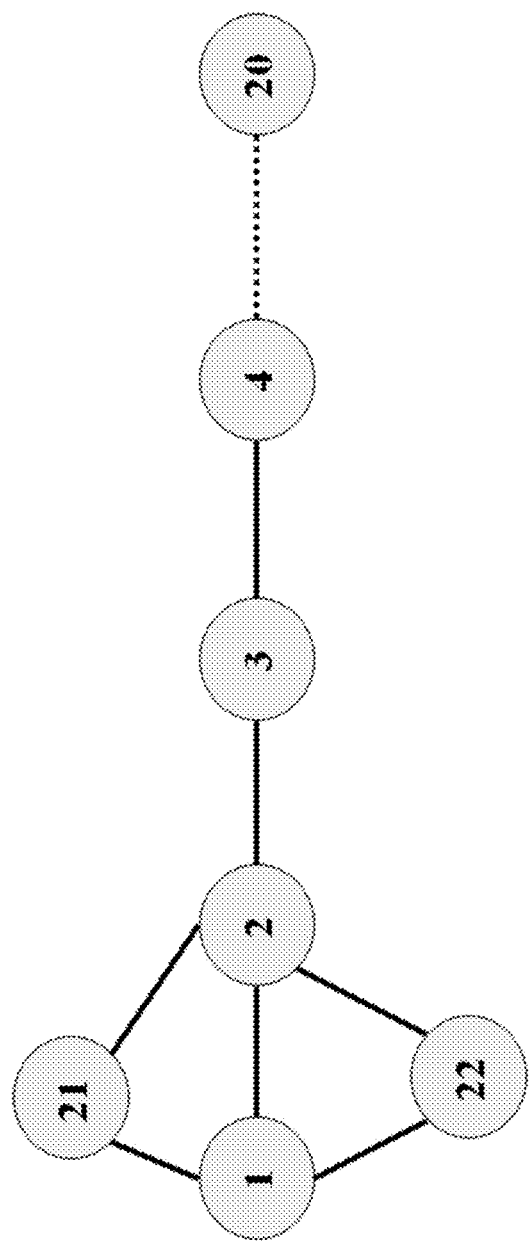
FIG. 31 is a schematic diagram illustrating a WSN, according to an exemplary embodiment herein.

FIG. 31 is a schematic diagram illustrating a network with iterative change in topology, according to an exemplary embodiment. Network of FIG. 31 is used to analyze the effect of hop count on network precision. After observing the precision of the network's time synchronization, two of the farthest nodes are moved from $\gamma_{MR}$ (Nodes 21 and 22) within range of $\gamma_{MR}$ to form a topology shown in FIG. 31, where the maximum R4Syn hop from $\gamma_{MR}$ is now nine hops. This trend is continued, conducting 100 simulations for each topology, until all nodes are within range of $\gamma_{MR}$.

Results

Figure 32:
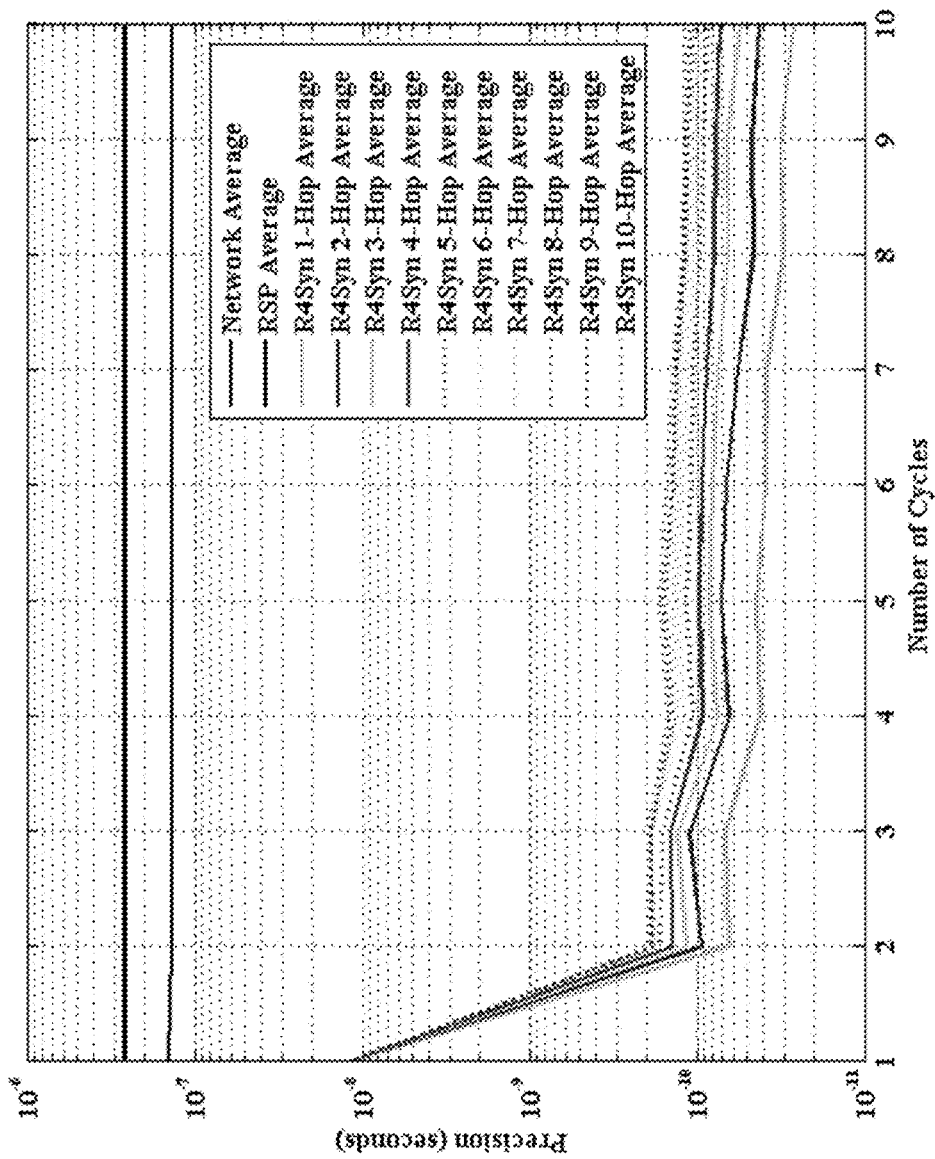
FIG. 32 is a graph illustrating simulation results, according to an exemplary embodiment herein.

FIG. 32 is a diagram illustrating Synchronization results of 100 topologies of a linear network of 22 nodes, according to an exemplary embodiment. Nodes synchronizing via R4Syn obtain tenths of nanosecond precision to $\gamma_{MR}$'s clock, whereas nodes synchronizing via RSP maintain close to 0.5/is precision to $\gamma_{MR}$'s clock.

Figure 33:
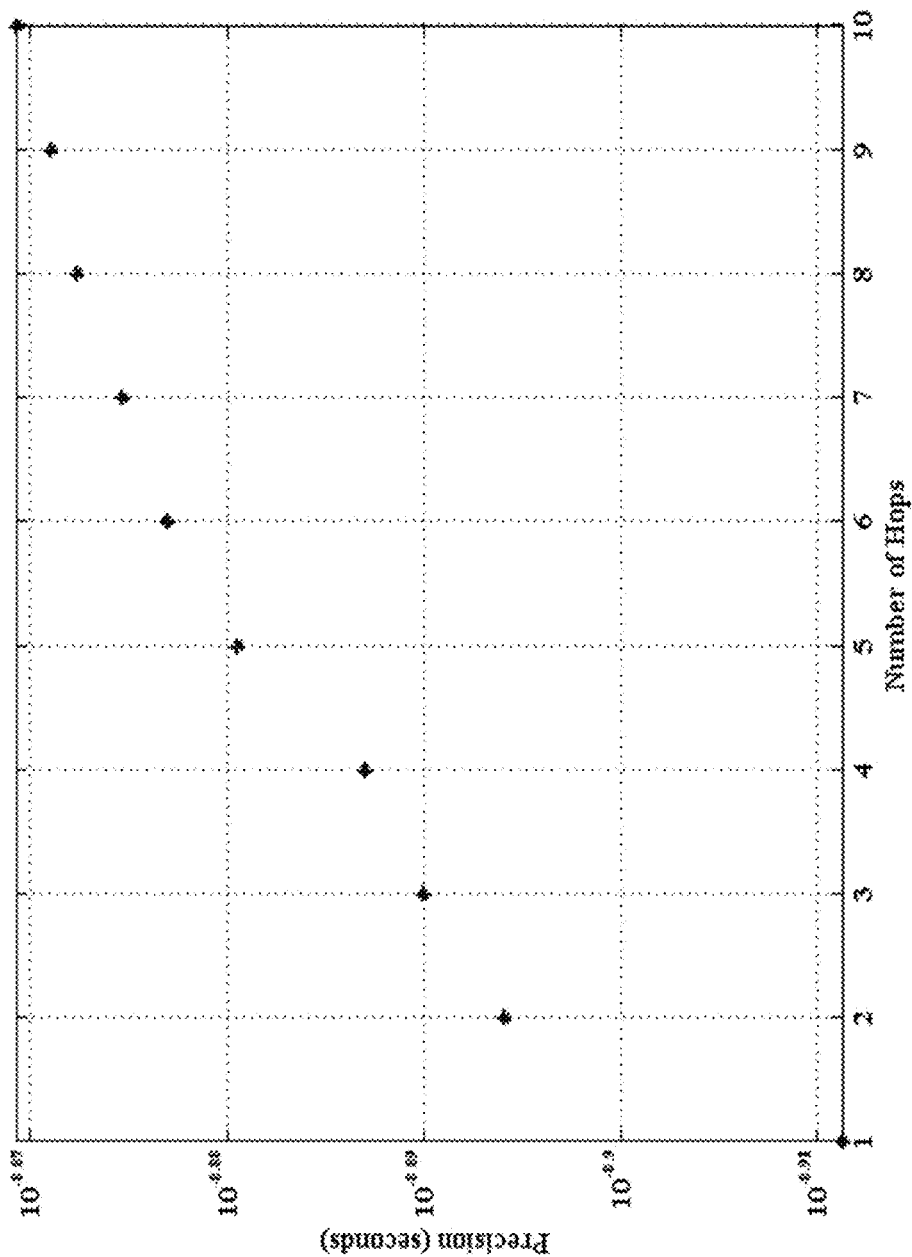
FIG. 33 is a graph illustrating simulation results, according to an exemplary embodiment herein.

FIG. 33 is a diagram illustrating number of hops versus precision for linear network of 22 nodes. FIG. 33 illustrates that node precision slightly deteriorates when the number of hops from the master reference node increases for nodes synchronizing via R4Syn. It is observed that when a node is a small number of hops away from $\gamma_{MR}$ for R4Syn synchronization, its clock is more precisely synchronized to $\gamma_{MR}$'s clock.

Figure 34:
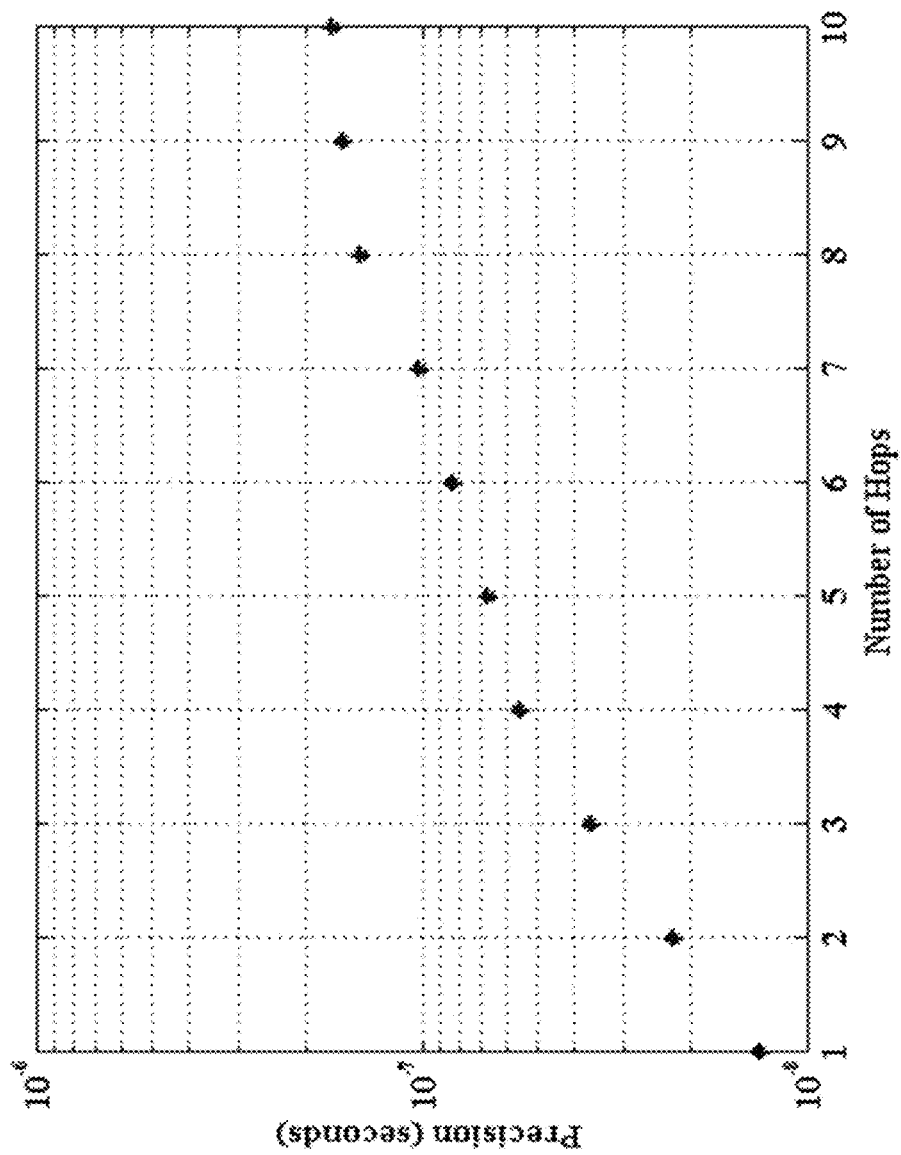
FIG. 34 is a graph illustrating simulation results, according to an exemplary embodiment herein.

FIG. 34 is a diagram illustrating network synchronization for a topology, according to an exemplary embodiment. FIG. 34 illustrates that synchronization improves when less nodes are multiple hops away from the master reference node. While near the tenths of nanosecond precision for individual nodes synchronizing may be achieved via R4Syn, the poorest results for the network's precision as a whole is observed, as shown in FIG. 34. As the topologies are changed by moving the two farthest nodes within range of $\gamma_{MR}$ and observing the network's clock precision to $\gamma_{MR}$, the results in FIG. 34 are obtained. As expected, the average network synchronization improves when a small number of nodes that are multiple hops away from $\gamma_{MR}$ are present.

Figure 35:
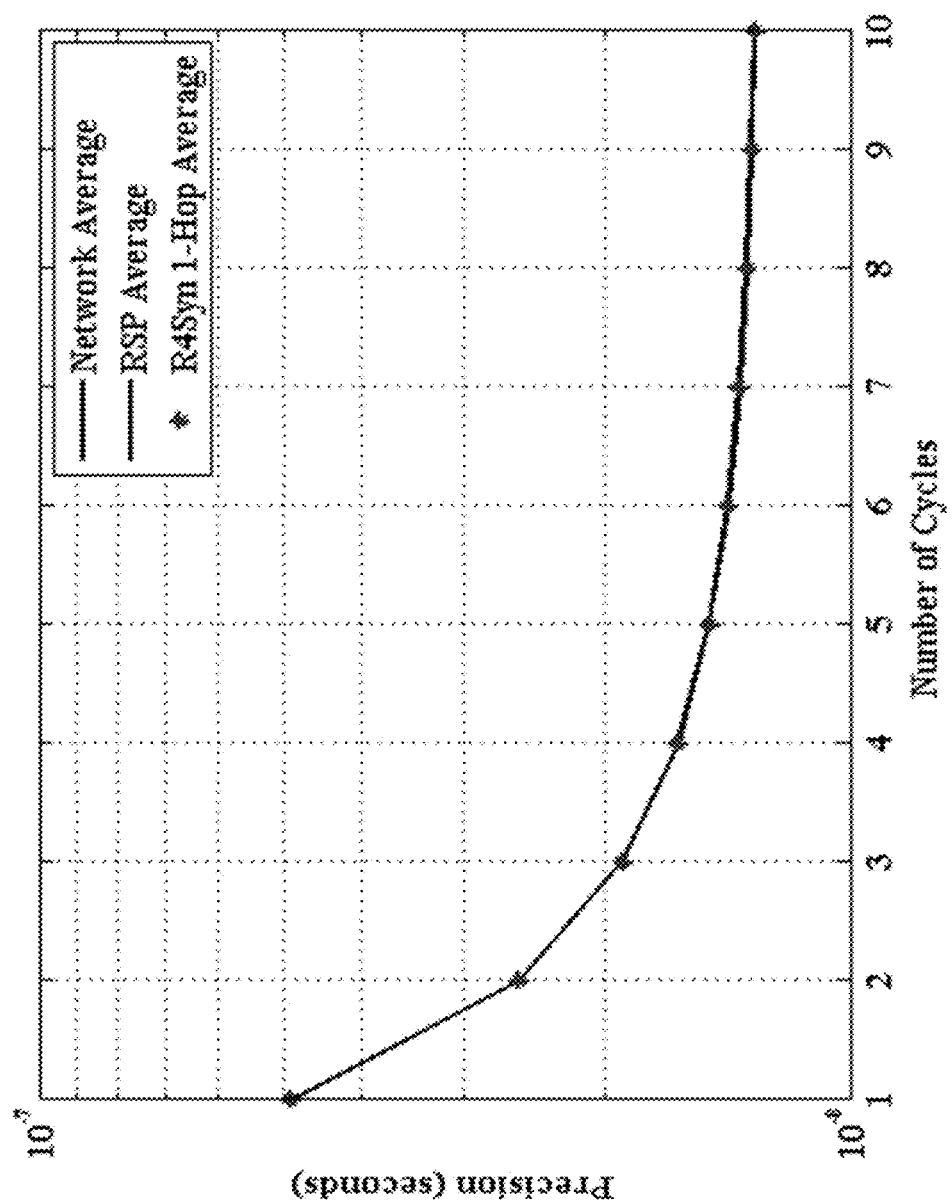
FIG. 35 is a graph illustrating simulation results, according to an exemplary embodiment herein.

FIG. 35 is a diagram illustrating network synchronization results for a fully connected network where all nodes can communicate with each other, according to an exemplary embodiment. FIG. 35 illustrates that after one cycle, the synchronization precision is 49 nanoseconds. As the number of cycles is increased, synchronization precision improves. When all nodes are within range of $\gamma_{MR}$, the precision results in the tens of nanoseconds range are constantly obtained. For the network as a whole, synchronization precision is the highest when all nodes are within communications range of one another.

Effects of Network Density on Network Synchronization

The effects of network density on the overall precision of the network are explored next.

Simulation Model

The network density by the average number of neighbors per node are measured for any given topology. The performance of our overall time synchronization scheme of determining a network broadcast sequence, performing sequence correction, and then synchronizing via R4Syn or RSP are also investigated. To simulate this, the same two types of networks (sparse and dense) that used previously to evaluate $\delta_{NB}$ are generate. After the nodes are deployed and discover their one-hop neighbors, the starter node $\gamma_{SN}$ is arbitrarily selected to flood the network with a broadcast sequence initiation message. Once determination of $\delta_{NB}$ is complete, nodes conduct a sequence correction check and broadcast messages for ten cycles, synchronizing their clocks to $\gamma_{MR}$ after every tenth cycle. Along the lines of the previous section, we choose ten cycles because a sufficient number of messages are produced to demonstrate whether a synchronization trend exists.

Results

Figure 36:
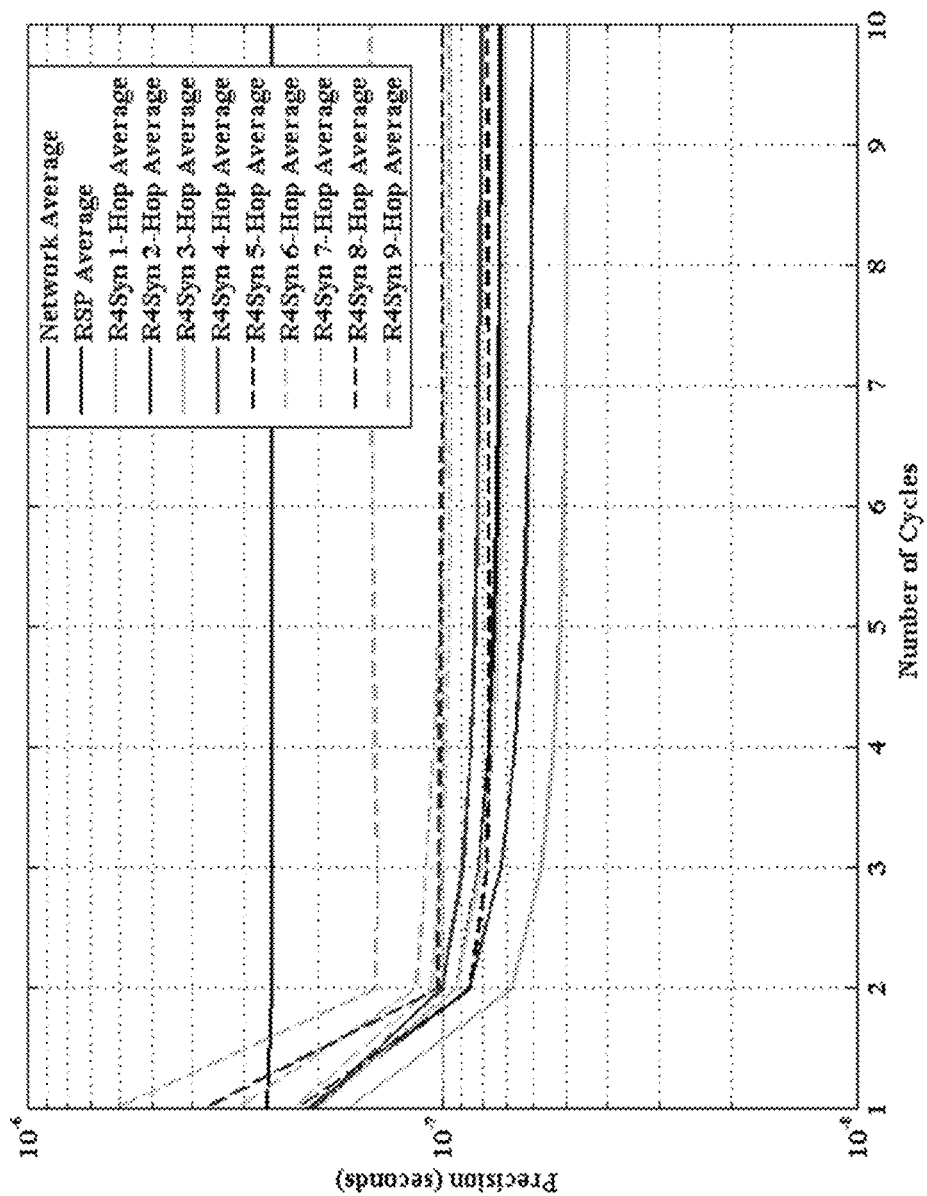
FIG. 36 is a graph illustrating simulation results, according to an exemplary embodiment herein.

FIG. 36 is a diagram illustrating average synchronization of 100 newly-generated topologies of 25-node sparse networks. FIG. 36 illustrates that after one cycle, the network maintains synchronization of less than 0.1 µs precision. Simulation started with sparse networks of 25 nodes, and the network synchronization statistics for 100 newly-generated topologies is observed in FIG. 36. 100 is chosen as the number of topologies because it provided a reasonable amount of data without consuming an excessive amount of time to complete simulations. The simulation results in FIG. 36 validate that as the number of hops increases, the average precision deteriorates, as expected from the previous section. After one cycle, the network maintains synchronization of less than 0.1 µs precision.

Figure 37:
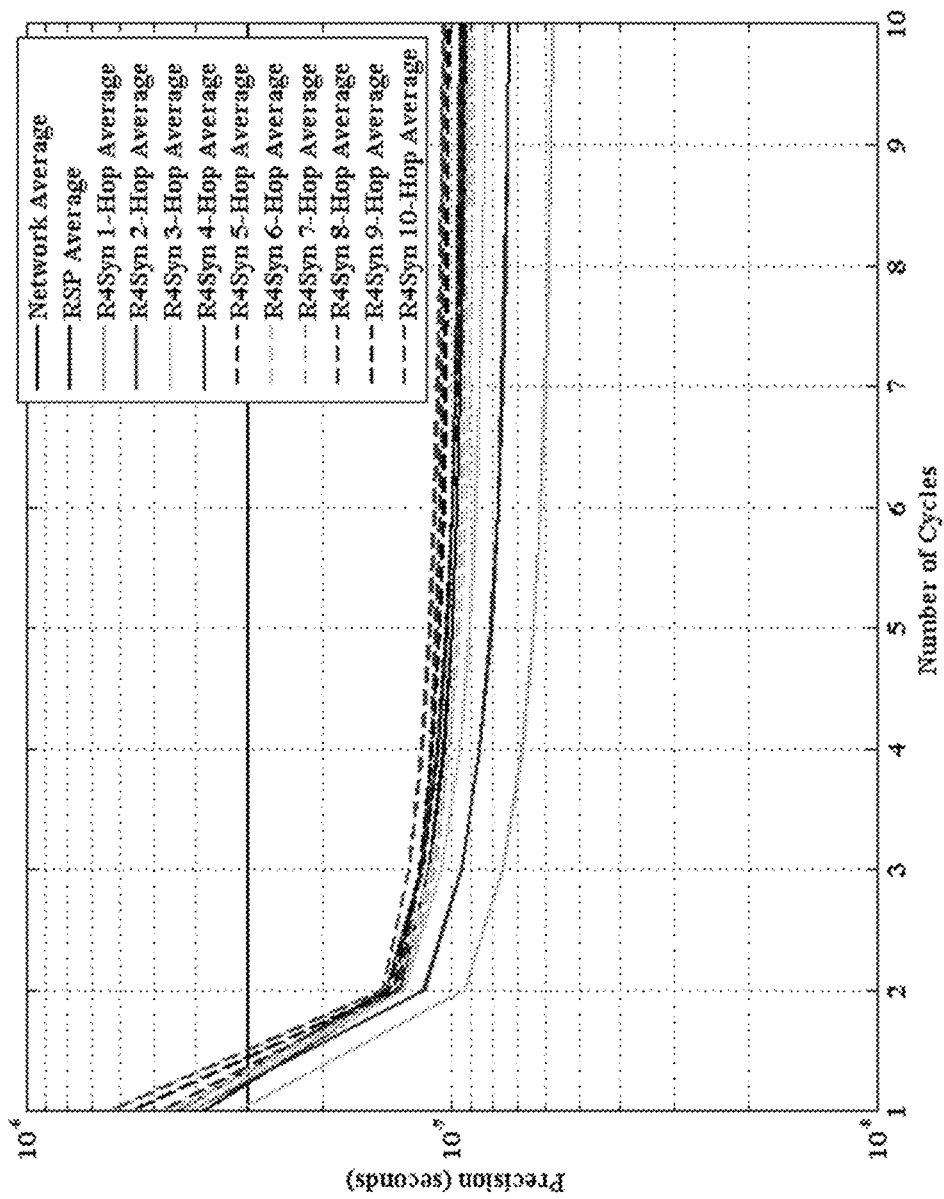
FIG. 37 is a graph illustrating simulation results, according to an exemplary embodiment herein.

FIG. 37 is a diagram illustrating average synchronization of 100 newly-generated topologies of 50-node sparse networks. FIG. 37 illustrates that after about four cycles, the network maintains synchronization of less than 0.1 µs precision. The results in FIG. 37 show that as the number of nodes in the network doubled, the average network precision slightly deteriorated but is kept at an acceptable range. On average, the network maintains synchronization of less than 0.1 µs precision after about four cycles.

Figure 38:
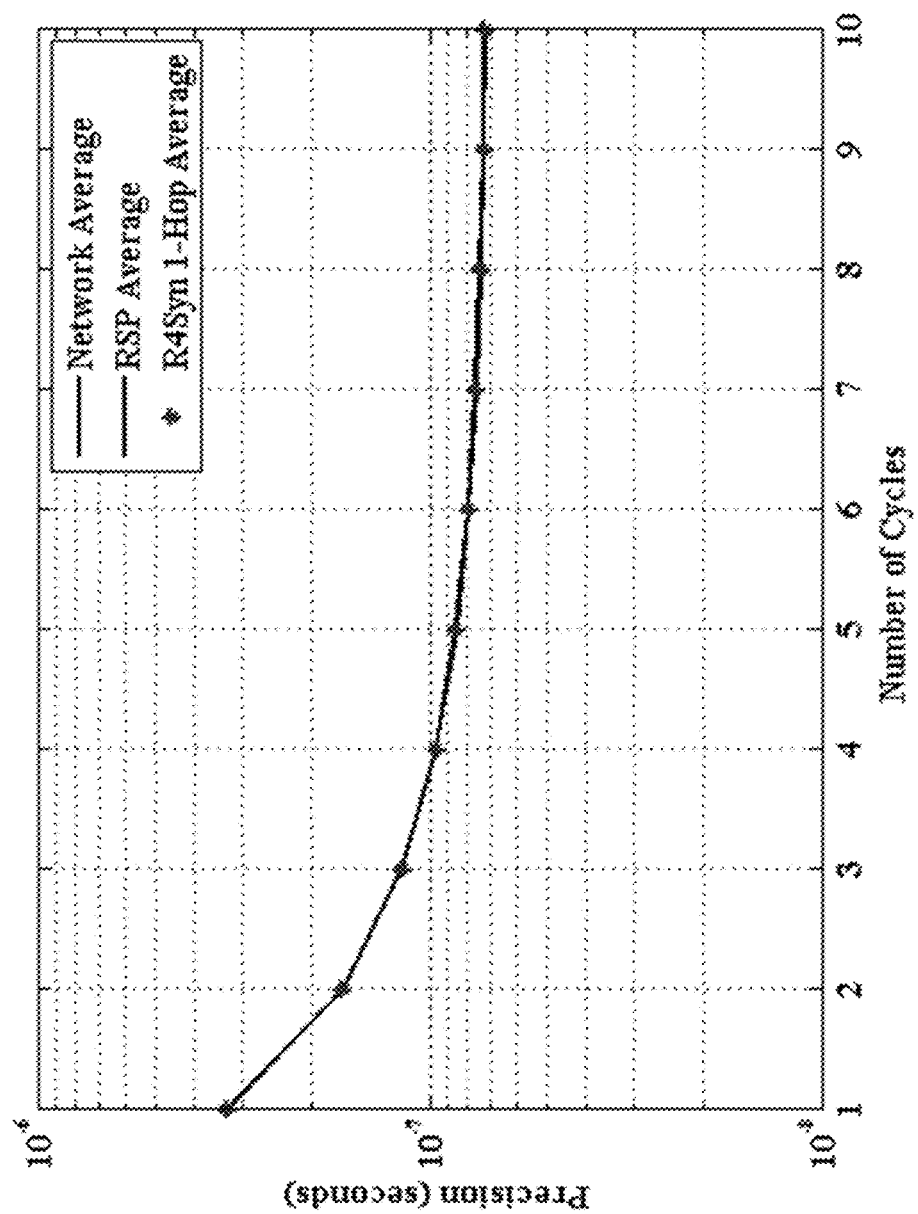
FIG. 38 is a graph illustrating simulation results, according to an exemplary embodiment herein.

FIG. 38 is a diagram illustrating average synchronization of 100 newly-generated topologies of 25-node dense networks. The simulation results in FIG. 38 demonstrate that on average, it takes about four cycles for dense networks to maintain synchronization of less than 0.1 µs precision.

Figure 39:
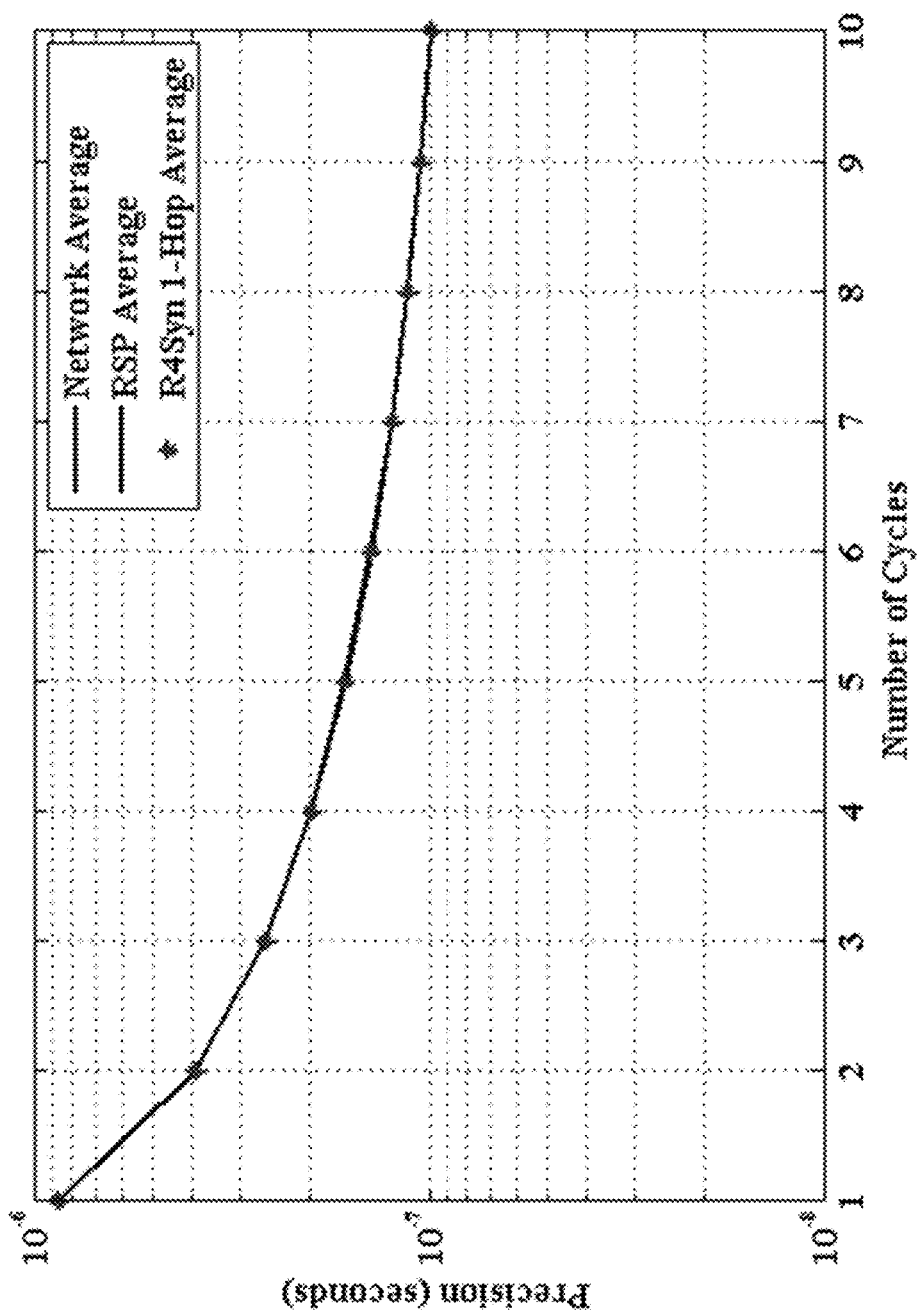
FIG. 39 is a graph illustrating simulation results, according to an exemplary embodiment herein.

FIG. 39 is a diagram illustrating average synchronization of 100 newly-generated topologies of 50-node dense networks. The results in FIG. 39 show that as the number of nodes in the network doubled, the average network precision slightly deteriorated similarly to sparse networks but is still kept at an acceptable range. On average, the network reached synchronization of less than 0.1 µs precision after about ten cycles.

Next, the network densities (average number of neighbors per node) are compared for the two types of networks and found that there was little variability in the average network synchronization.

Figure 40:
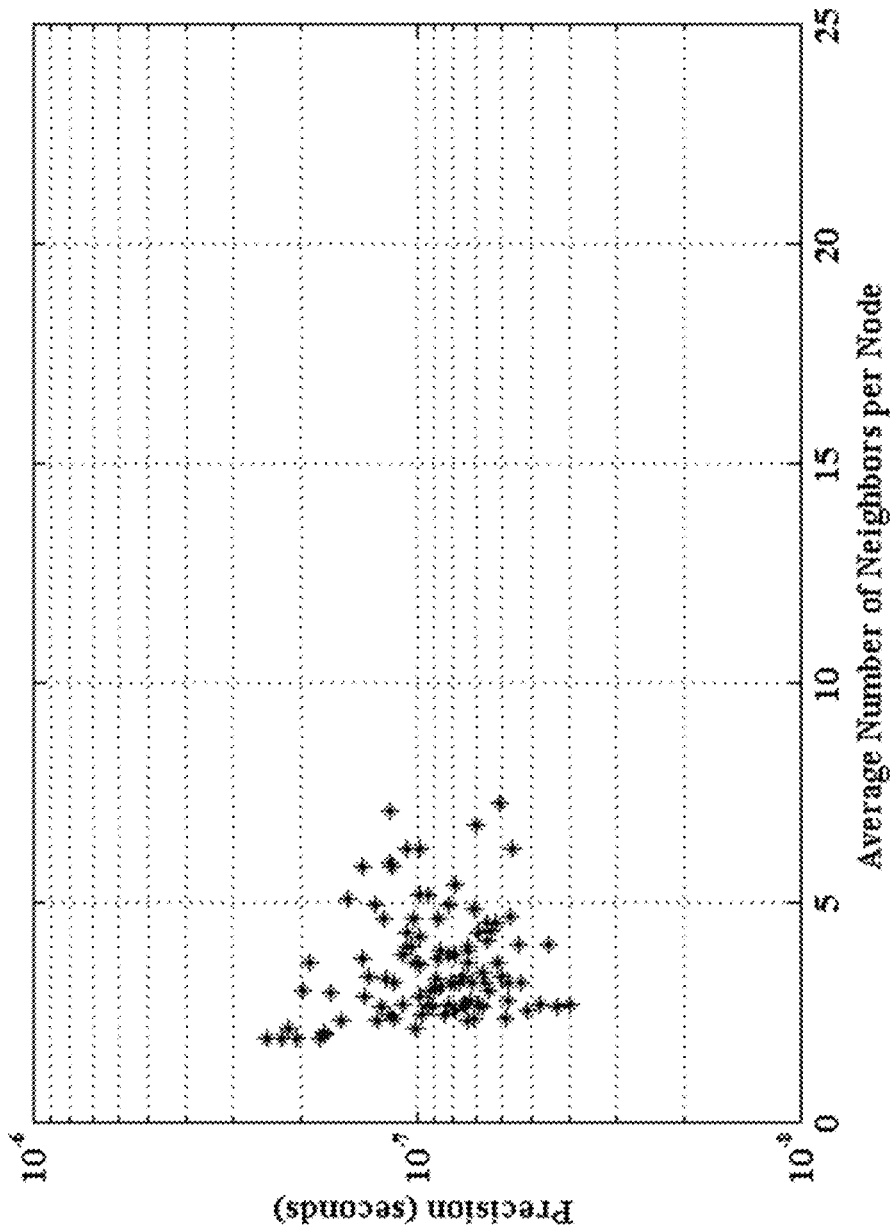
FIG. 40 is a graph illustrating simulation results, according to an exemplary embodiment herein.

FIG. 40 is a diagram illustrating node density versus average clock precision for sparse networks of 25 nodes. FIG. 40 illustrates that the majority of topologies for 25-node sparse networks reached an average synchronization precision of less than 0.1 µs as shown in FIG. 35.

Figure 41:
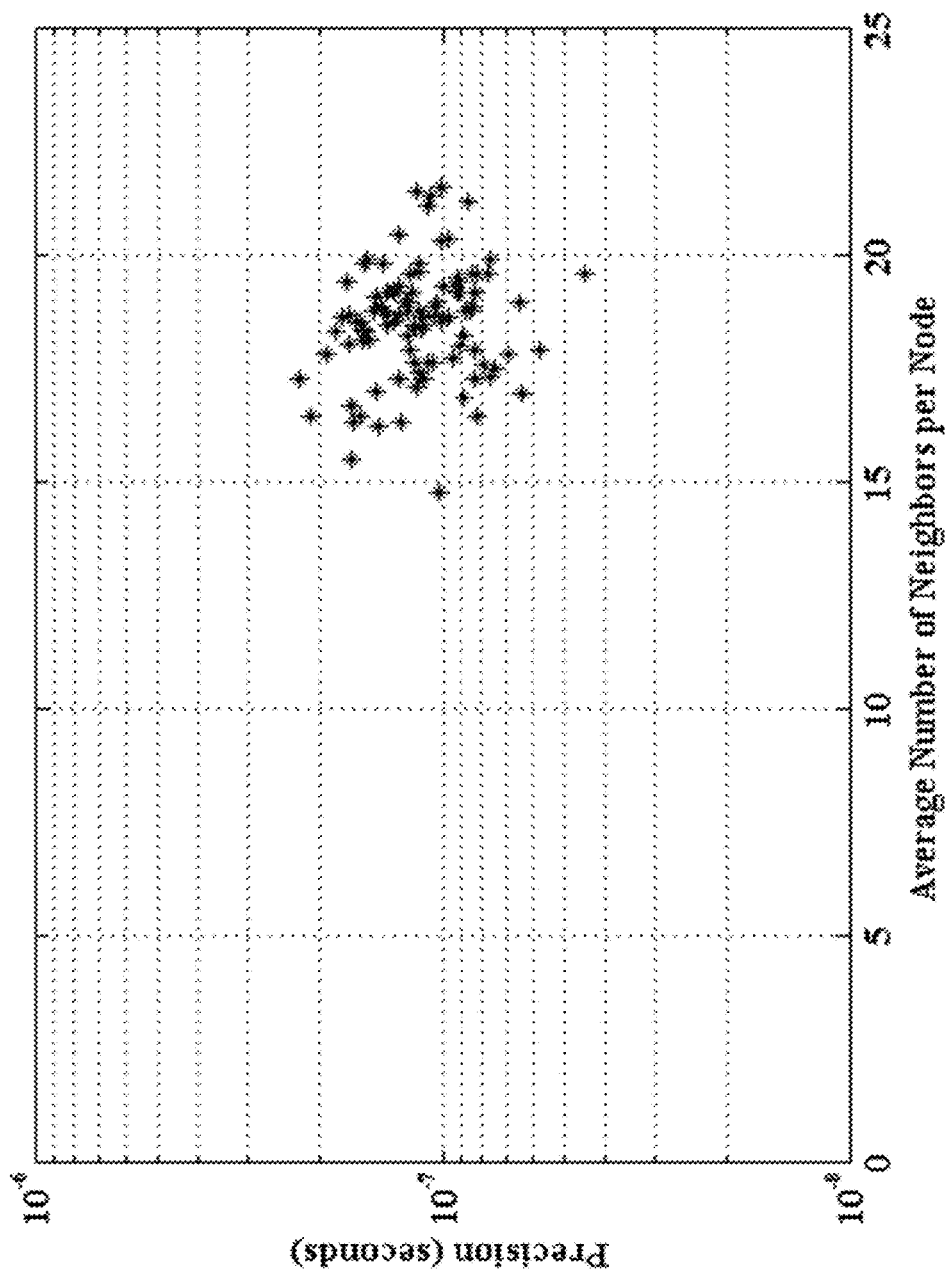
FIG. 41 is a graph illustrating simulation results, according to an exemplary embodiment herein.

FIG. 41 is a diagram illustrating node density versus average clock precision for dense networks of 25 nodes. Comparing the average synchronization of 25-node sparse networks to 25-node dense networks, it is observed that the majority of dense topologies reached an average synchronization of around 0.1 µs as shown in FIG. 41, which is not a significant difference.

Figure 42:
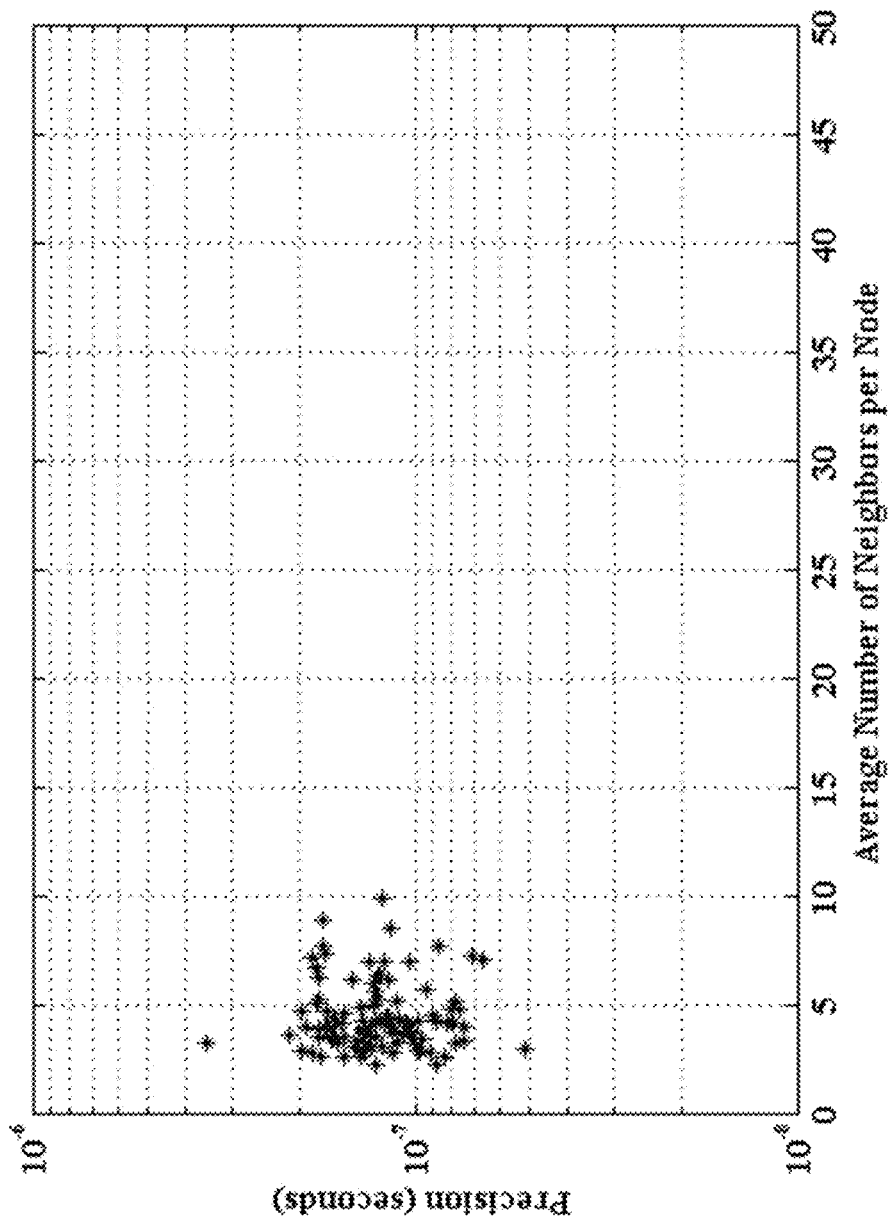
FIG. 42 is a graph illustrating simulation results, according to an exemplary embodiment herein.

FIG. 42 is a diagram illustrating node density versus average clock precision for sparse networks of 50 nodes. FIG. 42 illustrates that when the number of nodes was increased to 50 for sparse networks, the majority of topologies reached an average synchronization of more than 0.1 µs, which is a decline compared to networks of 25 nodes (see FIG. 40).

Figure 43:
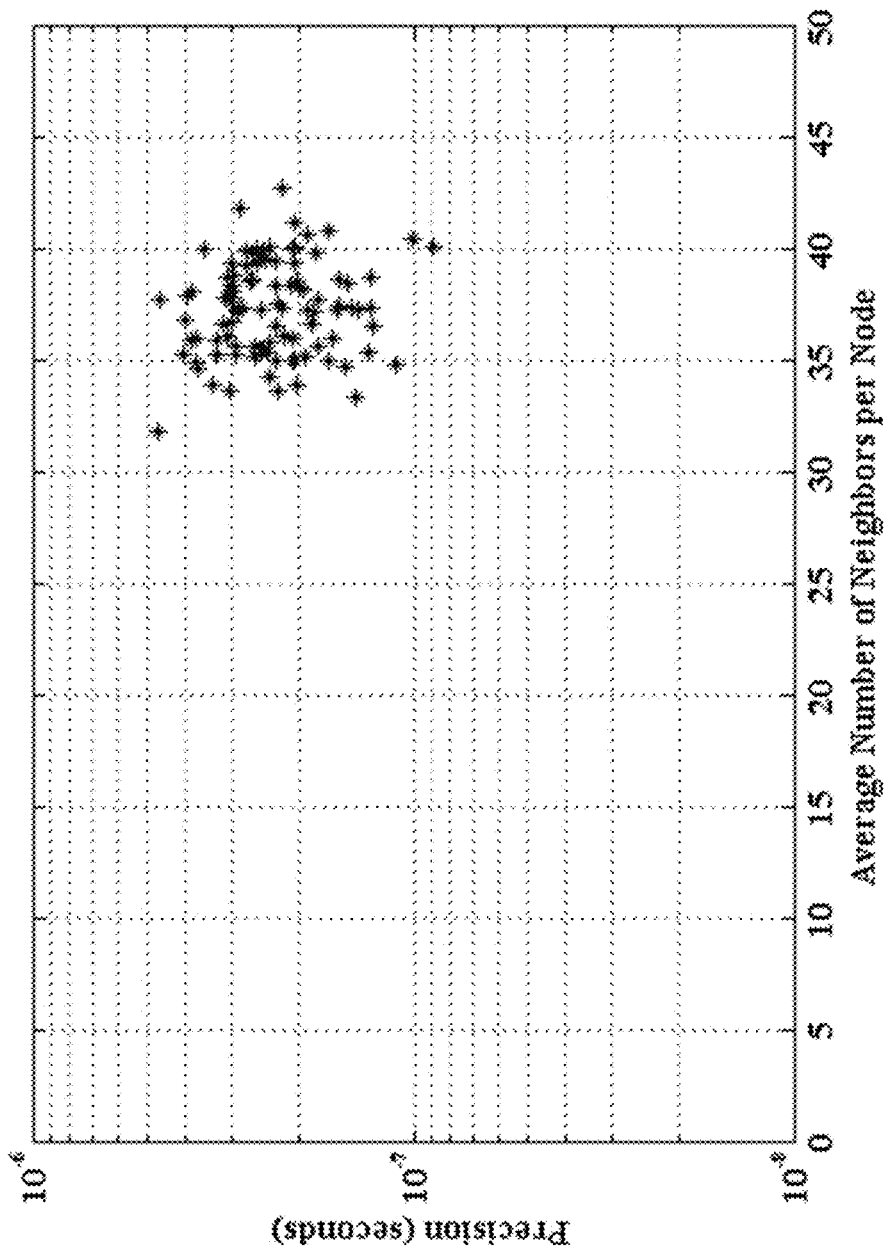
FIG. 43 is a graph illustrating simulation results, according to an exemplary embodiment herein.

FIG. 43 is a diagram illustrating node density versus average clock precision for dense networks of 50 nodes. FIG. 43 illustrates that when the number of nodes was increased to 50 for dense networks, the majority of topologies reached an average synchronization of about 0.2 µs, which is also a decline compared to networks of 25 nodes (see FIG. 41).

Although these simulation results demonstrated that a network's time synchronization degrades as the number of nodes increases using the hybrid scheme, the average level of precision for each network was higher than other time synchronization methods regardless of network topology.

In exemplary embodiments, simulations were conducted to evaluate the performance of our proposed hybrid scheme for wireless network time synchronization. The R4Syn skew and offset estimators were validated. Next, a series of simulations to test the performance of $\delta_{NB}$ determination and demonstrate the utility of a sequence correction check was presented. Finally, the performance of the proposed hybrid scheme using broadcast sequencing through another series of simulations was explored. The results demonstrate that hybrid embodiments improve average network synchronization over other existing time synchronization methods regardless of network topology.

Simulation results demonstrated that methodologies for determining the broadcast sequence and for the sequence correction, according to the embodiments herein, were effective in producing a final broadcast sequence with a high percentage of nodes. Simulation results validated that for any topology, the network's time synchronization is more precise using our hybrid time synchronization embodiment than other previously known time synchronization protocols.

To address the possibility of collisions using R4Syn, an embodiment that determined a specific sequence order and eliminated collisions was presented. The embodiments for determining a specific network broadcast sequence and for sequence correction solve the potential collision problem that is inherent in wireless sensor networks.

An embodiment determines a master reference node to synchronize to and performing multi-hop synchronization using an analysis of timestamp information. This methodology eliminates the need for on-demand synchronization, which leads to more transmissions and a higher probability of collisions.

An embodiment uses a hybrid time synchronization scheme that approaches an average network time synchronization in the nanosecond range for any topology, whereas other known synchronization methods offer time synchronization in the microsecond range. For example, the average network synchronization after one cycle was approximately 49 nanoseconds in a fully-connected network where all nodes are within communications range of one another. For this type of network, each node only has to transmit two broadcasts in one cycle after sequence determination to achieve such a high level of precision. The average network synchronization for multi-hop networks of 25 nodes was approximately 81 nanoseconds after three cycles, which equates to an individual node broadcasting no more than eight messages after sequence determination to achieve that level of precision.

Figure 44:
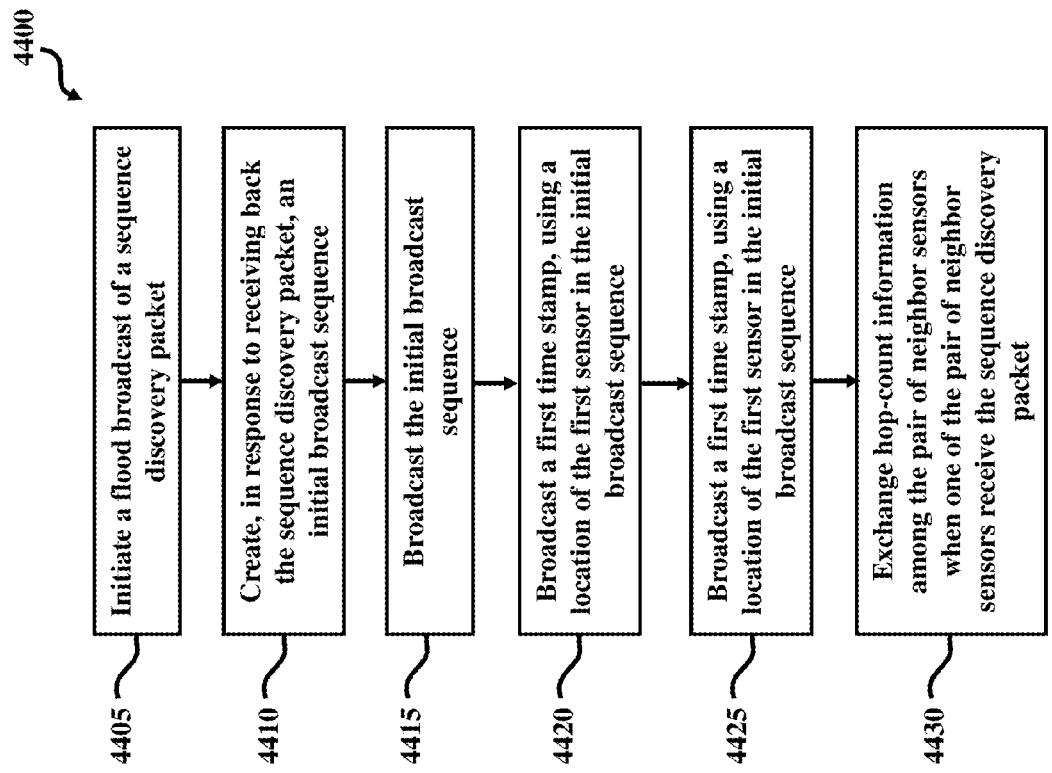
FIG. 44 is a flow diagram illustrating a method according to an embodiment herein.

FIG. 44 is a flow diagram illustrating a method 4400, for synchronizing a plurality of sensors of a wireless sensor network, according to an embodiment herein. At step 4405, method 4400 may initiate, by a first sensor, a flood broadcast of a sequence discovery packet in the wireless sensor network. At step 4410, method 4400 may create, by the first sensor in response to receiving back the sequence discovery packet, an initial broadcast sequence. The initial broadcast sequence includes a list of sensor identifications, and an adjacent pair of sensor identifications in the initial broadcast sequence correspond to a pair of neighbor sensors, and the pair of neighbor sensors are able to communicate directly with each other.

At step 4415, method 4400 may broadcast, by the first sensor, the initial broadcast sequence. The initial broadcast sequence specifies an initial order for the plurality of sensors to broadcast synchronization information to eliminate collisions in the wireless sensor network. At step 4420, method 4400 may broadcast, by the first sensor, a first timestamp, using a location of the first sensor in the initial broadcast sequence.

At step 4425, method 4400 may exchange hop-count information among the pair of neighbor sensors when one of the pair of neighbor sensors receive the sequence discovery packet.

At step 4430, method 4400 may exchange hop-count information among the pair of neighbor sensors when one of the pair of neighbor sensors receive the sequence discovery packet.

Figure 45:
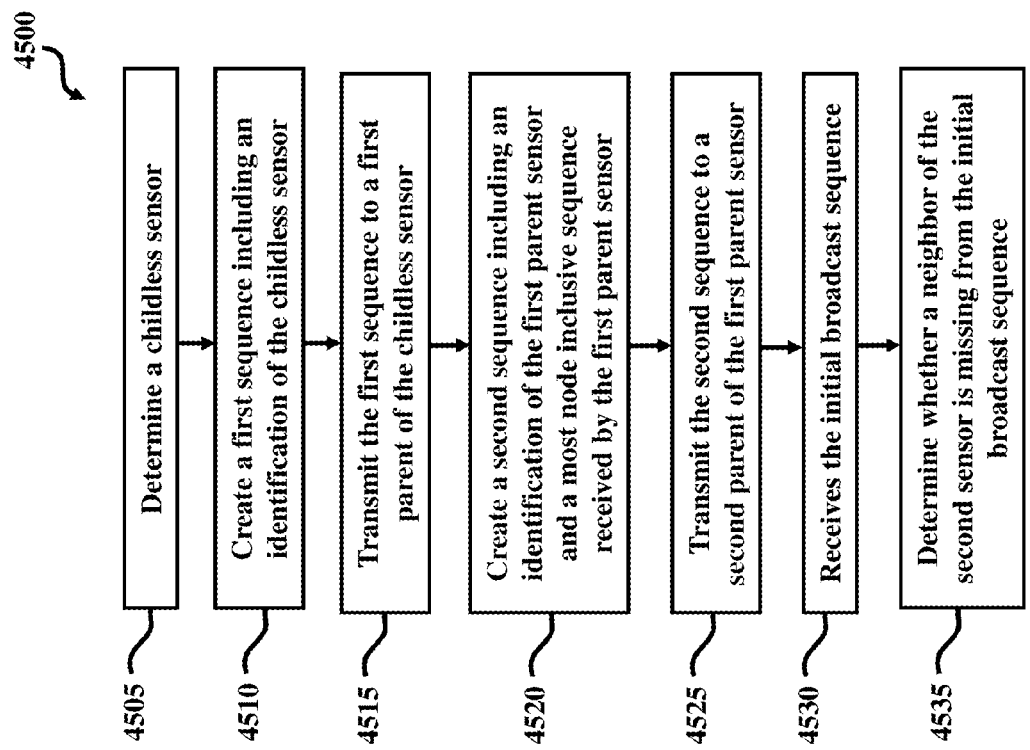
FIG. 45 is a flow diagram illustrating a method according to an embodiment herein.

FIG. 45 is a flow diagram illustrating a method 4500, according to an embodiment. At step 4505, method 4500 may determine a childless sensor. The childless sensor has a largest distance from the first sensor among any neighbors of the childless sensor. At step 4510, method 4500 may create, by the childless sensor, a first sequence including an identification of the childless sensor. At step 4515, method 4500 may transmit, by the childless sensor, the first sequence to a first parent of the childless sensor. The first parent sensor is a neighbor of the childless sensor and has a shorter distance to the first sensor than the childless sensor.

At step 4520, method 4500 may create, by the first parent sensor, a second sequence including an identification of the first parent sensor and a most node inclusive sequence received by the first parent sensor. The first most node inclusive sequence includes more sensor identifications than other sequences received by the parent. At step 4525, method 4500 may transmitting, by the first parent, the second sequence to a second parent of the first parent sensor. The second parent sensor is a neighbor of the first parent sensor and has a shorter distance to the first sensor than the first parent sensor. The initial broadcasting sequence may include an identification of the first sensor and a final most node inclusive sequence received by the first sensor.

At step 4530, method 4500 may receive, by a second sensor, the initial broadcast sequence. At step 4535, method 4500 may determine, by the second sensor, whether a neighbor of the second sensor is missing from the initial broadcast sequence.

Figure 46:
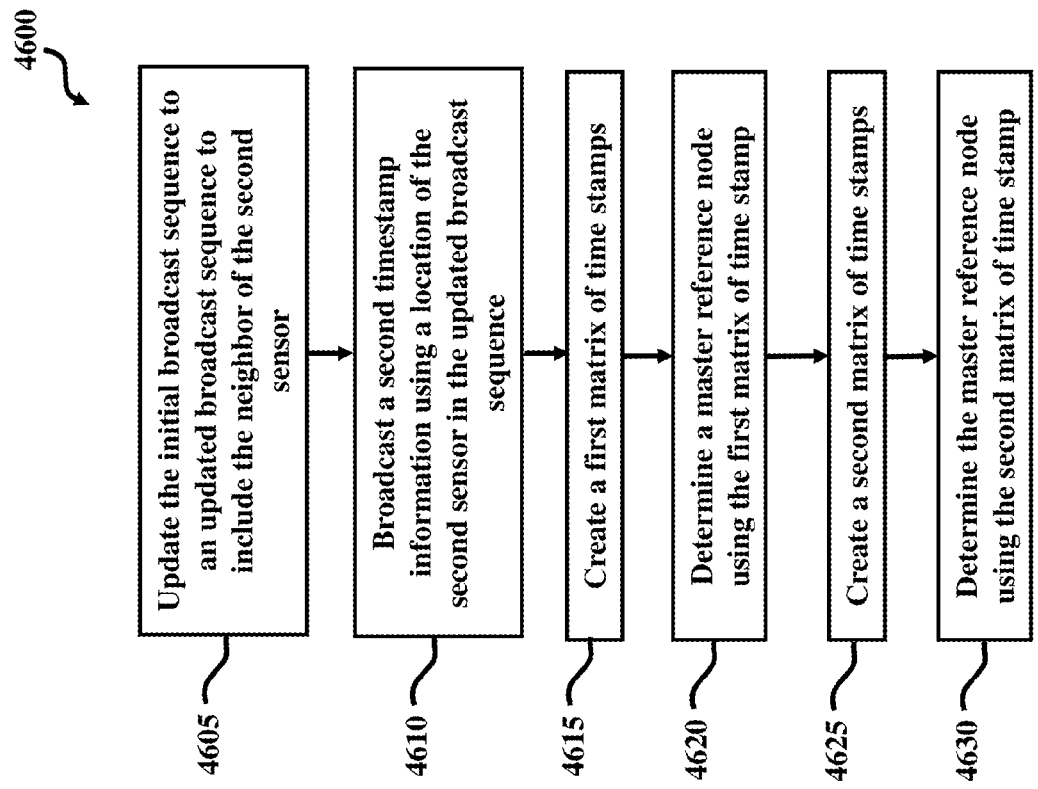
FIG. 46 is a flow diagram illustrating a method according to an embodiment herein.

FIG. 46 is a flow diagram illustrating a method 4600, according to an embodiment. At step 4605, method 4600 may update, by a second sensor, the initial broadcast sequence to an updated broadcast sequence to include the neighbor of the second sensor, when the second sensor determines that the neighbor of the second sensor is missing from the initial broadcast sequence. The updated broadcast sequence specifies an updated order for the plurality of sensors to broadcast the synchronization information to eliminate collisions in the wireless sensor network.

At step 4610, method 4600 may broadcast, by the second sensor, a second timestamp information using a location of the second sensor in the updated broadcast sequence. At step 4615, method 4600 may create, by the first sensor, a first matrix of timestamps. The first matrix of timestamp includes a plurality of timestamps received by the first sensor. At step 4620, method 4600 may determine, by the first sensor, a master reference node using the first matrix of timestamp. The first sensor uses the master reference node as a reference for synchronization.

At step 4625, method 4600 may create, by the second sensor, a second matrix of timestamps. The second matrix of timestamp includes a plurality of timestamps received by the second sensor. At step 4630, method 4600 may determine, by the second sensor, the master reference node using the second matrix of timestamp. The second sensor uses the master reference node as a reference for synchronization. The plurality of timestamp information may include information indicating relative time skew with the master reference node.

Figure 47:
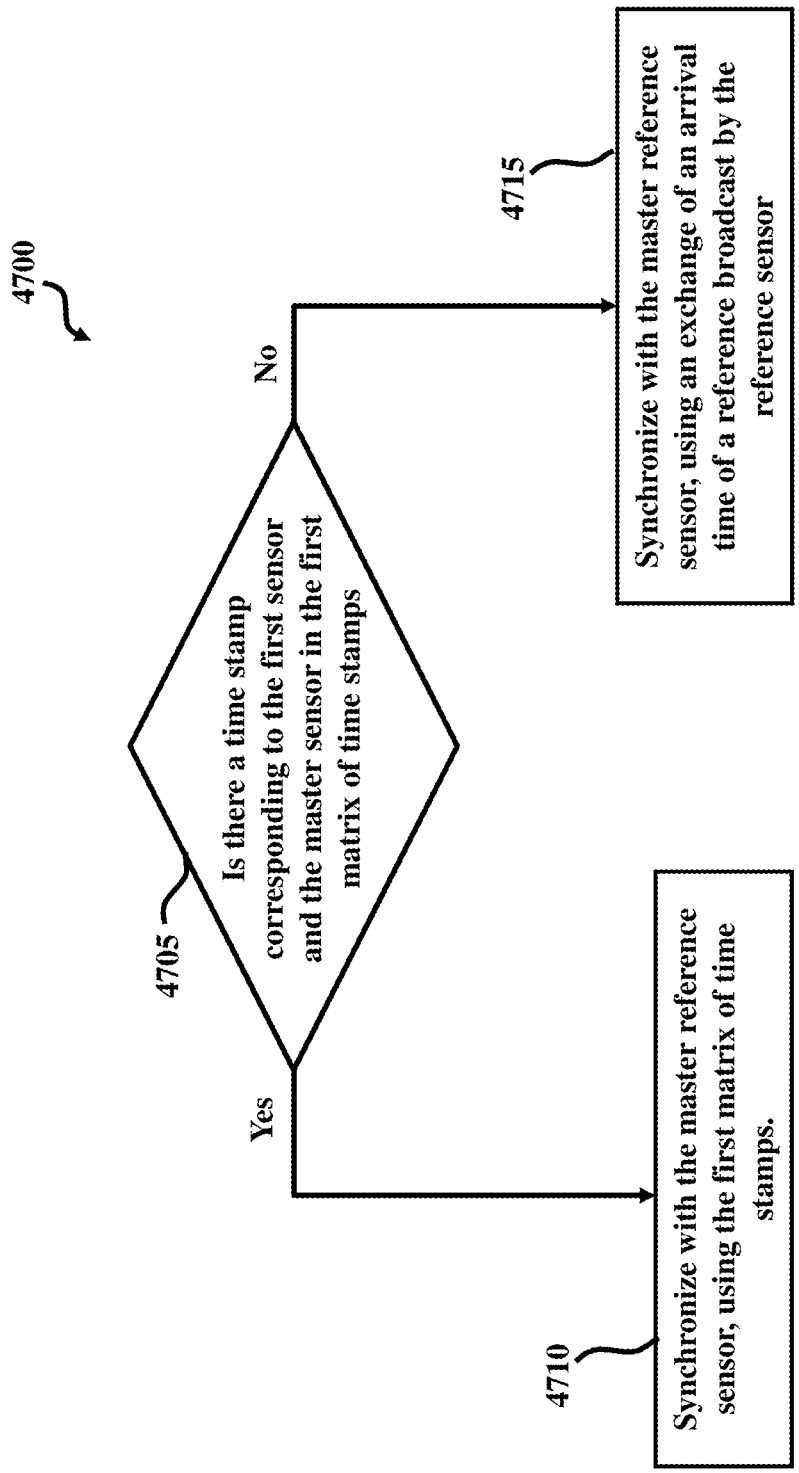
FIG. 47 is a flow diagram illustrating a method according to an embodiment herein.

FIG. 47 is a flow diagram illustrating a method 4700, according to an embodiment herein. At step 4705, method 4700 determines whether there is a timestamp corresponding to the first sensor and the master sensor in the first matrix of timestamps. When there is a timestamp corresponding to the first sensor and the master sensor in the first matrix of timestamps, at step 4710, method 4700 may synchronize, by the first sensor, with the master reference sensor, using the first matrix of timestamps. When there is no timestamp corresponding to the first sensor and the master sensor in the first matrix of timestamps, at step 4715, method 4700 may synchronize, by the first sensor, with the master reference sensor, using an exchange of an arrival time of a reference broadcast by the reference sensor.

Figure 48:
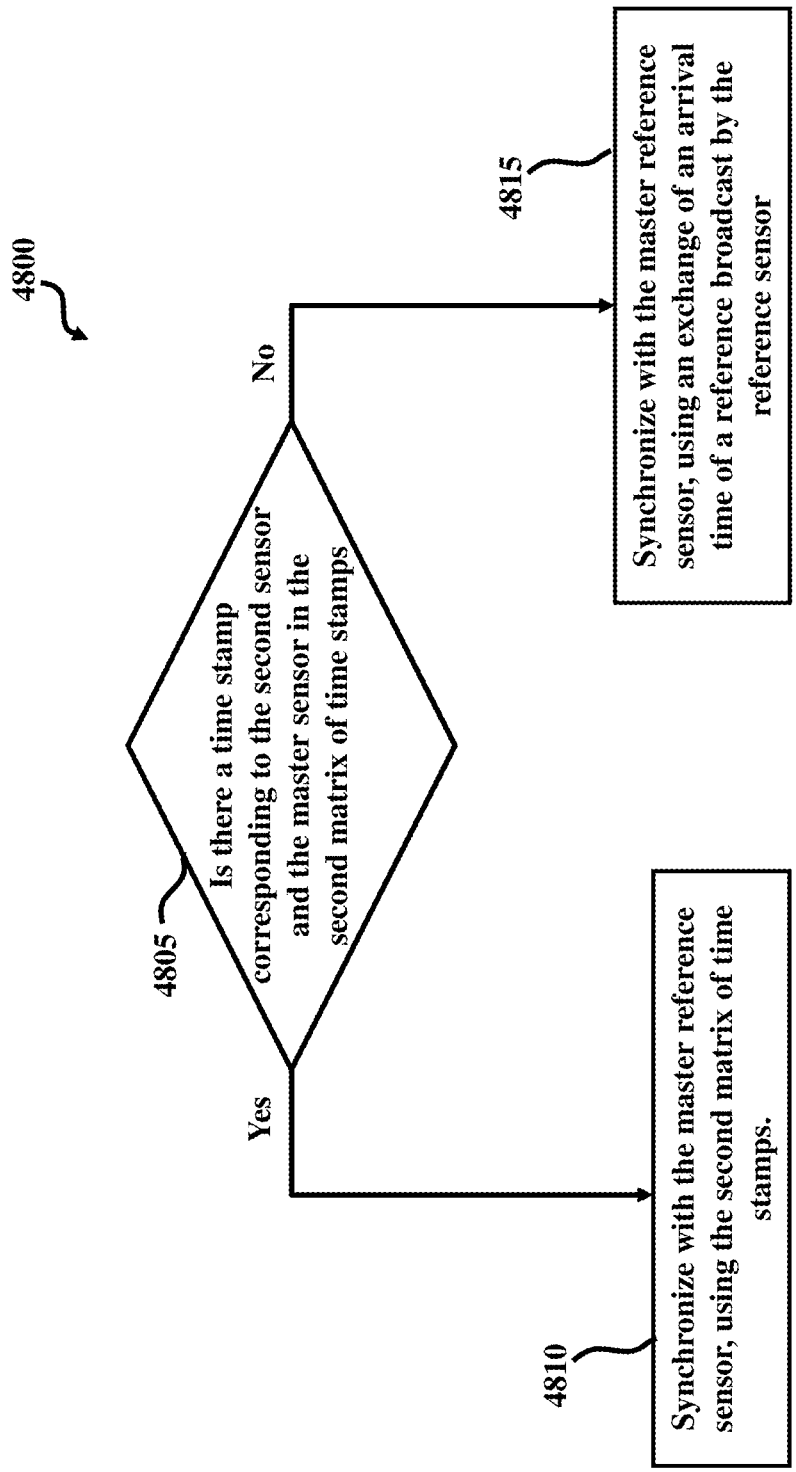
FIG. 48 is a flow diagram illustrating a method according to an embodiment herein.

FIG. 48 is a flow diagram illustrating a method 4800, according to an embodiment herein. At step 4805, method 4800 determines whether there is a timestamp corresponding to the second sensor and the master sensor in the second matrix of timestamps. When there is a timestamp corresponding to the second sensor and the master sensor in the second matrix of timestamps, at step 4810, method 4800 synchronizes, by the second sensor, with the master reference sensor, using the second matrix of timestamps. When there is no timestamp corresponding to the second sensor and the master sensor in the second matrix of timestamps, at step 4815, method 4800 synchronizes, by the second sensor, with the master reference sensor, using an exchange of an arrival time of a reference broadcast by the reference sensor.

Some components of the embodiments herein can include a computer program product configured to include a pre-configured set of instructions stored in non-volatile memory, which when performed, can result in actions as stated in conjunction with the methods described above. For example, each sensor node in the wireless sensor networks described herein may include a computer program. Methods described herein may be implemented using computer programs on sensor nodes, or a central processing device. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here.

The embodiments herein may also include tangible and/or non-transitory computer-readable storage media for carrying or having computer executable instructions or data structures stored thereon. Such non-transitory computer readable storage media can be any available media that can be accessed by a special purpose computer, including the functional design of any special purpose processor, module, or circuit as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose computer or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor, and may be configured, for example, as a kiosk.

The embodiments herein can include both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 49:
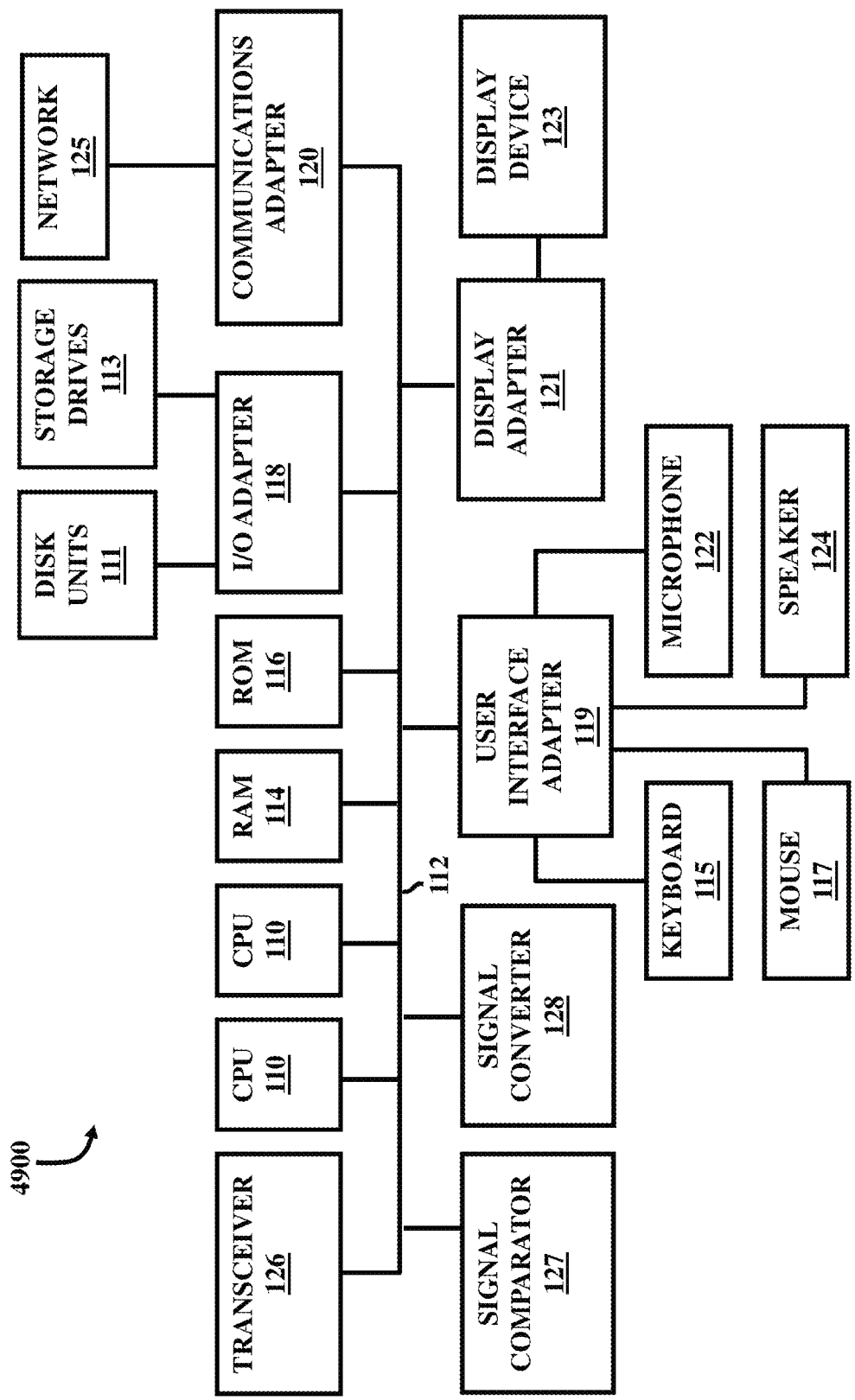
FIG. 49 is a schematic diagram illustrating an exemplary computer architecture used in accordance with the embodiments herein.

A representative hardware environment for practicing the embodiments herein is depicted in FIG. 49, with reference to FIGS. 1 through 48. This schematic drawing illustrates a hardware configuration of an information handling/computer system 4900 in accordance with an exemplary embodiment herein. The system 4900 comprises at least one processor or central processing unit (CPU) 110. The CPUs 110 are interconnected via system bus 112 to various devices such as a random access memory (RAM) 114, read-only memory (ROM) 116, and an input/output (I/O) adapter 118. The I/O adapter 118 can connect to peripheral devices, such as disk units 111 and storage drives 113, or other program storage devices that are readable by the system. The system 4900 can read the inventive instructions on the program storage devices and follow these instructions to execute the methodology of the embodiments herein. The system 4900 further includes a user interface adapter 119 that connects a keyboard 115, mouse 117, speaker 124, microphone 122, and/or other user interface devices such as a touch screen device (not shown) to the bus 112 to gather user input. Additionally, a communication adapter 120 connects the bus 112 to a data processing network 125, and a display adapter 121 connects the bus 112 to a display device 123 which may be embodied as an output device such as a monitor, printer, or transmitter, for example. Further, a transceiver 126, a signal comparator 127, and a signal converter 128 may be connected with the bus 112 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

APPENDIX

This appendix provides an exemplary example of computer program code, which may be used to implement the methodology provided by the embodiments of the invention. The computer program code described below, which is written in MATLAB® software language, is merely an example of the implementation of the embodiments of the invention, and those skilled in the art would readily understand that other computer program codes could equally be used in accordance with a programmer's preferred choice, and the embodiments of the invention are not limited to any particular computer language or code to implement the embodiments of the invention.

The MATLAB® software source code presented in this section can be used to test the R4Syn estimators. The code can only be run to simulate four nodes broadcasting for ten cycles for the one-hop scenario. For the multi-hop scenario, the code can only be run to simulate up to ten hops.

```
% Validation of R4Syn estimators clc, clear all, close all

%initialize values
N = 4;    %number of nodes
J = 51;   %total number of cycles needed for Node 2's calculations
S = 1000; %number of measurements
sigma = 1e-6;
%B = 10;   %number of hops              %un-comment for multi-hop
%TotalMSEskew = zeros(B,10);            %un-comment for multi-hop
SumMSEskew = zeros(1,10); SumMSEoffset = zeros(1,10);
SumCRLBskew = zeros(1,10); SumCRLBoffset = zeros(1,10);
%for rrr=1:S                            %un-comment for multi-hop
%   MH_ActualSkew = zeros(1,B);         %un-comment for multi-hop
%   MH_Actual_Skew = [];                %un-comment for multi-hop
%   XXX = cell(B,1);                    %un-comment for multi-hop
%   for MH=1:B                          %un-comment for multi-hop
```

```
for iii=1:S                    %remove for multi-hop
  FinalMSEskew = [];   %remove for multi-hop
  FinalMSEoffset = []; %remove for multi-hop
  FinalCRLBskew = [];    %remove for multi-hop
  FinalCRLBoffset = [];  %remove for multi-hop
  %set distance between nodes
  d = zeros(N,N);
  for i=1:N
    for k=1:N
      if i~=k && k>i
        d(i,k) = 90 + sqrt(5).*randn(1,1);
        d(k,i) = d(i,k);
      else
      end
    end
  end
  %processing times
  xx = 100; yy = 500;
  t_p = xx + (yy-xx).*rand(1,N);
  t_proc = t_p*(1e-3);
  %propagation times
  c = 3e8;
  t_prop = zeros(N,N);
  for i = 1:N
    for k = 1:N
      t_prop(i,k) = d(i,k)./c;
      t_prop(k,i) = t_prop(i,k);
    end
  end
  %set random frequencies
  r = -.25; q = .25;
  F = r + (q-r).*rand(1,N);
  f = 1 + F;
  %relative skew matrix (saved for MSE calc)
  RelSkew = ones(N,N);
  for i = 1:N
    for k = 1:N
      RelSkew(i,k) = f(k)./f(i);
    end
  end
  sk = RelSkew;
  Node1Clock = 0;
  x = -10; y = 10;
  RandOffset = x + (y-x).*rand(1,N-1);
  StartOffset = Node1Clock + RandOffset;
  %simulate first cycle of timestamps
```

```
TS = zeros(N,N);
for i = 1:N-1
  TS(i+1,1) = StartOffset(i) + t_prop(1,i+1)*sk(1,i+1);
end
TS(1,2) = Node1Clock + (t_proc(2) + 2*t_prop(1,2))*sk(1,2);
for i = 1:N-2
  TS(1,i+2) = TS(1,i+1) + (t_proc(i+2) + t_prop(1,i+2))*sk(1,i+2);
end
for i=2:N
  for k=2:N
    if i==k
      TS(i,k) = 0;
    elseif i == k-1
      TS(i,k) = TS(i,k-2) + (t_proc(i) + t_proc(k) + (2*t_prop(i,k)))*sk(i,k);
    else
      TS(i,k) = TS(i,k-1) + (t_proc(k) + t_prop(i,k))*sk(i,k);
    end
  end
end
%simulate the rest of the timestamps for J cycles
for h = 2 : J
  TS = [TS zeros(N,N)];
  for i=1:N
    for k = ((h-1)*N)+1 : h*N
      if i == k-(h-1)*N
        TS(i,k) = 0;
      elseif i == k -(N*(h-1)+1)
        TS(i,k) = TS(i,k-2) + (t_proc(i)+t_proc(i+1) + (2*t_prop(i,i+1)))*sk(i,i+1);
      elseif i == (k-1) - (h-2)*N
        TS(i,k) = TS(i,k-2) + (t_proc(1)+t_proc(i) + (2*t_prop(i,1)))*sk(i,1);
      else
        TS(i,k) = TS(i,k-1) + (t_proc(k-(h-1)*N) + t_prop(i, k-(h-1)*N))*sk(i,k-(h-1)*N);
      end
    end
  end
end
%initialize zero matrix for each node
for i = 1:N
  Node{i} = zeros(N,N);
  for k = 1:J-1
    Node{i} = [Node{i} zeros(N,N)];
  end
end
for i = 2:N
  Node{i}(i,1) = TS(i,1);
end
```

```
for k = 2:N
  for i=1:N
    if i~=k
      Node{i}(k,1:k-1) = TS(k,1:k-1);
      Node{i}(i,k) = TS(i,k);
    else continue
    end
  end
end
for h = 2 : J
  for k = 1:N
    for i=1:N
      if i~=k
        Node{i}(k,((h-1)*N+k)-3 : ((h-1)*N+k)-1) = TS(k,((h-1)*N+k)-3 : ((h-1)*N+k)-1);
        Node{i}(i,(h-1)*N+k) = TS(i,(h-1)*N+k);
      else continue
      end
    end
  end
end
%gathering values for offset/skew calculations
for gg=6:5:51
  for i=1:N
    values{i} = cell(N,2);
  end
  for i=1:N
    for k = 1 : gg * N
      if Node{i}(i,k) ~= 0
        for m=1:N
          if Node{i}(m,k)~=0 && m~=i
            values{i}{m,1} = [values{i}{m,1} Node{i}(m,k)];
            values{i}{m,2} = [values{i}{m,2} Node{i}(i,k)];
          else continue
          end
        end
      else continue
      end
    end
  end
  EstimatorSkew = ones(N,N);
  EstimatorOffset = zeros(N,N);
  for ii=1:N
    for kk=1:N
      u = values{ii}{kk,1};
      v = values{ii}{kk,2};
      if length(u)>1
```

```
      K = length(u);
      %calculate estimators per R4Syn
      skew = (sum(u)*sum(v) - K*(u*v')) / ((sum(v)).^2 - K*sum(v.^2));
      offset = (1/K) * ( sum(u)-(skew*sum(v)) );
      EstimatorSkew(ii,kk) = skew;
      EstimatorOffset(ii,kk) = offset;

skewCRLB = (K*sigma^2) / ((K*sum(v.^2)) - ((sum(v)).^2)) ;
      offsetCRLB = ((sigma^2)*(sum(v.^2))) / ((K*sum(v.^2)) - ((sum(v)).^2)) ;
      CRLBskewMatrix(ii,kk) = skewCRLB;
      CRLBoffsetMatrix(ii,kk) = offsetCRLB;
    else continue
    end
   end
  end
% ######UN-COMMENT THE FOLLOWING SECTION FOR MULTI-HOP#######
  %XXX{MH} = [XXX{MH} EstimatorSkew(2,1)];
  %end
% end
 % MSEskewHop=cell(B,1);
 %MH_Est_Skew = [];
 %for aa = 1:B
   %if aa == 1
   % MH_Est_Skew = XXX{1};
   %else
   %  MH_Est_Skew = MH_Est_Skew.*XXX{aa};
  % end
 %  MSEskewHop{aa} = (MH_ActualSkew(aa) - MH_Est_Skew).^2;
 %end
 %Z= zeros(B,10);
 %for i=1:B
  % Z(i,:) = MSEskewHop{i};
 %end
 % TotalMSEskew = TotalMSEskew + Z;
%end
%AverageMSEfreq = TotalMSEskew./S;
%figure()
%surf(AverageMSEfreq)
%set(gca, 'XScale', 'linear', 'YScale', 'linear', 'ZScale', 'log')
%xlabel('Number of Messages'), ylabel('Number of Hops'), zlabel('MSE')
%grid on
% #########END UN-COMMENTED SECTION FOR MULTI-HOP#########
   RelOffset = zeros(N,N);
   for i=1:N
    for p = (gg-1) * N: gg*N - 1
     for k=1:N
```

```
    if i==k
      RelOffset(i,k)=0;
    elseif TS(i,p)~=0 && TS(k,p)~=0
      RelOffset(i,k) = TS(k,p) - RelSkew(i,k)*TS(i,p);
    else continue
    end
   end
  end
 end
 MSEskew = (RelSkew - EstimatorSkew).^2;
 MSEoffset = (RelOffset - EstimatorOffset).^2;
 FinalMSEskew = [FinalMSEskew MSEskew(2,1)];
 FinalMSEoffset = [FinalMSEoffset MSEoffset(2,1)];
 FinalCRLBskew = [FinalCRLBskew CRLBskewMatrix(2,1)];
 FinalCRLBoffset = [FinalCRLBoffset CRLBoffsetMatrix(2,1)];
 end
 SumMSEskew = SumMSEskew + FinalMSEskew;
 SumMSEoffset = SumMSEoffset + FinalMSEoffset;
 SumCRLBskew = SumCRLBskew + FinalCRLBskew;
 SumCRLBoffset = SumCRLBoffset + FinalCRLBoffset;
end
AverageMSEskew = SumMSEskew./S;
AverageMSEoffset = SumMSEoffset./S;
AverageCRLBfreq = SumCRLBskew./S;
AverageCRLBoffset = SumCRLBoffset./S;
X = 10:10:100;
figure()
semilogy(X, AverageMSEskew, 'bo-', X, AverageCRLBfreq,'rx:')
xlabel('Number of Messages'), ylabel('MSE')
legend('MSE', 'CRLB', 'location', 'northeast')
figure()
semilogy(X, AverageMSEoffset,'bo-', X, AverageCRLBoffset,'rx:')
xlabel('Number of Messages'), ylabel('MSE (sec)')
legend('MSE', 'CRLB', 'location', 'northeast')
```

B. MATLAB BROADCAST SEQUENCING AND HYBRID TIME SYNCHRONIZATION SIMULATION FILE

The MATLAB source code presented in this section can be used to test the broadcast sequencing and hybrid time synchronization scheme presented in Chapter III and Chapter IV of this thesis. The broadcast sequencing code is run by changing the number of nodes, type of topology, and the number of topologies to the desired scenario. The hybrid time synchronization code is run by changing the topology type, the number of nodes, and the number of topologies to the desired scenario.

```
% Broadcast sequencing and hybrid time synchronization file
% un-comment and/or remove lines of code as instructed for the desired scenario
clc, clear all, close all numTopol = 100;
C = 10;
% ######### delete the following for only broadcast sequencing #############
t_avg_prec = zeros(1,C); t_avg_1hop = zeros(1,C); t_avg_2hop = zeros(1,C); t_avg_3hop =
zeros(1,C); t_avg_4hop = zeros(1,C); t_avg_5hop = zeros(1,C); t_avg_6hop = zeros(1,C);
t_avg_7hop = zeros(1,C); t_avg_8hop = zeros(1,C); t_avg_9hop = zeros(1,C); t_avg_10hop
= zeros(1,C); t_avg_RSP = zeros(1,C);
ctprec=0; ct1hop=0; ct2hop=0; ct3hop=0; ct4hop=0; ct5hop=0; ct6hop=0; ct7hop=0;
ct8hop=0; ct9hop=0; ct10hop=0; ctRSP=0;
% ##################################################################
%BP = 0;     un-comment for broadcast sequencing
%AP = 0;     un-comment for broadcast sequencing for nT = 1:numTopol
  clear S alltimes CL column nodescansync nodetimes newtime TS seqIDs sync_max row
onecycle values
  close (figure(1))
  %% Input values
  N = 50;     % number of nodes in WSN
  maxrange = 100;   % maximum effective range of nodes (meters)
  topolsize = 'Sparse';
  idlength = 2;
  range = sqrt((maxrange.^2)/2);
  S(1).xd = 0; S(1).yd = 0;  % first node centered at origin
  hold on
  figure(1)
  plot(S(1).xd, S(1).yd, 'g*');
  nodeID = assignID(idlength);
  S(1).ID = {nodeID};
  uistack(text(S(1).xd, S(1).yd, S(1).ID,'EdgeColor','k', 'BackgroundColor', 'w'),'top');
  nodeIDlist = S(1).ID;
  %% Generate the WSN field and show topology
  if (strcmp(topolsize,'Sparse'))
    signx(1) = sign(randn(1));
    signy(1) = sign(randn(1));
    for i=2:N
    S(i).xd = S(i-1).xd + signx(i-1)*((range-range/3) + (range/3).*rand(1,1));
    S(i).yd = S(i-1).yd + signy(i-1)*((range-range/3) + (range/3).*rand(1,1));
    figure(1)
    plot(S(i).xd, S(i).yd, 'ro');
    nodeID = assignID(idlength);
    S(i).ID = {nodeID};
```

```
    while(sum(strcmp(S(i).ID, nodeIDlist))==1)
      nodeID = assignID(idlength);
      S(i).ID = {nodeID};
    end
    uistack(text(S(i).xd, S(i).yd, S(i).ID,'EdgeColor','k', 'BackgroundColor', 'w'),'top');
    nodeIDlist = [nodeIDlist S(i).ID];
    signx(i) = sign(randn(1));
    signy(i) = sign(randn(1));
    while signx(i) == -signx(i-1) && signy(i)== -signy(i-1)
      signx(i) = sign(randn(1));
      signy(i) = sign(randn(1));
    end
  end
elseif (strcmp(topolsize,'Dense'))
  for i=2:N
    S(i).xd = -range + (2*range).*rand(1,1);
    S(i).yd = -range + (2*range).*rand(1,1);
    figure(1)
    plot(S(i).xd, S(i).yd, 'r*');
    nodeID = assignID(idlength);
    S(i).ID = {nodeID};
    while(sum(strcmp(S(i).ID, nodeIDlist))==1)
      nodeID = assignID(idlength);
      S(i).ID = {nodeID};
    end
    uistack(text(S(i).xd, S(i).yd, S(i).ID,'EdgeColor','k', 'BackgroundColor', 'w'),'top');
    nodeIDlist = [nodeIDlist S(i).ID];
  end
end
xlabel('x-axis (meters)', 'FontSize', 12);    ylabel('y-axis (meters)', 'FontSize', 12);
for i=1:N
  S(i).numNeighbors = 0;
  for k=1:N
    if i~=k
      dist = sqrt(double((S(i).xd - S(k).xd)^2 + (S(i).yd - S(k).yd)^2));
      if dist < maxrange
        S(i).numNeighbors = S(i).numNeighbors + 1;
        figure(1)
        uistack(plot( [S(i).xd, S(k).xd], [S(i).yd, S(k).yd] ),'bottom');
        S(i).neighbors(S(i).numNeighbors) = S(k).ID;
      else continue
      end
    else continue
    end
  end
end
```

```
%% Initialize values for all nodes
for i=1:N
  S(i).receivedBeginPacket = 0; S(i).hopCount = 0; S(i).friendIDs = {};
S(i).sentToNeighbors = 0; S(i).parentIDs={}; S(i).childrenIDs={}; S(i).sequence={};
end
%% assign random node as starter node; send begin packet (flood network)
starterNode = randi(N);
uistack(text(S(starterNode).xd, S(starterNode).yd, S(starterNode).ID,'EdgeColor','k',
'BackgroundColor', 'y'),'top');
S(starterNode).receivedBeginPacket=1;
S(starterNode).sentToNeighbors=1;
S(starterNode).parentIDs = S(starterNode).ID;
S(starterNode).childrenIDs = S(starterNode).neighbors;
for i=1:S(starterNode).numNeighbors
  for k=1:N
    if( char(S(k).ID) == char(S(starterNode).neighbors(i)) )
      S(k).receivedBeginPacket = 1;
      S(k).hopCount = S(k).hopCount + 1;
      S(k).parentsHopCount = 0;
      S(k).parentIDs = S(starterNode).ID;
      S(k).childrenIDs = S(k).neighbors;
      for jj=1:S(k).numNeighbors
        if(char(S(k).parentIDs) == char(S(k).neighbors(jj)))
          S(k).childrenIDs(jj)=[];
        else continue
        end
      end
    else continue
    end
  end
end
hold off
refcount = 1;
nodesNotified = 0;
while (nodesNotified ~= N)
  for i = 1:N
    if (S(i).receivedBeginPacket == 1 && S(i).sentToNeighbors == 0 && S(i).hopCount == refcount)
      S(i).sentToNeighbors = 1;
      for k=1:numel(S(i).childrenIDs)
        for m=1:N
          if( char(S(m).ID) == char(S(i).childrenIDs(k)))
            if(S(m).receivedBeginPacket==0)
              S(m).receivedBeginPacket = 1;
              if (isempty(S(m).parentIDs))
                S(m).parentIDs = S(i).ID;
```

```
              S(m).hopCount = S(i).hopCount + 1;
              S(m).parentsHopCount = S(i).hopCount;
              S(m).childrenIDs = S(m).neighbors;
              for jj=1:S(m).numNeighbors
                if(char(S(m).parentIDs) == char(S(m).neighbors(jj)))
                  S(m).childrenIDs(jj)=[];
                else continue
                end
              end
            elseif (S(i).hopCount < S(m).parentsHopCount)
              S(m).parentIDs = S(i).ID;
              S(m).hopCount = S(i).hopCount + 1;
              S(m).parentsHopCount = S(i).hopCount;
              S(m).childrenIDs = S(m).neighbors;
              for jj=1:S(m).numNeighbors
                if(char(S(m).parentIDs) == char(S(m).neighbors(jj)))
                  S(m).childrenIDs(jj)=[];
                else continue
                end
              end
            else continue
            end
          elseif (S(i).hopCount == S(m).parentsHopCount)
            S(m).parentIDs = [S(m).parentIDs S(i).ID];
            S(m).childrenIDs = S(m).neighbors;
            while(~isempty(intersect(S(m).childrenIDs, S(m).parentIDs)))
              for jj=1:numel(S(m).childrenIDs)
                for kk=1:numel(S(m).parentIDs)
                  if (char(S(m).childrenIDs(jj)) == char(S(m).parentIDs(kk)))
                    break
                  else continue
                  end
                end
                if(char(S(m).childrenIDs(jj)) == char(S(m).parentIDs(kk)))
                  S(m).childrenIDs(jj)=[];
                  break
                end
              end
            end
          else continue
          end
        else continue
        end
      end
    end
  else continue
```

```
    end
  end
  nodesNotified=0;
  for iii=1:N
    nodesNotified = nodesNotified + S(iii).receivedBeginPacket;
  end
  if (nodesNotified ~= N)
    refcount = refcount + 1;
  else
    break
  end
end
for i=1:N
  for k=1:numel(S(i).childrenIDs)
    for m=1:N
      if ( char(S(i).childrenIDs(k))== char(S(m).ID) )
        if (S(m).hopCount == S(i).hopCount) %if neighbor's hop count is same, they are peers
          S(i).friendIDs = [S(i).friendIDs S(m).ID];
        else continue
        end
      else continue
      end
    end
  end
end
for i=1:N
  if( ~ isempty( S(i).friendIDs ) )
    while( ~ isempty( intersect( S(i).childrenIDs, S(i).friendIDs ) ) )
      for jj = 1 : numel( S(i).childrenIDs )
        for kk = 1 : numel( S(i).friendIDs )
          if( char( S(i).childrenIDs(jj) ) == char( S(i).friendIDs(kk) ) )
            break
          else continue
          end
        end
        if( char(S(i).childrenIDs(jj) ) == char( S(i).friendIDs(kk)) )
          S(i).childrenIDs(jj) = [];
          break
        end
      end
    end
  else continue
  end
end
for i=1:N
  S(i).numMasters = numel(S(i).parentIDs);
```

```
  S(i).numPeers = numel(S(i).friendIDs);
end
%% all nodes notified; begin sequence determination
for i=1:N
  rc(i) = S(i).hopCount;
end
  refcountB = max(rc);
for i=1:N
  S(i).recSeqPkt = 0;
end
nodesReceivedSeq = 0;
while (nodesReceivedSeq ~= N)
  for i = 1:N
    if( S(i).recSeqPkt == 0 && S(i).hopCount == refcountB )
      S(i).recSeqPkt = 1;
      if( isempty(S(i).childrenIDs) ) %if node has NO children
        S(i).sequence = S(i).ID;
      elseif ( numel(S(i).childrenIDs) == 1) %if node has ONE child
        for ii=1:N
          if( strcmp(S(ii).ID, S(i).childrenIDs))
            if( strcmp(S(ii).sequence(end), S(ii).ID))
              S(i).sequence = [S(ii).sequence S(i).ID];
            else
              for ss = 1:numel(S(ii).sequence)
                if( strcmp(S(ii).sequence(ss), S(ii).ID))
                  if(numel(S(ii).sequence(1:ss))>=numel(S(ii).sequence(ss:end)))
                    final = S(ii).sequence(1:ss);
                  else
                    final = fliplr(S(ii).sequence(ss:end));
                  end
                else continue
                end
              end
              S(i).sequence = [final S(i).ID];
            end
          else continue
          end
        end
      elseif ( numel(S(i).childrenIDs) > 1 ) %if node has more than one child
        childnumID = [];
        childrenseqs = [];
        for a=1:numel(S(i).childrenIDs)
          for h=1:N
            if( strcmp(S(i).childrenIDs(a), S(h).ID) )
              childnumID = [childnumID h];
              childrenseqs{a} = S(h).sequence;
```

```
      else continue
      end
    end
  end
  highestID = findlongestsequence(S,childnumID, childrenseqs);
  S(i).sequence = S(childnumID(highestID)).sequence;
  longerseq={ };
  for ls=1:numel(S(childnumID(highestID)).sequence)
    if strcmp(S(childnumID(highestID)).sequence(ls), S(childnumID(highestID)).ID)
==0
      longerseq(ls) = S(childnumID(highestID)).sequence(ls);
    else break
    end
  end
  longerseq = [longerseq S(childnumID(highestID)).ID];
  childnumID(highestID) = [];
  remainingchildren={ };
  for rk=1:length(childnumID)
    remainingchildren(rk) = S(childnumID(rk)).ID;
  end
  while numel(remainingchildren) ~= 0
    [lastnodeinseq] = S(i).sequence(end);
    for lg=1:N
      if( strcmp(S(lg).ID, lastnodeinseq) )
        lastnodeID = lg;
      else continue
      end
    end
    parentfriend = [S(lastnodeID).parentIDs S(lastnodeID).friendIDs];
    [remainingchildren,PF,S] = addparentfriend(S, N, remainingchildren, parentfriend, i);
    [remainingchildren] = UpdateRemainingChildren(S, i, remainingchildren);
    if numel(remainingchildren)== 0
      S(i).sequence = [S(i).sequence S(i).ID];
      break
    else
    end
    nextchildID = [];
    nextchildseq = [];
    for aaa=1:numel(remainingchildren)
      if( isempty(intersect( remainingchildren(aaa), S(i).sequence )) )
        for ww=1:N
          if( strcmp(remainingchildren(aaa), S(ww).ID) )
            nextchildID = [nextchildID ww];
            nextchildseq{aaa} = S(ww).sequence;
          else continue
          end
```

```
            end
          else continue
          end
        end
       if(length(nextchildID) > 1)
         nexthighestID = findlongestsequence(S, nextchildID, nextchildseq);
       else
         nexthighestID = 1;
       end
       shorterseq={};
       for dd=1:numel(S(nextchildID(nexthighestID)).sequence)
         if( strcmp(S(nextchildID(nexthighestID)).sequence(dd),
S(nextchildID(nexthighestID)).ID) == 0)
              shorterseq(dd) = S(nextchildID(nexthighestID)).sequence(dd);
          else break
          end
       end
       shorterseq = [shorterseq S(nextchildID(nexthighestID)).ID];
       for tt=1:numel(remainingchildren)
         if( strcmp(S(nextchildID(nexthighestID)).ID, remainingchildren(tt)) )
           remainingchildren(tt)=[];
           break
         else
         end
       end
       [remainingchildren] = UpdateRemainingChildren(S, i, remainingchildren);
       if numel(remainingchildren)== 0
         PFnext = 0;
       else
         [lastnodeinseq] = S(nextchildID(nexthighestID)).sequence(end);
         for lg=1:N
           if( strcmp(S(lg).ID, lastnodeinseq) )
             lastnodeID = lg;
           else continue
           end
         end
         parentfriend = [S(lastnodeID).parentIDs S(lastnodeID).friendIDs];
         [remainingchildren, PFnext, S] = addparentfriend(S, N, remainingchildren,
parentfriend, nextchildID(nexthighestID));
       end
       if PF == 0 && PFnext == 0
         S(i).sequence = longerseq;
         S(nextchildID(nexthighestID)).sequence = shorterseq;
       elseif PF == 0 && PFnext == 1
         S(i).sequence = longerseq;
       elseif PF == 1 && PFnext == 0
```

```
        S(nextchildID(nexthighestID)).sequence = shorterseq;
      else
      end
      %adjusting for similarities
      %if there are NO similarities:
      if(isempty(intersect(S(i).sequence, S(nextchildID(nexthighestID)).sequence)))
        S(i).sequence = [S(i).sequence S(i).ID
fliplr(S(nextchildID(nexthighestID)).sequence)];
        [remainingchildren] = UpdateRemainingChildren(S, i, remainingchildren);
        if numel(remainingchildren)== 0
          break
        else
          [lastnodeinseq] = S(i).sequence(end);
          for lg=1:N
            if( strcmp(S(lg).ID, lastnodeinseq) )
              lastnodeID = lg;
            else continue
            end
          end
          parentfriend = [S(lastnodeID).parentIDs S(lastnodeID).friendIDs];
          [remainingchildren,PF, S] = addparentfriend(S, N, remainingchildren,
parentfriend,i);
        end
        break
      else %there are similarities
        if(strcmp(S(i).sequence(1), S(nextchildID(nexthighestID)).sequence(1)))
          if (~isempty(intersect(S(i).sequence(2:end),
S(nextchildID(nexthighestID)).sequence(2:end))))
            nss = fliplr(S(i).sequence);
            temp = {};
            for yu = 1:numel(nss)
              if isempty(intersect(nss(yu),S(nextchildID(nexthighestID)).sequence))
                temp(yu) = nss(yu);
              else break
              end
            end
            S(i).sequence = [S(nextchildID(nexthighestID)).sequence, S(i).ID, temp];
            break
          else
            S(i).sequence(1) = [];
            S(i).sequence = [fliplr(S(i).sequence) S(nextchildID(nexthighestID)).sequence];
            [remainingchildren] = UpdateRemainingChildren(S, i, remainingchildren);
            if numel(remainingchildren)== 0
              S(i).sequence = [S(i).sequence S(i).ID];
              break
            else
```

```
              end
            end
          elseif strcmp(S(i).sequence(end), S(nextchildID(nexthighestID)).sequence(1))
            if ~isempty(intersect(S(i).sequence(1:end-1),
S(nextchildID(nexthighestID)).sequence(2:end)))
              nss = fliplr(S(nextchildID(nexthighestID)).sequence);
              temp = { };
              for yu = 1:numel(nss)
                if isempty(intersect(nss(yu),S(i).sequence))
                  temp(yu) = nss(yu);
                else break
                end
              end
              S(i).sequence = [S(i).sequence, S(i).ID, temp];
              break
            else
              S(i).sequence(end) = [];
              S(i).sequence = [S(i).sequence S(nextchildID(nexthighestID)).sequence];
              [remainingchildren] = UpdateRemainingChildren(S, i, remainingchildren)
              if numel(remainingchildren)== 0
                S(i).sequence = [S(i).sequence S(i).ID];
                break
              else
              end
            end
          else
            nss = fliplr(S(nextchildID(nexthighestID)).sequence);
            temp = { };
            for yu = 1:numel(nss)
              if isempty(intersect(nss(yu),S(i).sequence))
                temp(yu) = nss(yu);
              else break
              end
            end
            [remainingchildren] = UpdateRemainingChildren(S, i, remainingchildren);
            if numel(remainingchildren)==0
              S(i).sequence = [S(i).sequence, S(i).ID, temp];
              break
            else
              nextchildID = [];
              nextchildseq = [];
              for aaa=1:numel(remainingchildren)
                if( isempty(intersect( remainingchildren(aaa), S(i).sequence )) )
                  for ww=1:N
                    if( strcmp(remainingchildren(aaa), S(ww).ID) )
                      nextchildID = [nextchildID ww];
```

```
                nextchildseq{aaa} = S(ww).sequence;
              else continue
              end
             end
           else continue
           end
         end
         if length(nextchildID) > 1
           nexthighestID = findlongestsequence(S, nextchildID, nextchildseq);
         else
           nexthighestID = 1;
         end
         nextshorterseq={ };
         for dd=1:numel(S(nextchildID(nexthighestID)).sequence)
           if( strcmp(S(nextchildID(nexthighestID)).sequence(dd),
S(nextchildID(nexthighestID)).ID) == 0)
             nextshorterseq(dd) = S(nextchildID(nexthighestID)).sequence(dd);
           else break
           end
         end
         nextshorterseq = [nextshorterseq S(nextchildID(nexthighestID)).ID];
         longer = fliplr(nextshorterseq);
         if numel(temp) > numel(nextshorterseq)
           longer = temp;
         else
         end
         S(i).sequence = [S(i).sequence, S(i).ID, longer];
         break
        end
       end
      end
    else
    end
   else
     continue
   end
end
nodesReceivedSeq=0;
for iii=1:N
  nodesReceivedSeq = nodesReceivedSeq + S(iii).recSeqPkt;
end
if (nodesReceivedSeq ~= N)
  refcountB = refcountB - 1;
else break
end
```

```
end
SSq = S(starterNode).sequence;
%preSeqCorrNum = numel(SSq); beforePerc = (preSeqCorrNum / N) *100; BP = BP +
beforePerc;          %un-comment for broadcast sequencing %% sequence correction
for sck=1:N
  nodeIDnum=[];
  for i=1:numel(SSq)
    for k=1:N
      if(strcmp(SSq(i),S(k).ID))
        nodeIDnum = [nodeIDnum k];
      else continue
      end
    end
  end
  for i=2:length(nodeIDnum)
    if(~isempty(intersect(S(nodeIDnum(i-1)).ID, S(nodeIDnum(i)).neighbors)))
      continue
    else
    end
  end
  if(nodeIDnum(1) == nodeIDnum(end) )
    nodeIDnum(end)=[];
  else
  end
  for i=2:length(nodeIDnum)
    for k=1:S(nodeIDnum(i-1)).numNeighbors
      if(isempty(intersect(S(nodeIDnum(i-1)).neighbors(k), SSq)) &&
~isempty(intersect(S(nodeIDnum(i-1)).neighbors(k), S(nodeIDnum(i)).neighbors)))
        for m=1:N
          if(strcmp(S(nodeIDnum(i-1)).ID, SSq(m)))
            a=SSq(1:m);
            b=SSq(m+1:end);
            SSq=[a S(nodeIDnum(i-1)).neighbors(k) b];
            nodeIDnum=[];
            for ii=1:numel(SSq)
              for kk=1:N
                if(strcmp(SSq(ii),S(kk).ID))
                  nodeIDnum = [nodeIDnum kk];
                else continue
                end
              end
            end
            brea
          else continue
```

```
        end
      end
      break
    else continue
    end
   end
  end
  for po=1:S(nodeIDnum(end)).numNeighbors
   if (isempty(intersect(S(nodeIDnum(end)).neighbors(po), SSq)))
    SSq = [SSq S(nodeIDnum(end)).neighbors(po)];
    break
   else continue
   end
  end
  SSq = fliplr(SSq);
 end
 %postSeqCorrNum = numel(SSq); afterPerc = (postSeqCorrNum / N) *100; AP = AP + afterPerc;          %un-comment for broadcast sequencing
 %end                                              %un-comment for broadcast sequencing
%end                                               %un-comment for broadcast sequencing
%numTrials = numTopol * N; BP_final = BP/numTrials; %un-comment
%AP_final = AP/numTrials; %un-comment for broadcast sequencing %% start synchronization
for i=1:N
 for k=1:S(i).numNeighbors
  for m=1:N
   if(strcmp(S(i).neighbors(k),S(m).ID))
    S(i).neighIDs(k) = m;
   else continue
   end
  end
 end
end
for i=1:length(SSq)
 for k=1:N
  if(strcmp(SSq(i),S(k).ID))
   seqIDs(i) = k;
  else continue
  end
 end
end
qr = seqIDs; qr(end)=[]; qr(1)=[]; seqIDs = [seqIDs fliplr(qr)]; onecycle = length(seqIDs);
seqIDs = repmat(seqIDs,1,C); nodetimes = zeros(N,1); TS = zeros(N,1);
%set different frequencies:
r = -.25; q = .25;    F = r + (q-r).*rand(1,N);    f = 1 + F;
```

```
%relative skew matrix (saved for MSE calc)
RelSkew = ones(N,N);
for i = 1:N
  for k = 1:N
    RelSkew(i,k) = f(k)./f(i);
  end
end
sk = RelSkew;
%set different offsets:
Node1Clock = 0;   x = -10; y = 10;   RandOffset = x + (y-x).*rand(1, N);
StartOffset = Node1Clock + RandOffset;
c = 3e8; xx = 100; yy = 500;   t_p = xx + (yy-xx).*rand(1,N); t_proc = t_p*(1e-3);
%builds first column of timestamps:
for i=1:N
  if ~isempty(intersect(i, S(seqIDs(1)).neighIDs))
    dist = sqrt(double((S(seqIDs(1)).xd - S(i).xd)^2 + (S(seqIDs(1)).yd - S(i).yd)^2));
    t_prop = dist/c;   alltimes = t_prop;
    nodetimes(i,1) = sk(seqIDs(1),i)*alltimes + StartOffset(i);
    TS(i,1) = 1;
  else
    dist = sqrt(double((S(seqIDs(1)).xd - S(seqIDs(2)).xd)^2 + (S(seqIDs(1)).yd - S(seqIDs(2)).yd)^2));
    t_prop = dist/c;      alltimes = t_prop;
    nodetimes(i,1) = sk(seqIDs(1),seqIDs(2))*alltimes + StartOffset(i);
    if seqIDs(1) == i
      TS(i,1) = 2;
    else
    end
  end
end
%builds remaining number of timestamps except last column
for k=2:length(seqIDs(2:end))
  for i=1:N
    if ~isempty(intersect(i, S(seqIDs(k)).neighIDs))
      dist = sqrt(double((S(seqIDs(k)).xd - S(i).xd)^2 + (S(seqIDs(k)).yd - S(i).yd)^2));
      t_prop = dist/c; alltimes = t_prop + t_proc(i);
      nodetimes(i,k) = sk(seqIDs(k),i)*alltimes + nodetimes(i,k-1);
      TS(i,k) = 1; %received beacons
    else
      dist = sqrt(double((S(seqIDs(k)).xd - S(seqIDs(k+1)).xd)^2 + (S(seqIDs(k)).yd - S(seqIDs(k+1)).yd)^2));
      t_prop = dist/c; alltimes = t_prop + t_proc(i);
      nodetimes(i,k) = sk(seqIDs(k),seqIDs(k+1))*alltimes + nodetimes(i,k-1);
      if seqIDs(k) == i
        TS(i,k) = 2; %sender
      else
```

```
        end
      end
    end
end
%builds last column of timestamps:
lastk = length(seqIDs);   nodetimes = [nodetimes zeros(N,1)];        TS = [TS zeros(N,1)];
for i=1:N
  if ~isempty(intersect(i, S(seqIDs(end)).neighIDs))
    dist = sqrt(double((S(seqIDs(end)).xd - S(i).xd)^2 + (S(seqIDs(end)).yd - S(i).yd)^2));
    t_prop = dist/c;       alltimes = t_prop + t_proc(i);
    nodetimes(i,lastk) = sk(seqIDs(end),i)*alltimes + nodetimes(i,lastk-1);
    TS(i,lastk) = 1; %received beacons
  else
    dist = sqrt(double((S(seqIDs(end)).xd - S(seqIDs(1)).xd)^2 + (S(seqIDs(end)).yd - S(seqIDs(1)).yd)^2));
    t_prop = dist/c;       alltimes = t_prop + t_proc(i);
    nodetimes(i,lastk) = sk(seqIDs(end),seqIDs(1))*alltimes + nodetimes(i,lastk-1);
    if seqIDs(end) == i
      TS(i,lastk) = 2; %sender
    else
    end
  end
end
avg_prec = []; avg_1hop = []; avg_2hop = []; avg_3hop = []; avg_4hop = []; avg_5hop = [];
avg_6hop = []; avg_7hop = []; avg_8hop = []; avg_9hop = []; avg_10hop = []; avg_RSP = [];
for CL = onecycle : onecycle : length(seqIDs)
  %finds master reference node:
  synctotal=[];
  for row=1:N
    nodescansync = 0;
    for column = 1 : CL
      if(TS(row, column)==1)
        for lin=1:N
          if TS(lin,column)==1 && lin==row
            continue
          elseif TS(lin, column)==1
            nodescansync = nodescansync + 1;
          else continue
          end
        end
      else continue
      end
    end
    synctotal(row) = nodescansync;
  end
  sync_max = max(synctotal);
```

```
MastRefNode = find(sync_max==synctotal);
if length(MastRefNode)>1
  MastRefNode = MastRefNode(1);
end
for i=1:N
  values{i} = cell(N,2);
end
%gather samples from same beacons:
for i=1:N
  for k = 1 : CL
    if TS(i,k) == 1
      for m=1:N
        if TS(m,k)==1 && m~=i
          values{i}{m,1} = [values{i}{m,1} nodetimes(m,k)];
          values{i}{m,2} = [values{i}{m,2} nodetimes(i,k)];
        else continue
        end
      end
    else continue
    end
  end
end
EstSkew = ones(N,N); EstOffset = zeros(N,N);
for ii=1:N
  for kk=1:N
    u = values{ii}{kk,1}; v = values{ii}{kk,2};
    if length(u) > 1
      K = length(u);
      skew = (sum(u)*sum(v) - K*(u*v')) / ((sum(v)).^2 - K*sum(v.^2));
      offset = (1/K) * ( sum(u)-(skew*sum(v)) );
      EstSkew(ii,kk) = skew; EstOffset(ii,kk) = offset;
    else continue
    end
  end
end
for i=1:N
  S(i).synced = 0;
end
S(MastRefNode).synced = 1;
S(MastRefNode).newclock = nodetimes(MastRefNode,CL);
prec = []; R4Syn_1hop = []; R4Syn_2hop = []; R4Syn_3hop = []; R4Syn_4hop = [];
R4Syn_5hop = []; R4Syn_6hop = []; R4Syn_7hop = []; R4Syn_8hop = []; R4Syn_9hop = [];
R4Syn_10hop = []; RSP = [];
%Execute R4Syn:
for i=1:N
  if MastRefNode == i
```

```
    continue
  elseif EstOffset(i,MastRefNode) ~= 0
    %executes 1-hop R4Syn
    newtime = EstSkew(i,MastRefNode) * nodetimes(i,CL) + EstOffset(i,MastRefNode);
    S(i).newclock = newtime; S(i).synced = 1;
    p = abs(newtime - nodetimes(MastRefNode,CL));
    S(i).precision = p; prec = [prec, p];
    R4Syn_1hop = [R4Syn_1hop, p];
  else
    %2-Hop:
    for k=1:N
      if EstOffset(i,k) ~= 0 && EstOffset(k,MastRefNode) ~= 0
        % executes 2-hop R4Syn
        totfreq = EstSkew(i,k) * EstSkew(k,MastRefNode);
        totoffset = EstSkew(k,MastRefNode) * EstOffset(i,k) + EstOffset(k,MastRefNode);
        newtime = totfreq * nodetimes(i,CL) + totoffset;
        S(i).newclock = newtime; S(i).synced = 1;
        p = abs(newtime - nodetimes(MastRefNode,CL));
        S(i).precision = p; prec = [prec, p];
        R4Syn_2hop = [R4Syn_2hop, p];
        break
      else continue
      end
    end
    if S(i).synced==1
      continue
    end
    % Lines of code for 3-hop through 9-hop R4Syn are omitted to reduce repetitive lines
that can be extrapolated by the 10-hop code shown below:
    %10-Hop:
    for k=1:N
      if EstOffset(i,k) ~= 0
        for l=1:N
          if EstOffset(k,l) ~= 0
            for g=1:N
              if EstOffset(l,g) ~= 0
                for h=1:N
                  if EstOffset(g,h) ~= 0
                    for d=1:N
                      if EstOffset(h,d) ~= 0
                        for r=1:N
                          if EstOffset(d,r) ~= 0
                            for t=1:N
                              if EstOffset(r,t) ~= 0
                                for w=1:N
                                  if EstOffset(t,w)~=0
```

```
            for z=1:N
               if EstOffset(w,z)~=0 && EstOffset(z,MastRefNode) ~= 0
                % executes 10-hop R4Syn
                  totfreq =
EstSkew(i,k)*EstSkew(k,l)*EstSkew(l,g)*EstSkew(g,h)*EstSkew(h,d)*EstSkew(d,r)*EstSke
w(r,t)*EstSkew(t,w)*EstSkew(w,z)*EstSkew(z,MastRefNode);
                  totoffset =
EstOffset(i,k)*EstSkew(k,l)*EstSkew(l,g)*EstSkew(g,h)*EstSkew(h,d)*EstSkew(d,r)*EstSk
ew(r,t)*EstSkew(t,w)*EstSkew(w,z)*EstSkew(z,MastRefNode)...
                                  +
EstOffset(k,l)*EstSkew(l,g)*EstSkew(g,h)*EstSkew(h,d)*EstSkew(d,r)*EstSkew(r,t)*EstSk
ew(t,w)*EstSkew(w,z)*EstSkew(z,MastRefNode)...
                                  +
EstOffset(l,g)*EstSkew(g,h)*EstSkew(h,d)*EstSkew(d,r)*EstSkew(r,t)*EstSkew(t,w)*EstSk
ew(w,z)*EstSkew(z,MastRefNode)...
                                  +
EstOffset(g,h)*EstSkew(h,d)*EstSkew(d,r)*EstSkew(r,t)*EstSkew(t,w)*EstSkew(w,z)*EstS
kew(z,MastRefNode)...
                                  +
EstOffset(h,d)*EstSkew(d,r)*EstSkew(r,t)*EstSkew(t,w)*EstSkew(w,z)*EstSkew(z,MastRef
Node)...
                                  +
EstOffset(d,r)*EstSkew(r,t)*EstSkew(t,w)*EstSkew(w,z)*EstSkew(z,MastRefNode)...
                                  +
EstOffset(r,t)*EstSkew(t,w)*EstSkew(w,z)*EstSkew(z,MastRefNode)...
                                  +
EstOffset(t,w)*EstSkew(w,z)*EstSkew(z,MastRefNode)...
                                  +
EstOffset(w,z)*EstSkew(z,MastRefNode)...
                                  +
EstOffset(z,MastRefNode);
         newtime = totfreq * nodetimes(i,CL) + totoffset;
         S(i).newclock = newtime;
         S(i).synced = 1;
         p = abs(newtime - nodetimes(MastRefNode,CL));
         S(i).precision = p;
         prec = [prec, p];
         R4Syn_10hop = [R4Syn_10hop, p];
                  break
                  else continue
                  end
               end
                         % ### repeat 8 more times###
               if S(i).synced==1
                 break
               end
```

```
                    else continue
                  end
                end
                        % ####################
end
%Execute RSP:
for i=1:N
  if S(i).synced == 0
    for k=1:S(i).numNeighbors
      if S(S(i).neighIDs(k)).synced == 1
        dist = sqrt(double((S(i).xd - S(S(i).neighIDs(k)).xd)^2 + (S(i).yd - S(S(i).neighIDs(k)).yd)^2));
        t_prop = dist/c;
        T1 = S(S(i).neighIDs(k)).newclock;
        T3 = T1 + t_proc(S(i).neighIDs(k));
        T2 = T1 + t_prop*sk(i,S(i).neighIDs(k));
        T4 = T3 + t_prop*sk(i,S(i).neighIDs(k));
        reftime = T3 + t_prop + t_proc(S(i).neighIDs(k));
        nodeti = T4 + t_proc(i);
        RSPskew = (T3-T1)/(T4-T2);
        RSPoffset = (T1*T4 - T2*T3) / (T4-T2);
        newtime = RSPskew*nodeti + RSPoffset;
        S(i).newclock = newtime;  S(i).synced = 1;
        p = abs(newtime - reftime);
        S(i).precision = p;
        prec = [prec, p]; RSP = [RSP, p];
        break
      else continue
      end
    end
  else continue
  end
end
AP = mean(prec); AR4S1 = mean(R4Syn_1hop); % repeat for hops 2 through 9
AR4S10 = mean(R4Syn_10hop); ARSP = mean(RSP);
avg_prec = [avg_prec, AP]; avg_1hop = [avg_1hop, AR4S1]; % repeat for hops 2 through 9
avg_10hop = [avg_10hop, AR4S10]; avg_RSP = [avg_RSP, ARSP];
end
if isnan(avg_prec) == zeros(1,C)
  if avg_prec == zeros(1,C)
    avg_prec = zeros(1,C);
  else
    ctprec = ctprec + 1;
  end
else
  avg_prec = zeros(1,C);
```

```
end
% ###the following lines of code are repeated for up to 9 hops####
if isnan(avg_1hop) == zeros(1,C)
  if avg_1hop == zeros(1,C)
    avg_1hop = zeros(1,C);
  else
    ct1hop = ct1hop + 1;
  end
else
  avg_1hop = zeros(1,C);
end
% ########################################################
if isnan(avg_10hop) == zeros(1,C)
  if avg_10hop == zeros(1,C)
    avg_10hop = zeros(1,C);
  else
    ct10hop = ct10hop + 1;
  end
else
  avg_10hop = zeros(1,C);
end
if isnan(avg_RSP) == zeros(1,C)
  if avg_RSP == zeros(1,C)
    avg_RSP = zeros(1,C);
  else
    ctRSP = ctRSP + 1;
  end
else
  avg_RSP = zeros(1,C);
end
t_avg_prec = t_avg_prec + avg_prec;
t_avg_1hop = t_avg_1hop + avg_1hop; %repeat for hops 2 through 9
t_avg_10hop = t_avg_10hop + avg_10hop;
t_avg_RSP = t_avg_RSP + avg_RSP;
TotNumNeighbors = 0;
for i=1:N
  TotNumNeighbors = TotNumNeighbors + S(i).numNeighbors;
end
% Plot Average Number of Neighbors vs Precision
AvgNumNeigh = TotNumNeighbors / N;
NetAvgPrec= mean(avg_prec);
hold on
figure(2)
semilogy(AvgNumNeigh, NetAvgPrec, '*')
xlabel('Average Number of Neighbors per Node', 'FontSize',12,'FontWeight', 'bold')
ylabel('Precision (seconds)', 'FontSize',12,'FontWeight', 'bold')
```

```
xlim([0 N])
hold off
end
hold on
figure(3)
xaxis = 1:1:C;
if ct10hop ~=0
  semilogy(xaxis,t_avg_prec/ctprec,'b', xaxis, t_avg_RSP/ctRSP,'k',
xaxis,t_avg_1hop/ct1hop,'g', xaxis,t_avg_2hop/ct2hop,'r', xaxis,t_avg_3hop/ct3hop,'c',
xaxis, t_avg_4hop/ct4hop,'m', xaxis,t_avg_5hop/ct5hop,'b:', xaxis,t_avg_6hop/ct6hop,'c:',
xaxis, t_avg_7hop/ct7hop,'g:', xaxis,t_avg_8hop/ct8hop,'r:', xaxis,t_avg_9hop/ct9hop,'k:',
xaxis,t_avg_10hop/ct10hop,'m:', 'LineWidth', 2)
  legend('Network Average', 'RSP Average', 'R4Syn 1-Hop Average', 'R4Syn 2-Hop
Average','R4Syn 3-Hop Average', 'R4Syn 4-Hop Average', 'R4Syn 5-Hop Average',
'R4Syn 6-Hop Average', 'R4Syn 7-Hop Average', 'R4Syn 8-Hop Average', 'R4Syn 9-Hop
Average', 'R4Syn 10-Hop Average', -1 )
%repeat pattern for hops 2 through 9 for plotting
elseif ct1hop ~=0
  semilogy(xaxis,t_avg_prec/ctprec,'b', xaxis, t_avg_RSP/ctRSP,'k',
xaxis,t_avg_1hop/ct1hop,'r*', 'LineWidth', 2)
  legend('Network Average', 'RSP Average', 'R4Syn 1-Hop Average' )
end
xlabel('Number of Cycles', 'FontSize',12,'FontWeight', 'bold')
ylabel('Precision (seconds)', 'FontSize',12,'FontWeight', 'bold')
hold off
% Plot Number of Hops vs Precision:
if ct10hop ~=0
  figure(4)
semilogy(1,mean(t_avg_1hop/ct1hop),'b*',2,mean(t_avg_2hop/ct2hop),'b*',3,mean(t_avg_3
hop/ct3hop),'b*',4,mean(t_avg_4hop/ct4hop),'b*',5,mean(t_avg_5hop/ct5hop),'b*',6,mean(t
_avg_6hop/ct6hop),'b*',7,mean(t_avg_7hop/ct7hop),'b*',8,mean(t_avg_8hop/ct8hop),'b*',9
,mean(t_avg_9hop/ct9hop),'b*',10,mean(t_avg_10hop/ct10hop),'b*','LineWidth', 2)
  xlabel('Number of Hops', 'FontSize',12,'FontWeight', 'bold')
  ylabel('Precision (seconds)', 'FontSize',12,'FontWeight', 'bold')
%repeat pattern for hops 2 through 9 for plotting
elseif ct1hop ~=0
  figure(4)
  semilogy(1,mean(t_avg_1hop/ct1hop),'b*','LineWidth', 2)
  xlabel('Number of Hops', 'FontSize',12,'FontWeight', 'bold')
  ylabel('Precision (seconds)', 'FontSize',12,'FontWeight', 'bold')
end
```

C.  MATLAB ASSIGN ID FUNCTION

```
function [ nodeID ] = assignID(idlength)
  symbols = ['A':'Z' '0':'9'];
  nums = randi(numel(symbols),[1 idlength]);
```

```
  nodeID = symbols (nums);
end
```

D. MATLAB FIND LONGEST SEQUENCE FUNCTION

```
function [ highestID ] = findlongestsequence(S, childnumID, childrenseqs)
  highestID = 1;
  for b=2:length(childnumID) %finds child with longest sequence
    if( numel(childrenseqs{b}) > numel(childrenseqs{highestID}) )
      highestID = b;
    elseif( numel(childrenseqs{b}) == numel(childrenseqs{highestID}) )
      %comparing number of masters
      if ( S(childnumID(b)).numMasters < S(childnumID(highestID)).numMasters )
        highestID = b;
      elseif (S(childnumID(b)).numMasters==S(childnumID(highestID)).numMasters)
        %comparing number of peers
        if ( S(childnumID(b)).numPeers > S(childnumID(highestID)).numPeers )
          highestID = b;
        elseif ( S(childnumID(b)).numPeers == S(childnumID(highestID)).numPeers )
          %or random
          highestID = b;
        else continue
        end
      else continue
      end
    else continue
    end
  end
end
```

E. MATLAB ADD PARENT/FRIEND FUNCTION

```
function [remainingchildren, PF, S] = addparentfriend(S, N, remainingchildren, parentfriend,i)
  PF=0;
  while ~isempty( intersect( remainingchildren, parentfriend ))
    shortnode = []; shortestpeerseq = [];
    for z=1:numel(remainingchildren)
      for u=1:numel(parentfriend)
        if (strcmp(remainingchildren(z), parentfriend(u)))
          for qq=1:N
            if(strcmp(remainingchildren(z), S(qq).ID))
              shortnode = [shortnode qq];
            else continue
            end
          end
        else continue
```

```
      end
    end
end
for zz=1:length(shortnode)
  shortestpeerseq{zz} = S(shortnode(zz)).sequence;
end
%finding shortest child sequence:
shortestpeerID = 1;
if length(shortnode) >= 2
  for xx=2:length(shortnode)
    if( numel(shortestpeerseq{xx}) < numel(shortestpeerseq{shortestpeerID}))
      shortestpeerID = xx;
    elseif numel(shortestpeerseq{xx})==numel(shortestpeerseq{shortestpeerID}))
      if ( S(shortnode(xx)).numPeers >= S(shortnode(shortestpeerID)).numPeers )
        shortestpeerID = xx;
      else
        shortestpeerID = shortestpeerID;
      end
    else
      shortestpeerID = shortestpeerID;
    end
  end
else
  shortestpeerID = 1;
end
if( isempty(intersect(S(shortnode(shortestpeerID)).ID, S(i).sequence)))
  S(i).sequence = [S(i).sequence, S(shortnode(shortestpeerID)).ID];
  PF = 1;
  for tt=1:numel(remainingchildren)
    if( strcmp(S(shortnode(shortestpeerID)).ID, remainingchildren(tt)) )
      remainingchildren(tt)=[];
      break
    else continue
    end
  end
  if numel(remainingchildren) == 0
    break
  else
    lastnodeinseq = S(i).sequence(end);
    for lg=1:N
      if( strcmp(S(lg).ID, lastnodeinseq) == 1)
        lastnodeID = lg;
      else continue
      end
    end
    parentfriend = [S(lastnodeID).parentIDs S(lastnodeID).friendIDs];
```

```
        end
      else
        for tt=1:numel(remainingchildren)
          if( strcmp(S(shortnode(shortestpeerID)).ID, remainingchildren(tt)) )
            remainingchildren(tt)=[];
            break
          else continue
          end
        end
        if numel(remainingchildren) == 0
          break
        else
          lastnodeinseq = S(i).sequence(end);
          for lg=1:N
            if( strcmp(S(lg).ID, lastnodeinseq) == 1)
              lastnodeID = lg;
            else continue
            end
          end
          parentfriend = [S(lastnodeID).parentIDs S(lastnodeID).friendIDs];
        end
      end
    end
  end
end
```

F. MATLAB UPDATE REMAINING CHILDREN FUNCTION

```
function [remainingchildren] = UpdateRemainingChildren(S, i, remainingchildren)
rks = {};
for k=1:numel(remainingchildren)
  if isempty(intersect(remainingchildren(k), S(i).sequence))
    rks = [rks remainingchildren(k)];
  else continue
  end
end
remainingchildren = rks;
end
```

What is claimed is:

1. A method for synchronizing a plurality of sensors of a wireless sensor network, said method comprising:
   initiating, by a first sensor, a flood broadcast of a sequence discovery packet in said wireless sensor network;
   creating, by said first sensor in response to receiving back said sequence discovery packet, an initial broadcast sequence, wherein said initial broadcast sequence comprises a list of sensor identifications, and wherein an adjacent pair of sensor identifications in said initial broadcast sequence correspond to a pair of neighbor sensors, and wherein said pair of neighbor sensors is able to communicate directly with each other;
   broadcasting, by said first sensor, said initial broadcast sequence, wherein said initial broadcast sequence specifies an initial order for said plurality of sensors to broadcast synchronization information to eliminate collisions in said wireless sensor network; and broadcasting, by said first sensor, a first timestamp, using a location of said first sensor in said initial broadcast sequence;
   wherein when one of said pair of neighbor sensors receives said sequence discovery packet, said method further comprising:
   exchanging hop-count information among said pair of neighbor sensors when one of said pair of neighbor sensors receives said sequence discovery packet;
   determining a childless sensor, wherein said childless sensor has a largest distance from said first sensor among any neighbors of said childless sensor;
   creating, by said childless sensor, a first sequence comprising an identification of said childless sensor;
   transmitting, by said childless sensor, said first sequence to a first parent sensor of said childless sensor, wherein said first parent sensor is a neighbor of said childless sensor and has a shorter distance to said first sensor than said childless sensor;
   creating, by said first parent sensor, a second sequence comprising an identification of said first parent sensor and a first most node inclusive sequence received by said first parent sensor, wherein said first most node inclusive sequence comprises more sensor identifications than other sequences received by said first parent sensor; and
   transmitting, by said first parent sensor, said second sequence to a second parent sensor of said first parent sensor, wherein said second parent sensor is a neighbor of said first parent sensor and has a shorter distance to said first sensor than said first parent sensor.

2. The method of claim 1, wherein said initial broadcast sequence comprises an identification of said first sensor and a final most node inclusive sequence received by said first sensor.

3. A method for synchronizing a plurality of sensors of a wireless sensor network, said method comprising:
   initiating, by a first sensor, a flood broadcast of a sequence discovery packet in said wireless sensor network;
   creating, by said first sensor in response to receiving back said sequence discovery packet, an initial broadcast sequence, wherein said initial broadcast sequence comprises a list of sensor identifications, and wherein an adjacent pair of sensor identifications in said initial broadcast sequence correspond to a pair of neighbor sensors, and wherein said pair of neighbor sensors is able to communicate directly with each other;
   broadcasting, by said first sensor, said initial broadcast sequence, wherein said initial broadcast sequence specifies an initial order for said plurality of sensors to broadcast synchronization information to eliminate collisions in said wireless sensor network; and
   broadcasting, by said first sensor, a first timestamp, using a location of said first sensor in said initial broadcast sequence;
   receiving, by a second sensor, said initial broadcast sequence;
   determining, by said second sensor, whether a neighbor of said second sensor is missing from said initial broadcast sequence;
   updating, by said second sensor, said initial broadcast sequence to an updated broadcast sequence to include said neighbor of said second sensor, when said second sensor determines that said neighbor of said second sensor is missing from said initial broadcast sequence, wherein said updated broadcast sequence specifies an updated order for said plurality of sensors to broadcast said synchronization information to eliminate collisions in said wireless sensor network; and
   broadcasting, by said second sensor, a second timestamp information using a location of said second sensor in said updated broadcast sequence.

4. The method of claim 3, further comprising:
   creating, by said first sensor, a first matrix of timestamps, wherein said first matrix of timestamps comprises a plurality of timestamps received by said first sensor;
   determining, by said first sensor, a master reference node using said first matrix of timestamps, wherein said first sensor uses said master reference node as a reference for synchronization;
   creating, by said second sensor, a second matrix of timestamps, wherein said second matrix of timestamps comprises a plurality of timestamps received by said second sensor; and
   determining, by said second sensor, said master reference node using said second matrix of timestamps, wherein said second sensor uses said master reference node as a reference for synchronization.

5. The method of claim 4, wherein said plurality of timestamps received by said second sensor comprises information indicating relative time skew with said master reference node.

6. The method of claim 5, further comprising:
   synchronizing, by said first sensor, with said master reference node, using said first matrix of timestamps, when there is a timestamp corresponding to said first sensor and said master reference node in said first matrix of timestamps;
   synchronizing, by said first sensor, with said master reference node, using an exchange of an arrival time of a reference broadcast by said master reference node, when there is no timestamp corresponding to said first sensor and said master reference node in said first matrix of timestamps;
   synchronizing, by said second sensor, with said master reference node, using said second matrix of timestamps, when there is a timestamp corresponding to said second sensor and said master reference node in said second matrix of timestamps; and
   synchronizing, by said second sensor, with said master reference node, using an exchange of an arrival time of a reference broadcast by said master reference node, when there is no timestamp corresponding to said second sensor and said master reference node in said second matrix of timestamps.

7. A system for synchronizing a plurality of sensors of a wireless sensor network, said system comprising:
a first sensor configured to:
initiate a flood broadcast of a sequence discovery packet in said wireless sensor network;
determine, in response to receiving back said sequence discovery packet, an initial broadcast sequence, wherein said initial broadcast sequence comprises a list of sensor identifications, and wherein an adjacent pair of sensor identifications in said initial broadcast sequence correspond to a pair of neighbor sensors, and wherein said pair of neighbor sensors is able to communicate directly with each other;
broadcast said initial broadcast sequence, wherein said initial broadcast sequence specifies an initial order for said plurality of sensors to broadcast synchronization information to eliminate collisions in said wireless sensor network; and
broadcast a first timestamp, using a location of said first sensor in said initial broadcast sequence;
wherein said pair of neighbor sensors is configured to exchange hop-count information when one of said pair of neighbor sensors receives said sequence discovery packet;
wherein said system is configured to determine a childless sensor, wherein said childless sensor has a largest distance from said first sensor among any neighbors of said childless sensor, and wherein said childless sensor is configured to create a first sequence comprising an identification of said childless sensor;
wherein said childless sensor is further configured to transmit said first sequence to a first parent sensor of said childless sensor, wherein said first parent sensor is a neighbor of said childless sensor and has a shorter distance to said first sensor than said childless sensor;
wherein said first parent sensor is configured to create a second sequence comprising an identification of said first parent sensor and a first most node inclusive sequence received by said first parent sensor, wherein said first most node inclusive sequence comprises more sensor identifications than other sequences received by said first parent sensor; and
wherein said first parent sensor is configured to transmit said second sequence to a second parent sensor of said first parent sensor, wherein said second parent sensor is a neighbor of said first parent sensor and has a shorter distance to said first sensor than said first parent sensor.

8. The system of claim 7, wherein said first sensor is configured to create said initial broadcasting sequence using an identification of said first sensor and a final most node inclusive sequence received by said first sensor.

9. A non-transitory program storage device readable by computer, tangibly embodying a program of instructions executable by said computer to perform a method for synchronizing a plurality of sensors of a wireless sensor network, said method comprising:
initiating, by a first sensor, a flood broadcast of a sequence discovery packet in said wireless sensor network;
creating, by said first sensor in response to receiving back said sequence discovery packet, an initial broadcast sequence, wherein said initial broadcast sequence comprises a list of sensor identifications, and wherein an adjacent pair of sensor identifications in said initial broadcast sequence correspond to a pair of neighbor sensors, and wherein said pair of neighbor sensors is able to communicate directly with each other;
broadcasting, by said first sensor, said initial broadcast sequence, wherein said initial broadcast sequence specifies an initial order for said plurality of sensors to broadcast synchronization information to eliminate collisions in said wireless sensor network; and
broadcasting, by said first sensor, a first timestamp, using a location of said first sensor in said initial broadcast sequence;
receiving, by a second sensor, said initial broadcast sequence;
determining, by said second sensor, whether a neighbor of said second sensor is missing from said initial broadcast sequence;
updating, by said second sensor, said initial broadcast sequence to an updated broadcast sequence to include said neighbor of said second sensor, when said second sensor determines that said neighbor of said second sensor is missing from said initial broadcast sequence, wherein said updated broadcast sequence specifies an updated order for said plurality of sensors to broadcast said synchronization information to eliminate collisions in said wireless sensor network; and
broadcasting, by said second sensor, a second timestamp information using a location of said second sensor in said updated broadcast sequence.

10. The program storage device of claim 9, wherein said method further comprises:
creating, by said first sensor, a first matrix of timestamps, wherein said first matrix of timestamps comprises a plurality of timestamps received by said first sensor;
determining, by said first sensor, a master reference node using said first matrix of timestamps, wherein said first sensor uses said master reference node as a reference for synchronization;
creating, by said second sensor, a second matrix of timestamps, wherein said second matrix of timestamps comprises a plurality of timestamps received by said second sensor; and
determining, by said second sensor, said master reference node using said second matrix of timestamps, wherein said second sensor uses said master reference node as a reference for synchronization.

11. The program storage device of claim 10, wherein said plurality of timestamps received by said second sensor comprises information indicating relative time skew with said master reference node.

12. The program storage device of claim 11, wherein said method further comprises:
synchronizing, by said first sensor, with said master reference node, using said first matrix of timestamps, when there is a timestamp corresponding to said first sensor and said master reference node in said first matrix of timestamps;
synchronizing, by said first sensor, with said master reference node, using an exchange of an arrival time of a reference broadcast by said master reference node, when there is no timestamp corresponding to said first sensor and said master reference node in said first matrix of timestamps;
synchronizing, by said second sensor, with said master reference node, using said second matrix of timestamps, when there is a timestamp corresponding to said second sensor and said master reference node in said second matrix of timestamps; and
synchronizing, by said second sensor, with said master reference node, using an exchange of an arrival time of a reference broadcast by said master reference node, when there is no timestamp corresponding to said second sensor and said master reference node in said second matrix of timestamps.

\* \* \* \* \*